US012124127B2

(12) United States Patent
Kim et al.

(10) Patent No.: US 12,124,127 B2
(45) Date of Patent: *Oct. 22, 2024

(54) BACKLIGHT UNIT AND DISPLAY DEVICE INCLUDING THE SAME

(71) Applicant: Samsung Display Co., LTD., Yongin-si (KR)

(72) Inventors: Duk Sung Kim, Asan-si (KR); Jung Hyun Kwon, Hwaseong-si (KR); Jae Won Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,490

(22) Filed: Aug. 27, 2023

(65) Prior Publication Data
US 2023/0400728 A1    Dec. 14, 2023

Related U.S. Application Data

(63) Continuation of application No. 18/102,757, filed on Jan. 29, 2023, now Pat. No. 11,774,799, which is a
(Continued)

(30) Foreign Application Priority Data

Jul. 31, 2019    (KR) ........................ 10-2019-0093228

(51) Int. Cl.
*G02F 1/13357*    (2006.01)
*G02F 1/1333*    (2006.01)
*G02F 1/1335*    (2006.01)

(52) U.S. Cl.
CPC .. *G02F 1/133603* (2013.01); *G02F 1/133305* (2013.01); *G02F 1/133605* (2013.01); *G02F 1/133612* (2021.01); *G02F 1/133614* (2021.01)

(58) Field of Classification Search
CPC .. H01L 33/62; H10K 59/131; G02F 1/133612
See application file for complete search history.

(56) References Cited

U.S. PATENT DOCUMENTS 8,284,350 B2    10/2012    Abe et al.
8,692,455 B2    4/2014    Hayashi et al.
(Continued)

FOREIGN PATENT DOCUMENTS

CN    1783508 A    6/2006
CN    101307872 A    11/2008
(Continued)

OTHER PUBLICATIONS

Non-Final Office Action dated Mar. 31, 2022, issued to U.S. Appl. No. 16/892,611.
(Continued)

*Primary Examiner* — Karabi Guharay
(74) *Attorney, Agent, or Firm* — CANTOR COLBURN LLP

(57)    ABSTRACT

A backlight unit includes: a base substrate in which a light emitting area and a non-light emitting area are defined; a wiring layer including: a lower conductive layer disposed on the base substrate; an intermediate conductive layer disposed on the lower conductive layer; and an upper conductive layer disposed on the intermediate conductive layer; a light emitting element disposed on the wiring layer in the light emitting area; a connection member electrically connecting the light emitting element and the wiring layer, the connection member contacting the intermediate conductive layer of the wiring layer and the light emitting element; a backlight flexible substrate electrically connected to the wiring layer in the non-light emitting area; and a pad connection member electrically connecting the wiring layer and the backlight flexible substrate in the non-light emitting
(Continued)

area, the pad connection member contacting the upper conductive layer of the wiring layer.

20 Claims, 45 Drawing Sheets

Related U.S. Application Data continuation of application No. 16/892,611, filed on Jun. 4, 2020, now Pat. No. 11,598,989.

(56) References Cited

U.S. PATENT DOCUMENTS

| | | | |
|---|---|---|---|
| 8,758,073 | B2 | 6/2014 | Kim |
| 8,890,204 | B2 | 11/2014 | Seo et al. |
| 8,922,117 | B2 | 12/2014 | Ryu |
| 8,987,989 | B2 | 3/2015 | Shin et al. |
| 9,048,202 | B2 | 6/2015 | Takahashi et al. |
| 9,608,015 | B2 | 3/2017 | Kim et al. |
| 10,816,849 | B2 | 10/2020 | Lee et al. |
| 2005/0206308 | A1 | 9/2005 | Takahashi et al. |
| 2006/0113903 | A1 | 6/2006 | Kim |
| 2008/0284946 | A1 | 11/2008 | Abe et al. |
| 2011/0006316 | A1 | 1/2011 | Ing et al. |
| 2012/0074414 | A1 | 3/2012 | Lee et al. |
| 2012/0080714 | A1 | 4/2012 | Ikeda et al. |
| 2014/0145220 | A1 | 5/2014 | Seo et al. |
| 2021/0223631 | A1 | 7/2021 | Ban et al. |

FOREIGN PATENT DOCUMENTS

| | | |
|---|---|---|
| CN | 104347608 A | 2/2015 |
| CN | 104808833 A | 7/2015 |
| CN | 106483725 A | 3/2017 |
| CN | 108267891 A | 7/2018 |
| CN | 109597245 | 4/2019 |
| JP | 2005-268187 A | 9/2005 |
| JP | 2008-287892 A | 11/2008 |
| KR | 2012-0032904 | 4/2012 |
| KR | 20160010165 A | 1/2016 |
| KR | 10-1789145 | 10/2017 |
| KR | 2018-0079081 A | 7/2018 |

OTHER PUBLICATIONS

Notice of Allowance dated Oct. 21, 2022, issued to U.S. Appl. No. 16/892,611.
Extended European Search Report dated Oct. 2, 2020, issued in European Patent Application No. 20188068.9.
Extended European Search Report dated Aug. 2, 2022, issued in European Patent Application No. 20188068.9.
Notice of Allowance dated Jun. 14, 2023, issued to U.S. Appl. No. 18/102,757.
Chinese Office Action—Chinese Application No. CN 202010757437.5 dated Mar. 13, 2024, citing references listed within.

BACKLIGHT UNIT AND DISPLAY DEVICE INCLUDING THE SAME

CROSS REFERENCE TO RELATED APPLICATIONS

This application is a Continuation of U.S. patent application Ser. No. 18/102,757, filed on Jan. 29, 2023, which is a Continuation of U.S. patent application Ser. No. 16/892,611, filed on Jun. 4, 2020, now issued as U.S. Pat. No. 11,598,989, which claims priority from Korean Patent Application No. 10-2019-0093228, filed on Jul. 31, 2019, which are hereby incorporated by reference for all purposes as if fully set forth herein.

BACKGROUND

Field

Illustrative embodiments of the invention relate generally to a backlight unit and, more specifically, to a display device including the same.

Discussion of the Background

A non-luminous display device such as a liquid crystal display device generates an image using light provided from a backlight unit because a display panel for generating an image does not emit light by itself.

The backlight unit may include a light emitting element as a light source. The light emitting element may be provided in plurality, and each of the light emitting elements may be disposed on a substrate.

The above information disclosed in this Background section is only for understanding of the background of the inventive concepts, and, therefore, it may contain information that does not constitute prior art.

SUMMARY

In order to reduce material costs, there have been attempts to apply a substrate having a wiring layer formed on a separate base substrate instead of a printed circuit board as the substrate of the backlight unit in which the light emitting element is mounted.

Devices constructed according to illustrative embodiments of the invention are capable of providing a backlight unit having a simplified structure and a reduced manufacturing cost, and a display device including the same.

Additional features of the inventive concepts will be set forth in the description which follows, and in part will be apparent from the description, or may be learned by practice of the inventive concepts.

According to one or more illustrative embodiments of the invention, a backlight unit includes: a base substrate in which a light emitting area and a non-light emitting area are defined; a wiring layer including: a lower conductive layer disposed on the base substrate; an intermediate conductive layer disposed on the lower conductive layer; and an upper conductive layer disposed on the intermediate conductive layer; a light emitting element disposed on the wiring layer in the light emitting area; a connection member electrically connecting the light emitting element and the wiring layer, the connection member contacting the intermediate conductive layer of the wiring layer and the light emitting element; a backlight flexible substrate electrically connected to the wiring layer in the non-light emitting area; and a pad connection member electrically connecting the wiring layer and the backlight flexible substrate in the non-light emitting area, the pad connection member contacting the upper conductive layer of the wiring layer.

The backlight unit may further include: an insulating layer disposed between the wiring layer and the light emitting element; a contact hole exposing the intermediate conductive layer, the contact hole defined through the insulating layer and the upper conductive layer in the light emitting area; and a pad contact hole exposing the upper conductive layer, the pad contact hole defined through the insulating layer in the non-light emitting area, the connection member may be in contact with the intermediate conductive layer through the contact hole, and the pad connection member may be in contact with the upper conductive layer through the pad contact hole.

The backlight unit may further include: a reflective layer disposed directly on the insulating layer, the reflective layer including an opening, the light emitting element may be disposed in the opening in a plan view.

The backlight unit may further include: a capping layer disposed on the light emitting element, the capping layer covering the light emitting element; and a wavelength converter disposed on the capping layer.

The capping layer may be further disposed in a space between the light emitting element and the insulating layer.

The light emitting element may be configured to emit blue light, and the wavelength converter may include: a first wavelength shifter configured to convert the blue light into a red light; and a second wavelength shifter configured to convert the blue light into a green light.

The lower conductive layer and the upper conductive layer may include at least one of titanium and a titanium alloy, and the intermediate layer may include at least one of copper and a copper alloy.

The lower conductive layer may include: a first lower conductive pattern and a second lower conductive pattern disposed in the light emitting area, spaced apart from each other, the intermediate conductive layer may include a first intermediate conductive pattern and a second intermediate conductive pattern disposed in the light emitting area, spaced apart from each other, and the upper conductive layer may include a first upper conductive pattern and a second upper conductive pattern disposed in the light emitting area, spaced apart from each other, the first lower conductive pattern, the first intermediate conductive pattern, and the first upper conductive pattern may overlap each other, the second lower conductive pattern, the second intermediate conductive pattern, and the second upper conductive pattern may overlap each other, the light emitting element may include: a first electrode electrically connected to the first intermediate conductive pattern; and a second electrode electrically connected to the second intermediate conductive pattern; and a distance between the first lower conductive pattern and the second lower conductive pattern may be greater than a distance between the first upper conductive pattern and the second upper conductive pattern.

The upper conductive layer may further include a protrusion tip connected to the first upper conductive pattern, the protrusion tip disposed at an edge of the first upper conductive pattern facing the second upper conductive pattern and not contacting the first intermediate conductive pattern.

The backlight unit may further include: a switching element disposed between the base substrate and the wiring layer, the wiring layer may include: a first conductive pattern disposed in the light emitting area, connected to a first electrode of the light emitting element and the switching element; a second conductive pattern disposed in the light emitting area, connected to a second electrode of the light emitting element, spaced apart from the first conductive pattern; a pad disposed in the non-light emitting area, the pad contacting the pad connection member; and a connection pattern connected to the pad and the switching element.

According to one or more illustrative embodiments of the invention, a display device includes: a display panel; and a backlight unit providing light to the display panel, the backlight unit including: a base substrate in which a light emitting area and a non-light emitting area are defined; a wiring layer including: a lower conductive layer disposed on the base substrate; an intermediate conductive layer disposed on the lower conductive layer; and an upper conductive layer disposed on the intermediate conductive layer; a light emitting element disposed on the wiring layer in the light emitting area and configured to emit blue light; a connection member electrically connecting the light emitting element and the wiring layer, the connection member contacting the intermediate conductive layer of the wiring layer and the light emitting element; a backlight flexible substrate electrically connected to the wiring layer in the non-light emitting area; and a pad connection member electrically connecting the wiring layer and the backlight flexible substrate in the non-light emitting area, the pad connection member contacting the upper conductive layer of the wiring layer; and a wavelength converter disposed between the light emitting element and the display panel.

According to one or more illustrative embodiments of the invention, a backlight unit includes: a base substrate in which a light emitting area and a non-light emitting area are defined; a wiring layer including: a lower conductive layer disposed on the base substrate; and an upper conductive layer disposed on the lower conductive layer, the upper conductive layer contacting the lower conductive layer; a light emitting element disposed on the wiring layer in the light emitting area; a connection member electrically connecting the light emitting element and the wiring layer, the connection member contacting the light emitting element and the lower conductive layer of the wiring layer; a backlight flexible substrate electrically connected to the wiring layer in the non-light emitting area; and a pad connection member electrically connecting the wiring layer and the backlight flexible substrate in the non-light emitting area, the pad connection member contacting the upper conductive layer of the wiring layer.

The upper conductive layer of the wiring layer may be disposed only in the non-light emitting area.

A thickness of a portion of the lower conductive layer disposed in the light emitting area may be thinner than a thickness of a portion of the lower conductive layer disposed in the non-light emitting area.

The lower conductive layer may include at least one of aluminum (Al), an aluminum alloy, silver (Ag), a silver alloy, and gold (Au), and the upper conductive layer may include at least one of titanium and a titanium alloy.

The backlight unit may further include: an insulating layer disposed between the wiring layer and the light emitting element; a contact hole exposing the lower conductive layer, the contact hole defined through the insulating layer in the light emitting area; and a pad contact hole exposing the upper conductive layer, the pad contact hole defined through the insulating layer in the non-light emitting area, the connection member may be in contact with the lower conductive layer through the contact hole, and the pad connection member may be in contact with the upper conductive layer through the pad contact hole.

The backlight unit may further include: a capping layer disposed on the light emitting element and covering the light emitting element; a wavelength converter disposed on the capping layer; and a passivation layer covering the wavelength converter, a portion of the wavelength converter may be in contact with the insulating layer.

The wavelength converter may include a quantum dot.

A light emitting block including the plurality of light emitting elements may be defined on the wiring layer, the lower conductive layer may include a plurality of lower conductive patterns spaced apart from each other, and the plurality of light emitting elements included in the light emitting block may be connected in series to each other through the lower conductive pattern.

According to one or more illustrative embodiments of the invention, a display device includes: a display panel; and a backlight unit configured to provide light to the display panel, the backlight unit including: a base substrate in which a light emitting area and a non-light emitting area are defined; a wiring layer including: a lower conductive layer disposed on the base substrate; and an upper conductive layer disposed on the lower conductive layer, the upper conductive layer contacting the lower conductive layer; a light emitting element disposed on the wiring layer in the light emitting area; a connection member electrically connecting the light emitting element and the wiring layer, the connection member contacting the light emitting element and the lower conductive layer of the wiring layer and; a backlight flexible substrate electrically connected to the wiring layer in the non-light emitting area; and a pad connection member electrically connecting the wiring layer and the backlight flexible substrate in the non-light emitting area, the pad connection member contacting the upper conductive layer of the wiring layer; and a wavelength converter disposed between the light emitting element and the display panel, wherein a thickness of a portion of the lower conductive layer disposed in the light emitting area is thinner than a thickness of a portion of the lower conductive layer disposed in the non-light emitting area.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIGS. 10, 11, 12, 13, 14, 15, 16, 17, 18, 19, and 20 are cross-sectional views for explaining an illustrative process of manufacturing the backlight substrate shown in FIG. 5, in which FIGS. 10, 11, 12, 14, 15, 17, 18, 19, and 20 are stepwise cross-sectional views, FIG. 13 is an enlarged cross-sectional view of the portion Q3 of FIG. 12, and FIG. 16 is an enlarged cross-sectional view of the portion Q5 of FIG. 15.

FIGS. 39, 40, 41, 42, 43, 44, 45, and 46 are cross-sectional views for explaining another illustrative process of manufacturing the backlight substrate shown in FIG. 5, in which FIGS. 39, 40, 41, and 42 and 44, 45, and 46 are stepwise cross-sectional views, and FIG. 43 is an enlarged cross-sectional view of the portion Q9 of FIG. 42.

DETAILED DESCRIPTION

Figure 1:
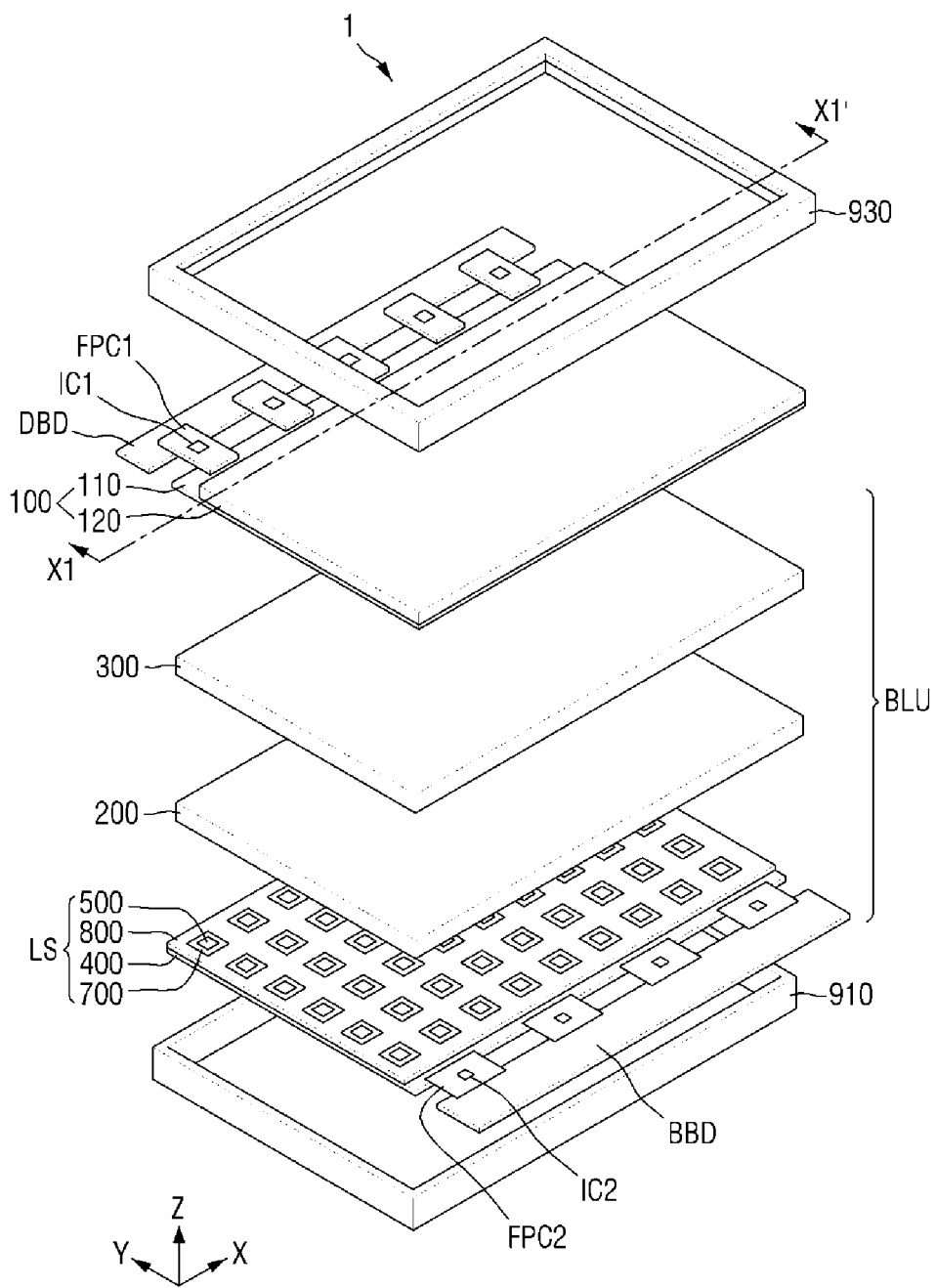
FIG. 1 is an exploded perspective view of a display device according to an illustrative embodiment.

In the following description, for the purposes of explanation, numerous specific details are set forth in order to provide a thorough understanding of various illustrative embodiments or implementations of the invention. As used herein "embodiments" and "implementations" are interchangeable words that are non-limiting examples of devices or methods employing one or more of the inventive concepts disclosed herein. It is apparent, however, that various illustrative embodiments may be practiced without these specific details or with one or more equivalent arrangements. In other instances, well-known structures and devices are shown in block diagram form in order to avoid unnecessarily obscuring various illustrative embodiments. Further, various illustrative embodiments may be different, but do not have to be exclusive. For example, specific shapes, configurations, and characteristics of an illustrative embodiment may be used or implemented in another illustrative embodiment without departing from the inventive concepts.

Unless otherwise specified, the illustrated illustrative embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When a illustrative embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z—axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/of" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the illustrative term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various illustrative embodiments are described herein with reference to sectional and/or exploded illustrations that are schematic illustrations of idealized illustrative embodiments and/or intermediate structures. As such, variations from the shapes of the illustrations as a result, for example, of manufacturing techniques and/or tolerances, are to be expected. Thus, illustrative embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, illustrative embodiments of the present invention will be described with reference to the attached drawings.

Figure 2:
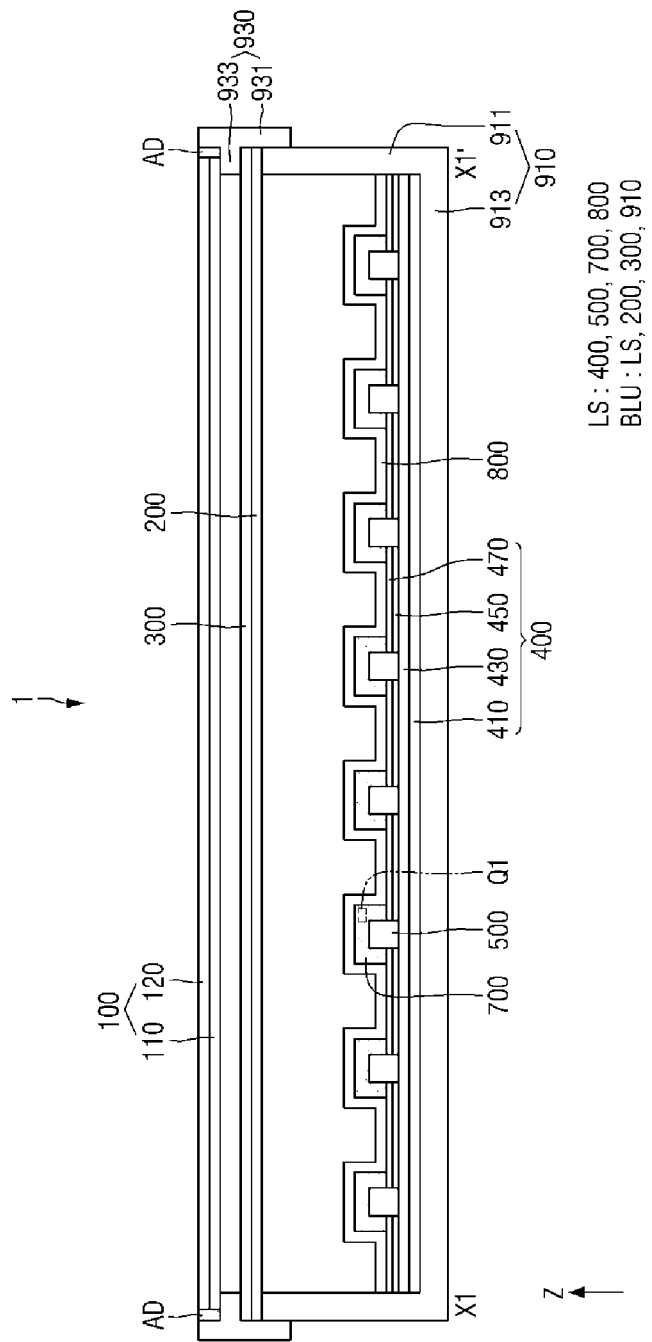
FIG. 2 is a schematic cross-sectional view of the display device taken along a sectional line X1-X1' in FIG. 1.
Figure 3:
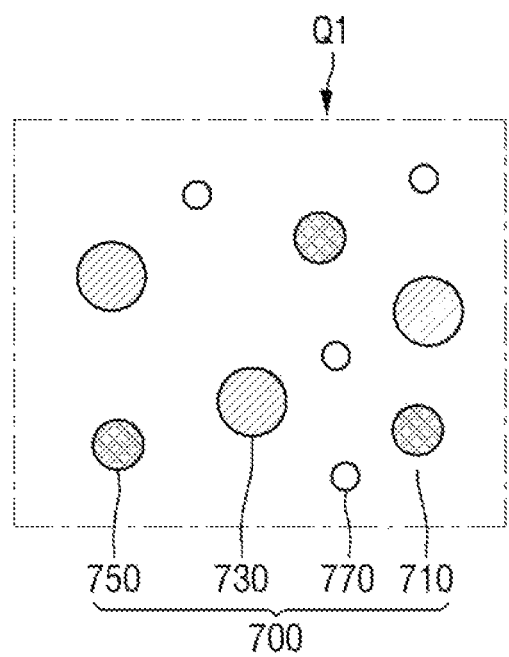
FIG. 3 is an enlarged cross-sectional view of the portion Q1 in FIG. 2.
Figure 4:
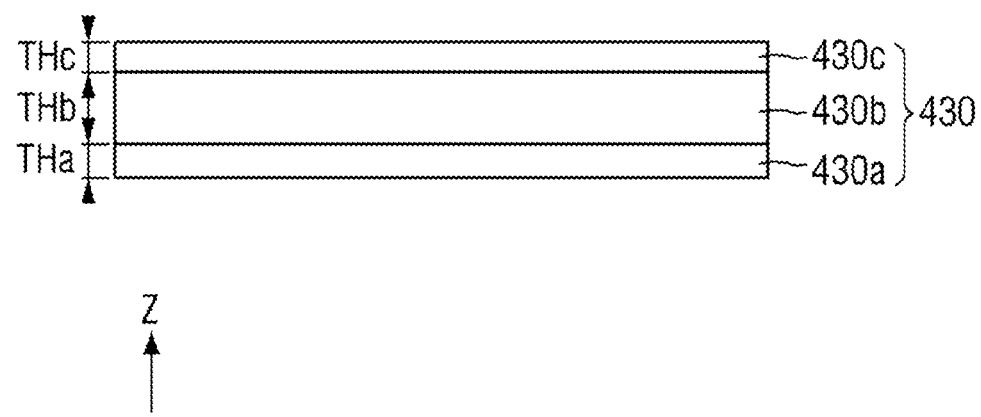
FIG. 4 is an enlarged cross-sectional view of the wiring layer of FIG. 2.

FIG. 1 is an exploded perspective view of a display device according to a illustrative embodiment, FIG. 2 is a schematic cross-sectional view of the display device taken along a sectional line X1-X1' in FIG. 1, FIG. 3 is an enlarged cross-sectional view of the portion Q1 in FIG. 2, and FIG. 4 is an enlarged cross-sectional view of the wiring layer of FIG. 2.

Referring to FIGS. 1, 2, 3, and 4, a display device 1, which is a device for display an image, may be applied to various electronic appliances such as tablet PCs, smart phone, car navigation units, cameras, center information displays (CIDs) for cars, wrist watch-type electronic devices, personal digital assistant (PDAs), portable multimedia players (PMPs), game machines, televisions, outside billboards, monitors, personal computers, and notebook computers. These appliances are provided only as examples, and it should be understood that this display device can be applied to other electronic appliances as long as it does not depart from the concept of the present invention.

In the drawings, a first direction X, a second direction Y, and a third direction Z are defined. The first direction X and the second direction Y may be directions perpendicular to each other in one plane. The third direction Z may be a direction perpendicular to the plane in which the first direction X and the second direction Y are located. The third direction Z is perpendicular to each of the first direction X and the second direction Y. In illustrative embodiments, the third direction Z represents a thickness direction of the display device 1.

Unless otherwise stated in illustrative embodiments, the "upper portion or upper side" in the drawings represents a thickness direction (upper side in the drawings) of the display device 1 toward one side of the third direction Z, and the "upper surface" in the drawings represents a surface of the display device 1 toward one side of the third direction Z. Further, the "lower portion or lower side" in the drawings represents a direction (lower side in the drawings) opposite to the thickness direction of the display device 1 toward the other side of the third direction Z, and the "lower surface" in the drawings represents a surface of the display device 1 toward the other side of the third direction Z.

The display device 1 may have a rectangular shape including long sides and short sides in which sides in the first direction X are longer than sides in the second direction Y in a plane view. In the display device 1, a corner where the long side meets the short side may have a right-angled shape, but is not limited thereto, and may also have a rounded curve shape. The planar shape of the display device 1 is not limited to that exemplified, and examples thereof may include a square, a circle, an ellipse, and other shapes. The display surface of the display device 1 may be defined on one side of the third direction Z, which is a thickness direction.

The display device 1 includes a display panel 100 and a backlight unit BLU, and may further include a panel guide 930, a panel flexible substrate FPC1, a driving chip IC1, and a panel driving board DBD.

The display panel 100 may be a panel member including an element for allowing the display device 1 to implement an image display. In a illustrative embodiment, the display panel 100 may be a liquid crystal display panel, and may include a lower substrate 110, an upper substrate 120, and a liquid crystal layer (not shown) disposed between the lower substrate 110 and the upper substrate 120. However, the present invention is not limited thereto, and another display panel requiring a backlight unit for displaying an image may also be used at the display panel 100. The lower substrate 110 and the upper substrate 120 may be attached to each other by a sealing member (not shown) such as a sealant.

The panel flexible substrate FPC1 may electrically connect the panel driving board DBD and the display panel 100 to each other. Illustratively, input terminals provided on one side of the panel flexible substrate FPC1 may be connected to the panel driving board DBD, and the other side of the panel flexible substrate FPC1 may be connected to a pad portion provided on the lower substrate 110 of the display panel 100. In some illustrative embodiments, the panel flexible substrate FPC1 may be bent to reduce the bezel region of the display device 1. For example, the panel flexible substrate FPC1 may be formed of a tape carrier package (TCP), a chip on flexible board (COFB), or a chip on film (COF).

In some illustrative embodiments, a plurality of panel flexible substrates FPC1 may be provided.

The driving chip IC1 may be mounted on the panel flexible substrate FPC1. The driving chip IC1 may receive pixel data and a data control signal from the panel driving board DBD, convert the pixel data into an analog data signal for each pixel according to the data control signal, and supply the analog data signal to the data line.

The panel driving board DBD may provide a signal for controlling the driving of the display panel 100 and a power to the display panel 100. In some illustrative embodiments, the panel driving board DBD may include a timing controller. The panel driving board DBD may provide a control signal for displaying an image to each pixel and a driving power to the driving chip IC1 and the scan driver (not shown) of the display panel 100. In some illustrative embodiments, the panel driving board DBD may be formed of a printed circuit board.

The panel guide 930 may surround the edge of the lower surface of the display panel 100 to support and protect the display panel 100. In some illustrative embodiments, the panel guide 930 may include a sidewall 931 and a protrusion 933 protruding inward from the sidewall 931. The sidewall 931 may surround the edge of the display panel 100. The protrusion 933 may support the display panel 100. That is, the display panel 100 may be located on the protrusion 933.

In some illustrative embodiments, a panel protection member AD may be located on the side surface of the display panel 100. The panel protection member AD may protect the side surface or edge of the display panel 100. The panel protection member AD may be made of a silicone-based or ultraviolet (UV) curing-based sealing agent (or resin). In some illustrative embodiments, the panel protection member 130 may be made of a colored resin or a light blocking resin to prevent or suppress the light leakage of the side surface of the display panel 100. The panel protection member 130 may be inserted into a space between the sidewall 931 of the panel guide 930 and the edge of the display panel 100, and the panel protection member 130 may couple the display panel 100 to the sidewall 931 of the panel guide 930.

The backlight unit BLU is disposed under the display panel 100.

The backlight unit BLU may include a backlight substrate LS, and may further include a backlight flexible substrate FPC2, a first optical member 200, a second optical member 300, a backlight driving chip IC2, a backlight driving board BBD, and a bottom chassis 910.

The backlight substrate LS may supply light to the display panel 100.

In some illustrative embodiments, the backlight substrate LS may include a light source substrate 400 and a light emitting element 500, and the backlight substrate LS may further include a wavelength converter 700 and a passivation layer 800.

The light source substrate 400, which is a substrate for mounting a light emitting element, may include a base substrate 410, a wiring layer 430 disposed on the base substrate 410, and an insulating layer 450 disposed on the wiring layer 430, and may further include a reflective layer 470 disposed on the insulating layer 450.

The base substrate 410 may support the components disposed thereon, for example, the wiring layer 430 and the light emitting element 500. In some illustrative embodiments, the base substrate 410 may be a glass substrate, and may be rigid.

The wiring layer 430 is disposed on the base substrate 410. The wiring layer 430 may include wirings or conductors connected to the light emitting element 500.

The wiring layer 430 may have a structure in which a plurality of conductive layers are stacked. For example, the wiring layer 430 may have a structure in which three conductive layers are stacked. In some illustrative embodiments, the wiring layer 430 may include a lower conductive layer 430a, an intermediate conductive layer 430b, and an upper conductive layer 430c, as shown in FIG. 4.

The lower conductive layer 430a may be disposed on the base substrate 410. In some illustrative embodiments, the coupling force between the lower conductive layer 430a and the base substrate 410 may be greater than the coupling force between the second conductive layer 430b and the base substrate 410. That is, the lower conductive layer 430a may improve the coupling force between the wiring layer 430 and the base substrate 410.

In some illustrative embodiments, the lower conductive layer 430a may be made of titanium (Ti) or a titanium alloy. In some illustrative embodiments, the thickness THa of the lower conductive layer 430a may be 10 nm to 30 nm.

The intermediate conductive layer 430b may be disposed on the lower conductive layer 430a, and the intermediate conductive layer 430b may be in contact with the lower conductive layer 430a. Hereinafter, the term "contact" may mean a case where two components physically directly contact each other.

In some illustrative embodiments, the intermediate conductive layer 430b may be made of a material having excellent electrical conductivity for fast response speed and stable backlight configuration. In some illustrative embodiments, the intermediate conductive layer 430b may include copper (Cu) or a copper alloy. In some illustrative embodiments, the thickness THb of the intermediate conductive layer 430b may be thicker than the thickness THa of the lower conductive layer 430a. Illustratively, the thickness THb of the intermediate conductive layer 430b may be 600 nm to 800 nm.

The upper conductive layer 430c may be disposed on the intermediate conductive layer 430b, and the upper conductive layer 430c may be in contact with the intermediate conductive layer 430b. In some illustrative embodiments, the upper conductive layer 430c may function as a capping layer for capping the intermediate conductive layer 430b. When the intermediate conductive layer 430b is oxidized or corroded, the electrical conductivity of the intermediate conductive layer 430b may be deteriorated. In particular, when the intermediate conductive layer 430b is made of an easily-oxidizable material such as copper, electrical conductivity characteristics may be deteriorated.

In some illustrative embodiments, the upper conductive layer 430c may be made of a conductive material having better corrosion resistance than the intermediate conductive layer 430b. For example, the upper conductive layer 430c may be made of titanium (Ti) or a titanium alloy. In some illustrative embodiments, the thickness THc of the upper conductive layer 430c may be 10 nm to 30 nm.

The insulating layer 450 may be disposed on the upper conductive layer 430c. The insulating layer 450 may provide a flat surface between the wiring layer 430 and the light emitting element 500 and may define a connection portion between the wiring layer 430 and the light emitting element 500. In some illustrative embodiments, the insulating layer 450 may include a first insulating layer and a second insulating layer, as will be described below.

The reflective layer 470 may be disposed on the insulating layer 450. The reflective layer 470 may reflect the light traveling toward the opposite side of the display panel 100 among the light emitted from the light emitting element 500 and guide the light toward the display panel 100.

In some illustrative embodiments, the reflective layer 470 may be formed by printing reflective ink on the upper surface of the insulating layer 450 by using a silk screening or the like. However, the present invention is not limited thereto, and the reflective layer 470 may be formed by depositing or applying a reflective material such as a metal, for example, a metal having reflectance such as aluminum, silver, or gold on the insulating layer 450.

The reflective layer 470 may include an opening OPN formed in a portion corresponding to the light emitting element 500, as will be described later.

The light emitting element 500 may be disposed on the insulating layer 450. A plurality of light emitting elements 500 may be disposed on the light source substrate 400 and may be spaced apart from each other.

The light emitting element 500 may be coupled to the light source substrate 400 and may be electrically connected to the wiring layer 430. The light emitting element 500 may receive a voltage and an electrical signal such as a driving signal through the wiring layer 430 to emit light.

In some illustrative embodiments, the light emitting element 500 may be a light emitting diode (LED). A detailed structure of the light emitting element 500 will be described later.

The light emitting element 500 may receive an electrical signal from the wiring layer and emit light of a specific wavelength band. In some illustrative embodiments, the light emitting element 500 may emit light having a first peak wavelength range. In some illustrative embodiments, the first peak wavelength rang may be about 420 nm to 480 nm, and the light emitted from the light emitting element 500 may be blue light.

The wavelength converter 700 may be disposed on the light emitting element 500. The wavelength converter 700 may be disposed between the light emitting element 500 and the display panel 100.

The wavelength converter 700 may convert the wavelength of light emitted from the light emitting element 500. Illustratively, the wavelength converter 700 may convert light having a first peak wavelength emitted from the light emitting element 500 into light having a second peak wavelength longer than the first peak wavelength and light having a third peak wavelength longer than the first peak wavelength and different from the second peak wavelength. In some illustrative embodiments, the range of the second peak wavelength may be about 610 nm to about 670 nm, and the light having the second peak wavelength may be red light. The range of the third peak wavelength may be about 510 nm to about 570 nm, and the light having the third peak wavelength may be green light. Accordingly, the light transmitted through the wavelength converter 700 among the light emitted from the light emitting element 500 may be white light in which red light, green light, and blue light are mixed.

In some illustrative embodiments, the wavelength converter 700 may cover each light emitting element 500, and the adjacent wavelength converters 700 may be spaced apart from each other. Illustratively, the wavelength converter 700 may be formed in an island shape on a plane. However, the present invention is not limited thereto. In another illustrative embodiment, the wavelength converter 700 may be provided on a separate optical member located between the light emitting element 500 and the display panel 100.

As shown in FIG. 3, the wavelength converter 700 may include a base resin 710, and first wavelength shifters 730 and second wavelength shifters 750 dispersed in the base resin 710. The wavelength converter 700 may further include scatterers 770 dispersed in the base resin 710.

The base resin 710 may be made of a material having high light transmittance. In some illustrative embodiments, the base resin 710 may be made of an organic material. For example, the base resin 710 may include an organic material such as an epoxy resin, an acrylic resin, a cardo resin, or an imide resin.

The scatterer 770 may have a different refractive index from the base resin 710, and the scatterer 770 may form an optical interface together with the base resin 710. For example, the scatterer 770 may be a light scattering particle. The scatterer 770 may be made of a material capable of scattering at least a part of transmitted light. Illustratively, the scatterers 770 may be made of metal oxide particles or organic particles. Examples of the metal oxides may include titanium oxide ($TiO_2$), zirconium oxide ($ZrO_2$), aluminum oxide ($Al_2O_3$), indium oxide ($In_2O_3$), zinc oxide (ZnO), and tin oxide ($SnO_2$), and examples of the materials of the organic particles may include acrylic resins and urethane resins.

The scatterer 770 may scatter incident light in a random direction without substantially converting the wavelength of light transmitted through the wavelength converter 700.

The first wavelength shifter 730 may convert or shift the peak wavelength of incident light into another specific peak wavelength. In some illustrative embodiments, the first wavelength shifter 730 may convert blue light provided from the light emitting element 500 into red light having a single peak wavelength in a range of about 610 nm to about 670 nm.

Examples of the first wavelength shifter 730 may include a quantum dot, a quantum rod, and a phosphor. For example, the quantum dot may be a particulate matter that emits light of a specific color while electrons transition from a conduction band to a valence band.

The quantum dot may be a semiconductor nanocrystalline material. The quantum dot may have a specific band gap according to its composition and size to absorb light and then emit light having a unique wavelength. Examples of semiconductor nanocrystals of the quantum dots may include group IV compound nanocrystals, group II-VI compound nanocrystals, group III-V compound nanocrystals, group IV-VI compound nanocrystals, and combinations thereof.

The group II-VI compound may be selected from two-element compounds selected from the group consisting of CdSe, CdTe, ZnS, ZnSe, ZnTe, ZnO, HgS, HgSe, HgTe, MgSe, MgS and mixtures thereof; three-element compounds selected from the group consisting of InZnP, AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and mixtures thereof; and four-element compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and mixtures thereof.

The group III-V compound may be selected from two-element compounds selected from the group consisting of GaN, GaP, GaAs, GaSb, AlN, AlP, AlAs, AlSb, InN, InP, InAs, InSb and mixtures thereof; three-element compounds selected from the group consisting of GaNP, GaNAs, GaNSb, GaPAs, GaPSb, AlNP, AlNAs, AlNSb, AlPAs, AlPSb, InGaP, InNP, InAlP, InNAs, InNSb, InPAs, InPSb, GaAlNP, and mixtures thereof; and four-element compound selected from the group consisting of GaAlNAs, GaAlNSb, GaAlPAs, GaAlPSb, GaInNP, GaInNAs, GaInNSb, GaIn- PAs, GaInPSb, InAlNP, InAlNAs, InAlNSb, InAlPAs, InAlPSb, and mixtures thereof.

The group IV-VI compound may be selected from two-element compounds selected from the group consisting of SnS, SnSe, SnTe, PbS, PbSe, PbTe and mixtures thereof; three-element compounds selected from the group consisting of SnSeS, SnSeTe, SnSTe, PbSeS, PbSeTe, PbSTe, SnPbS, SnPbSe, SnPbTe, and mixtures thereof; and four-element compound selected from the group consisting of SnPbSSe, SnPbSeTe, SnPbSTe, and mixtures thereof. The group IV element may be selected from the group consisting of Si, Ge, and mixtures thereof. The group IV compound may be a two-element compound selected from the group consisting of SiC, SiGe, and mixtures thereof.

In this case, the two-element compound, the three-element compound, or the four-element compound may be present in the particles at a uniform concentration, or may be present in the same particle by being partially divided in a concentration distribution. There may be provided a core-shell structure in which one quantum dot surrounds another quantum dot. The interface between the core and the shell may have a concentration gradient where the concentration of elements in the shell decreases toward the center.

In some illustrative embodiments, the quantum dot may have a core-shell structure including a core including the aforementioned nanocrystals and a shell surrounding the core. The shell of the quantum dot may serve as a protective layer for preventing or suppressing the chemical denaturation of the core to maintain semiconductor characteristics and/or as a charging layer for imparting electrophoretic characteristics to the quantum dot. The shell may be a single layer or a multiple layer. The interface between the core and the shell may have a concentration gradient where the concentration of elements in the shell decreases toward the center. Examples of the shell of the quantum dot include oxides of metals or nonmetals, semiconductor compounds, or combinations thereof.

Examples of the oxides of metals or nonmetals may include, but are not limited to, two-element compounds such as $SiO_2$, $Al_2O_3$, $TiO_2$, $ZnO$, $MnO$, $Mn_2O_3$, $Mn_3O_4$, $CuO$, $FeO$, $Fe_2O_3$, $Fe_3O_4$, $CoO$, $Co_3O_4$, and $NiO$; and three-element compounds such as $MgAl_2O_4$, $CoFe_2O_4$, $NiFe_2O_4$, $CoMn_2O_4$.

Examples of the semiconductor compounds may include, but are not limited to, CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, and AlSb.

The light emitted by the first wavelength shifter 730 may have a full width of half maximum (FWHM) of about 45 nm or less, about 40 nm or less, or about 30 nm or less. The light emitted by the first wavelength shifter 730 may be emitted in various directions irrespective of the incident direction of incident light. Thus, side visibility of the display device 1 may be improved.

The second wavelength shifter 750 may convert or shift the peak wavelength of incident light to another specific peak wavelength. In some illustrative embodiments, the second wavelength shifter 750 may convert the blue light provided by the light emitting element 500 into green light having a peak wavelength in a range of 510 nm to 570 nm.

Examples of the second wavelength shifter 750 may include a quantum dot, a quantum rod, and a phosphor. A more detailed description of the second wavelength shifter 750 is substantially the same as or similar to that described above in the description of the first wavelength shifter 730, and thus will be omitted.

In some illustrative embodiments, both the first wavelength shifter 730 and the second wavelength shifter 750 may be formed of quantum dots. In this case, the particle size of the quantum dot forming the first wavelength shifter 730 may be larger than the particle size of the quantum dot forming the second wavelength shifter 750.

The passivation layer 800 may be disposed on the wavelength converter 700. The passivation layer 800 may cover the wavelength converter 700. In some illustrative embodiments, the passivation layer 800 may be disposed on the entire surface of the light source substrate 400 to completely cover the wavelength converter 700.

The passivation layer 800 may prevent or suppress moisture, oxygen, and other impurities from penetrating into the wavelength converter 700 from the outside. That is, the passivation layer 800 may prevent or protect the wavelength converter 700 from being damaged or contaminated due to external factors. In some illustrative embodiments, the passivation layer 800 may be made of a light-transmittable inorganic material. For example, the passivation layer 800 may be made of silicon nitride, aluminum nitride, zirconium nitride, titanium nitride, hafnium nitride, tantalum nitride, silicon oxide, aluminum oxide, titanium oxide, tin oxide, cerium oxide, or silicon oxynitride.

The backlight flexible substrate FPC2 may electrically connect the backlight driving board BBD and the backlight substrate LS to each other. Illustratively, input terminals provided on one side of the backlight flexible substrate FPC2 may be connected to the backlight driving board BBD, and the other side of the backlight flexible substrate FPC2 may be connected to pads included in the wiring layer 430 of the backlight substrate LS. In some illustrative embodiments, the backlight flexible substrate FPC2 may be bent in a downward direction of the backlight unit BLU. For example, the backlight flexible substrate FPC2 may be formed of a tape carrier package (TCP), a chip on flexible board (COFB), or a chip on film (COF).

In some illustrative embodiments, a plurality of backlight flexible substrates FPC2 may be provided.

The backlight driving chip IC2 may be mounted on the backlight flexible substrate FPC2. The backlight driving chip IC2 may receive a control signal for driving a backlight unit or a control signal for controlling a light emitting element from the backlight driving board BBD, process these signals, and provide the processed signals to the backlight substrate LS.

The backlight driving board BBD may provide a signal for controlling the driving of the backlight substrate LS and a power to the backlight substrate LS. In some illustrative embodiments, the backlight driving board BBD may generate a control signal for local dimming driving or local boosting driving of the backlight substrate LS. In some illustrative embodiments, the backlight driving board BBD may be formed of a printed circuit board, and the backlight driving board BBD may include a power supply unit for supplying a power or a voltage to the light emitting element 500.

The first optical member 200 may be disposed on the backlight substrate LS. In some illustrative embodiments, the first optical member 200 may be a diffusion plate or a diffusion sheet. The first optical member 200 may function to diffuse light provided from the backlight substrate LS, thereby supplying more uniform light to the display panel 100.

The second optical member 300 may be disposed on the first optical member 200. The second optical member 300 may perform optical functions such as focusing, refraction, diffusion, reflection, polarization, and phase delay with respect to incident light. Examples of the second optical member 300 may include a prism film, a microlens film, a lenticular film, a polarizing film, a reflective polarizing film, a retardation film, and a protective film. In some illustrative embodiments, the second optical member 300 may include a plurality of optical films. Alternatively, the second optical member 300 may be formed of a composite sheet in which layers having a plurality of optical functions are integrated.

The bottom chassis 910 may accommodate the backlight substrate LS. In some illustrative embodiments, the bottom chassis 910 may include a bottom portion 911 and a sidewall portion 913.

In some illustrative embodiments, the bottom chassis 910 may include a material having predetermined rigidity and excellent thermal conductivity. For example, the bottom chassis 910 may include a metal material such as iron, copper, aluminum, or an alloy thereof. In some illustrative embodiments, the surface of the bottom chassis 910 may be plated or coated with zinc or the like. Since the bottom chassis 910 is made of a material having excellent thermal conductivity, heat generated from the backlight substrate LS or the light emitting element 500 may be discharged to the outside through the bottom chassis 910.

In some illustrative embodiments, the backlight substrate LS may be disposed in a space defined by the bottom portion 911 and the sidewall portion 913, and the first optical member 200 and the second optical member 330 may be disposed on the sidewall portion.

Figure 5:
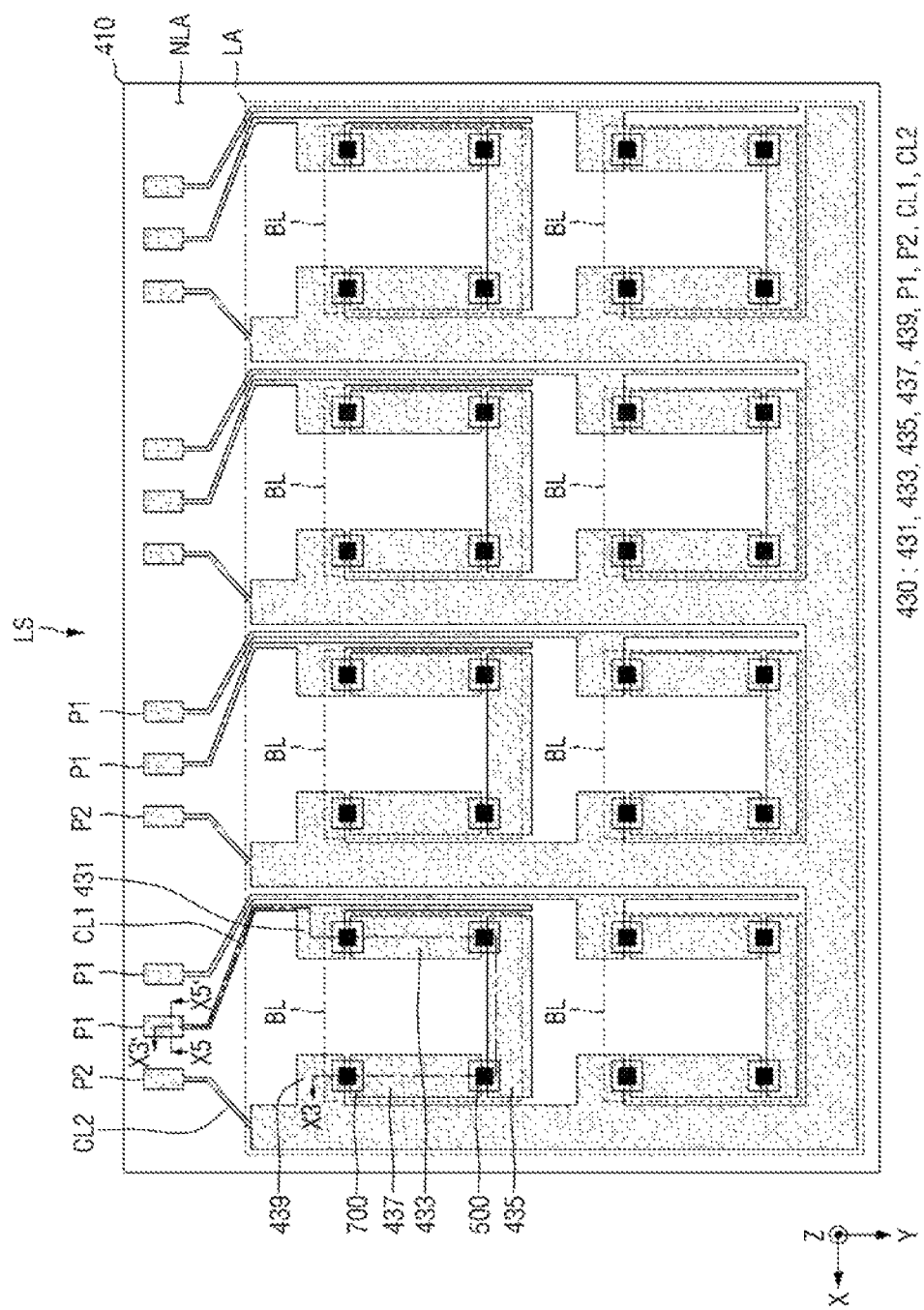
FIG. 5 is a plan view of the backlight substrate shown in FIGS. 1 and 2.
Figure 6:
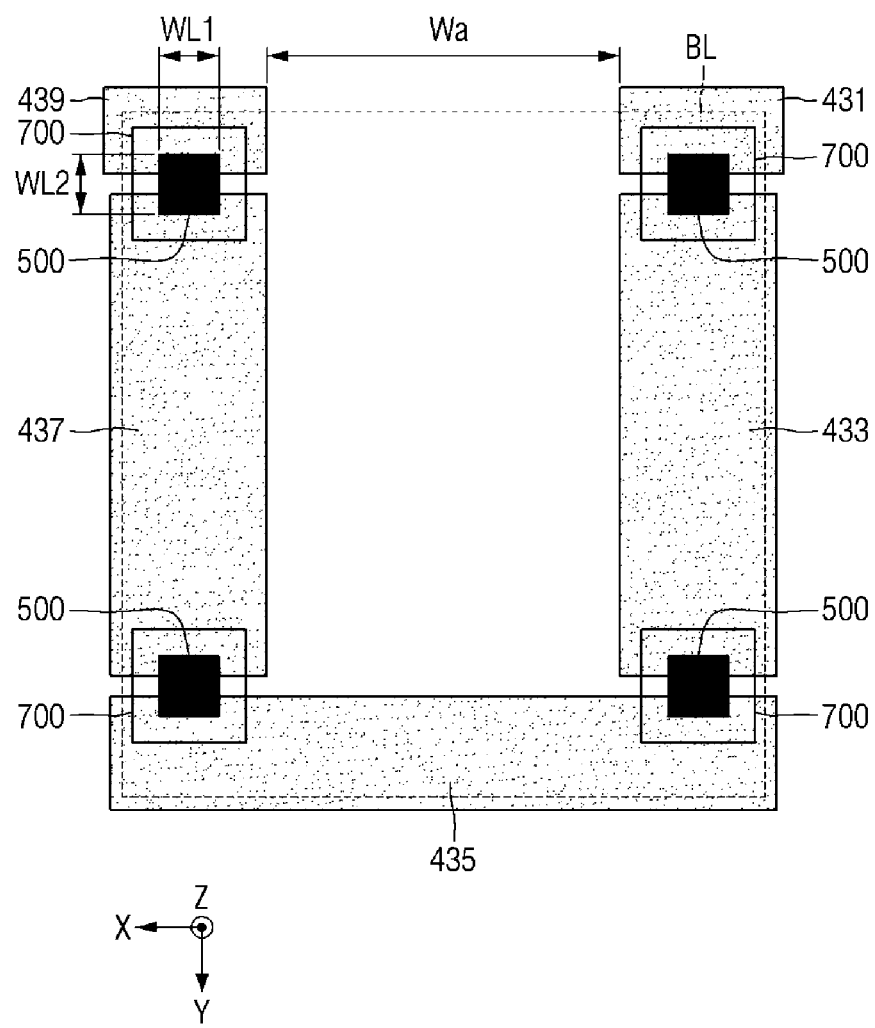
FIG. 6 is an enlarged plan view of any one of the light emitting groups shown in FIG. 5.
Figure 7:
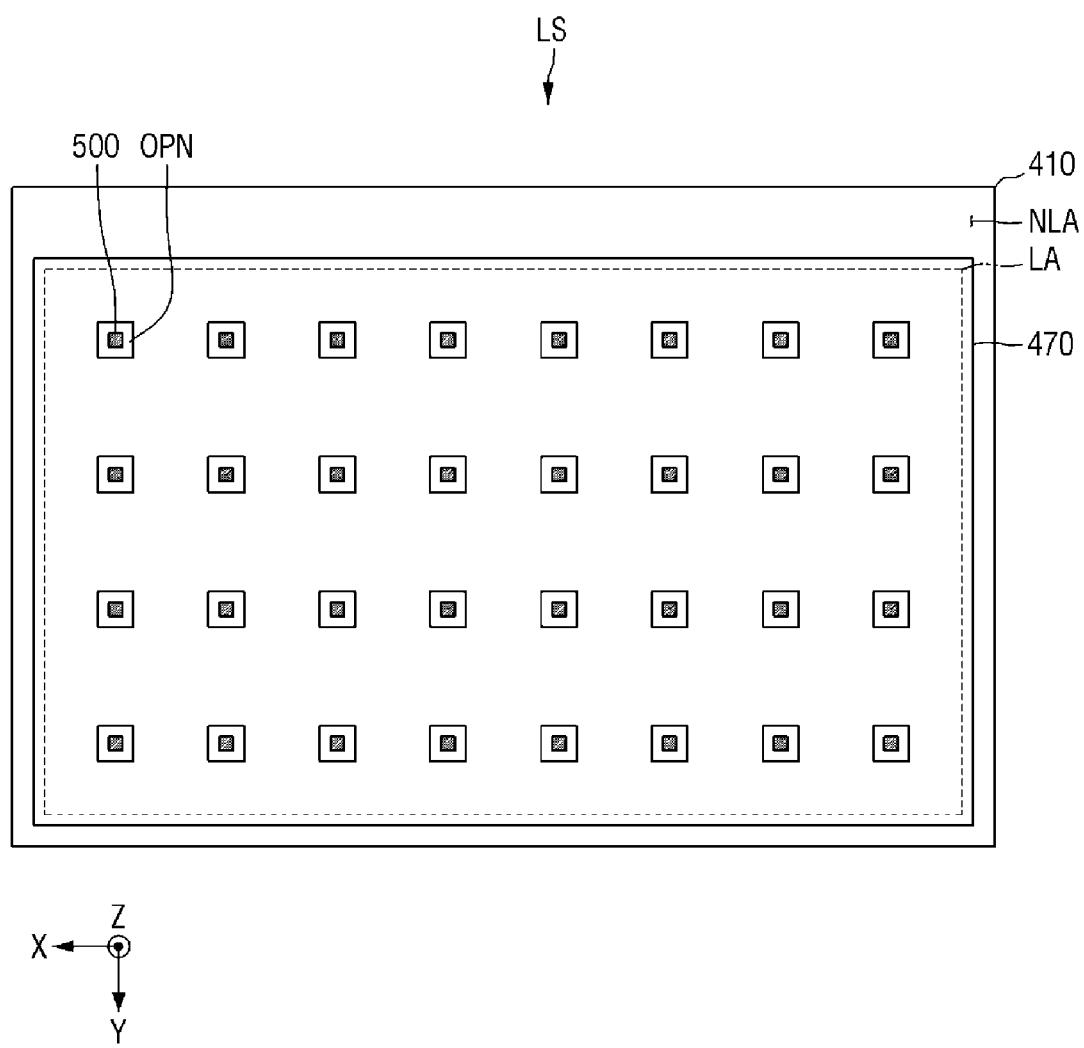
FIG. 7 is a plan view showing a reflective layer of the backlight substrate shown in FIGS. 1 and 2 together with a light source.
Figure 8:
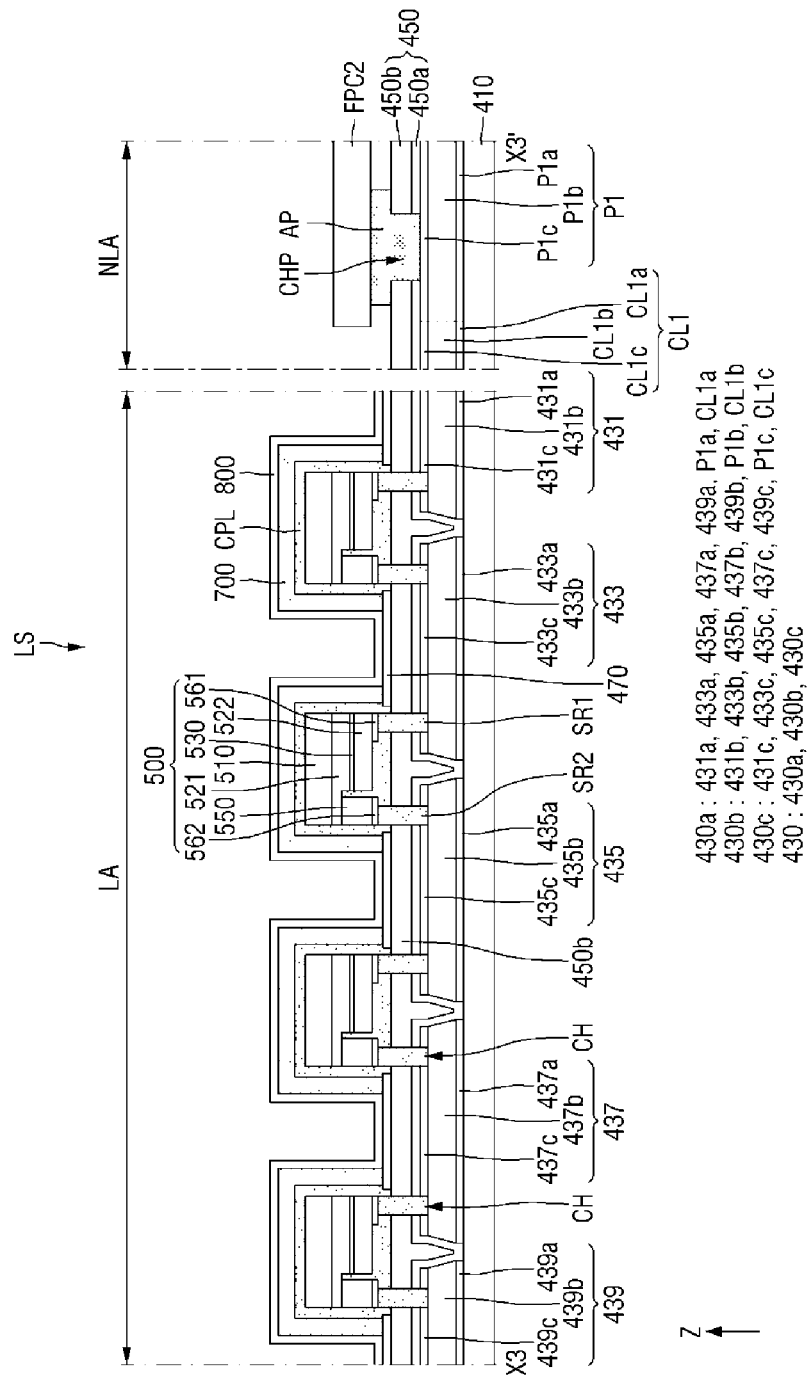
FIG. 8 is a cross-sectional view of the backlight substrate taken along a sectional line X3-X3' of FIG. 5.
Figure 9:
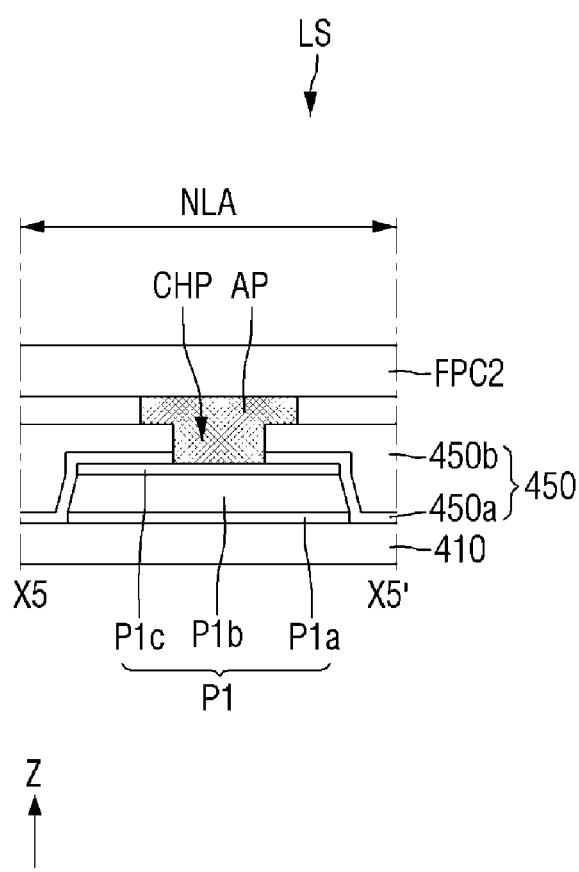
FIG. 9 is a cross-sectional view of the backlight substrate taken along a sectional line X5-X5' of FIG. 5.

FIG. 5 is a plan view of the backlight substrate shown in FIGS. 1 and 2 in which a wiring layer, a light emitting element, and a wavelength converter are shown, FIG. 6 is an enlarged plan view of any one of the light emitting groups shown in FIG. 5, FIG. 7 is a plan view showing a reflective layer of the backlight substrate shown in FIGS. 1 and 2 together with a light source, FIG. 8 is a cross-sectional view of the backlight substrate taken along a sectional line X3-X3' of FIG. 5, and FIG. 9 is a cross-sectional view of the backlight substrate taken along a sectional line X5-X5' of FIG. 5.

Referring to FIGS. 5, 6, 7, and 8, a light emitting area LA and a non-light emitting area NLA may be defined in the base substrate 410. The light emitting area LA may be an area in which the light emitting element 500 is disposed to supply light to the display panel. The non-light emitting area NLA is an area in which the light emitting element 500 is not disposed and not to emit light. In some illustrative embodiments, the non-light emitting area NLA may be located around the light emitting area LA, and may surround the light emitting area LA.

The light emitting element 500 may be provided with the light emitting element 500, and a plurality of light emitting elements 500 may be arranged in the light emitting area LA. In some illustrative embodiments, each of the light emitting elements 500 may be connected to the wiring layer 430 through a first connection member SR1 and a second connection member SR2. In some illustrative embodiments, the first connection member SR1 and the second connection member SR2 may be solder bumps. That is, in some illustrative embodiments, the light emitting element 500 may be soldered to the wiring layer 430 by a flip chip bonding method, but the present invention is not limited thereto.

In some illustrative embodiments, the width WL1 of each light emitting element 500 in the first direction X on the plane may be 100 µm to 700 µm. Further, the width WL2 of each light emitting element 500 in the second direction Y on the plane may be 100 µm to 700 µm.

The light emitting element 500 may include a base portion 510, a first conductive semiconductor layer 521, a second conductive semiconductor layer 522, an active material layer 530, a first electrode 561, and a second electrode 562, and may further include an auxiliary layer 550.

The base portion 510 may support the semiconductor crystals of the light emitting element 500. In an illustrative embodiment, the base portion 510 may be a transparent substrate. In some illustrative embodiments, the base portion 510 may be a sapphire substrate or a glass substrate. However, the present invention is not limited thereto, and the base portion 510 may include a material such as GaN, SiC, ZnO, Si, GaP, or GaAs.

The first conductive semiconductor layer 521 is disposed on the base portion 510. In some illustrative embodiments, the first conductive semiconductor layer 521 may be an n-type semiconductor layer. Illustratively, when the light emitting element 500 emits blue light, the first conductive semiconductor layer 521 may include a semiconductor material have a chemical formula of $In_xAl_yGa_{1-x-y}N$ ($0 \le x \le 1$, $0 \le y \le 1$, $0 \le x+y \le 1$). For example, the first conductive is semiconductor layer 521 may include at least one of InAlGaN, GaN, AlGaN, InGaN, AlN, and InN, which are doped with an n-type dopant. The first conductive semiconductor layer 521 may be doped with a first conductive dopant. For example, the first conductive dopant may be Si, Ge, Sn, or the like.

The first conductive semiconductor layer 521 may have a shape in which at least a portion of one surface of the first conductive semiconductor layer 521 is recessed inward. The auxiliary layer 550 may be disposed on the recessed upper surface of the first conductive semiconductor layer 521, and the first electrode 561 may be disposed on the auxiliary layer 550. The auxiliary layer 550 may compensate for a step between the first electrode 561 and the second electrode 562 disposed on the second conductive semiconductor layer 522. In some illustrative embodiments, the auxiliary layer 550 may include a conductive material or a semiconductor material, and the auxiliary layer 550 may transmit an electrical signal applied to the first electrode 561 to the first conductive semiconductor layer 521.

The second conductive semiconductor layer 522 may be a p-type semiconductor layer. Illustratively, when the light emitting element 500 emits blue light, the second conductive semiconductor layer 522 may include a semiconductor material have a chemical formula of $In_xAl_yGa_{1-x-y}N$ ($0 \le x \le 1$, $0 \le y \le 1$, $0 \le x+y \le 1$). For example, the second conductive semiconductor layer 522 may include at least one of InAlGaN, GaN, AlGaN, InGaN, AlN, and InN, which are doped with a p-type dopant. The second conductive semiconductor layer 522 may be doped with a second conductive dopant. For example, the second conductive dopant may be Mg, Zn, Ca, Se, Ba, or the like.

The active material layer 530 is disposed between the first conductive semiconductor layer 521 and the second conductive semiconductor layer 522. The active material layer 530 may include a material having a single or multiple quantum well structure. When the active material layer 530 includes a material having a single or multiple quantum well structure, the active material layer 530 may have a structure in which a plurality of quantum layers and a plurality of well layers are alternately stacked. The active material layer 530 may emit light by the combination of electron-hole pairs according to an electrical signal applied through the first conductive semiconductor layer 521 and the second conductive semiconductor layer 522. For example, when the light emitting element 500 emits blue light, the active material layer 530 may include a material such as AlGaN or AlInGaN. In particular, when the active material layer 530 has a multiple quantum well structure in which quantum layers and well layers are alternately stacked, the quantum layer may include a material such as AlGaN or AlInGaN, and the well layer may include a material such as GaN or AlGaN. However, the present invention is not limited thereto, and the active material layer 530 may include other Group 3 to Group 5 semiconductor materials depending on the wavelength band of emitted light.

The first electrode 561 may be disposed on the auxiliary layer 550, and the second electrode 562 may be disposed on the second conductive semiconductor layer 522. The first electrode 561 and the second electrode 562 may be made of a conductive material such as metal.

In some illustrative embodiments, the first electrode 561 may be electrically connected to the wiring layer 430 through the first connection member SR1, and the second electrode 562 may be electrically connected to the wiring layer 430 through the second connection member SR2. The first electrode 561 and the second electrode 562 may transmit an electrical signal such as a voltage provided from the wiring layer 430 to the first conductive semiconductor layer 521 and the second conductive semiconductor layer 522.

In some illustrative embodiments, the first electrode 561 may be a positive electrode (or an anode electrode), and the second electrode 562 may be a negative electrode (or a cathode electrode).

In some illustrative embodiments, two or more light emitting elements 500 may constitute a light emitting block BL. A plurality of light emitting blocks BL may be arranged in the light emitting area LA, and each of the light emitting blocks BL may include a plurality of light emitting elements 500. In some illustrative embodiments, the light emitting elements 500 included in one light emitting block BL may be connected in series with each other. Illustratively, as shown in FIG. 5, one light emitting block BL may include four light emitting elements 500 connected in series with each other. However, the present invention is not limited thereto, and the number of light emitting elements 500 included in one light emitting block BL may be variously changed. Hereinafter, for convenience of explanation, a case where the light emitting block BL includes four light emitting elements 500 will be described as an example.

The wiring layer 430 may be disposed on the base substrate 410, and the insulating layer 450 and the reflective layer 470 may be disposed on the wiring layer 430. The aforementioned light emitting element 500 or the aforementioned light emitting block BL may be disposed on the insulating layer 450 or the reflective layer 470.

In some illustrative embodiments, the wiring layer 430 may include a first conductive pattern 431, a second conductive pattern 433, a third conductive pattern 435, a fourth conductive pattern 437, a fifth conductive pattern 439, a first pad P1, a second pad P2, a first connection pattern CL1, and a second connection pattern CL2.

The first conductive pattern 431, the second conductive pattern 433, the third conductive pattern 435, the fourth conductive pattern 437, and the fifth conductive pattern 439 may be arranged in the light emitting area LA, and the first conductive pattern 431, the second conductive pattern 433, the third conductive pattern 435, the fourth conductive pattern 437, and the fifth conductive pattern 439 may be spaced apart from each other. In some illustrative embodiments, the second conductive pattern 433 may be spaced apart from the first conductive pattern 431 and the third conductive pattern 435 along the second direction Y. Similarly, the fourth conductive pattern 437 may be spaced apart from the fifth conductive pattern 439 and the third conductive pattern 435 along the second direction Y. The second conductive pattern 433 and the fourth conductive pattern 437 may be disposed to face each other along the first direction X, but the second conductive pattern 433 and the fourth conductive pattern 437 may be spaced apart from each other.

In some illustrative embodiments, the interval Wa between the second conductive pattern 433 and the fourth conductive pattern 437 measured along the first direction X may be greater than the width WL1 of the light emitting element 500 measured along the first direction X.

In some illustrative embodiments, the first conductive pattern 431 may be independently connected to each light emitting block BL, and may provide a driving voltage to each light emitting block BL. In some illustrative embodiments, the fifth conductive pattern 439 may be connected to two or more light emitting blocks BL, and may provide a common voltage to each light emitting block BL.

In the following illustrative embodiments, the term "connection" may mean contact in physical aspects and/or connection in electrical aspects.

Explaining the connection relationship between the light emitting element 500 and the wiring layer 430 included in the light emitting block BL, when any one of the four light emitting elements 500 is referred to as a first light emitting element, the first electrode 561 of the first light emitting element may be electrically connected to the first conductive pattern 431, and the second electrode 562 of the first light emitting element may be connected to one side of the second conductive pattern 433. When another one of the four light emitting elements 500 is referred to as a second light emitting element, the first electrode 561 of the second light emitting element may be connected to the other side of the second conductive pattern 433, and the second electrode 562 of the second light emitting element may be connected to one side of the third conductive pattern 435. When another one of the light emitting elements 500 is referred to as a third light emitting element, the first electrode 561 of the third light emitting element may be connected to the other side of the third conductive pattern 435, and the second electrode 562 of the third light emitting element may be connected to one side of the fourth conductive pattern 437. When the other one of the four light emitting elements 500 is referred to as a fourth light emitting element, the first electrode 561 of the fourth light emitting element may be connected to the other side of the fourth conductive pattern 437, and the second electrode 562 of the fourth light emitting element may be connected to the fifth conductive pattern 439. The four light emitting elements in the light emitting block BL may be connected in series through the aforementioned connection relationship.

In some illustrative embodiments, when one of the plurality of light emitting blocks BL is referred to as a first light emitting block and the light emitting block different from the first light emitting block among the plurality of light emitting blocks BL may be referred to as a second light emitting block, the size or shape of the conductive pattern connected to the light emitting element of the first light emitting block may be different from the size or shape of the conductive pattern connected to the light emitting element of the second light emitting block. Illustratively, based on the drawings, when the light emitting block relatively adjacent to the first pad P1 and the second pad P2 are referred to as a first light emitting block and the light emitting block relatively spaced apart from the first pad P1 and the second pad P2 relatively in the second direction Y as compared with the first light emitting block is referred to as a second light emitting block, the size or shape of the third conductive pattern 435 connected to the light emitting element of the first light emitting block may be different from the size or shape of the third conductive pattern 435 connected to the light emitting element of the second light emitting block. According to an illustrative embodiment, the size or shape of each second conductive pattern 433, the size or shape of each fourth conductive pattern 437, and the size or shape of each first conductive pattern 431 may be different from each other for each light emitting block.

However, this is only one example, and the sizes or shapes of the conductive patterns connected to the light emitting elements of each light emitting block may be the same as each other.

The first pad P1 and the second pad P2 may be disposed in the non-light emitting area NLA and may be spaced apart from each other. The first pad P1 may be connected to the backlight flexible substrate FPC2 through a pad connection member AP such as an anisotropic conductive film. The first pad P1 may receive a driving voltage through the backlight flexible substrate FPC2. The second pad P2 may be connected to the backlight flexible substrate FPC2 or an external circuit through a pad connection member AP such as an anisotropic conductive film to receive a common voltage.

That is, a driving voltage may be provided to the first pad P1, and a common voltage may be provided to the second pad P2. Accordingly, the respective light emitting elements 500 connected in series in the light emitting block BL may emit light (for example, blue light). A portion of the blue light emitted from the light emitting element 500 may be converted into red light and green light by the wavelength converter 700, and the other portion of the blue light emitted from the light emitting element 500 may pass through the wavelength converter 700 without the wavelength of the blue light being converted by the wavelength converter 700. Accordingly, the wavelength converter 700 may emit white light, which is a mixture of blue light, green light, and red light.

In some illustrative embodiments, the first pad P1 may be provided as the number of the light emitting blocks BL or the number of the first conductive patterns 431. In some illustrative embodiments, a plurality of second pads P2 may be provided, but the present invention is not limited thereto, and only one second pad P2 may be provided.

The first connection pattern CL1 may electrically connect the first conductive pattern 431 and the first pad P1. In some illustrative embodiments, one side of the first connection pattern CL1 may be connected to the first conductive pattern 431, and the other side of the first connection pattern CL1 may be connected to the first pad P1.

The second connection pattern CL2 may electrically connect the fifth conductive pattern 439 and the second pad P2. In some illustrative embodiments, one side of the second connection pattern CL2 may be connected to the fifth conductive pattern 439, and the other side of the second connection pattern CL2 may be connected to the second pad P2.

The first connection pattern CL1 and the second connection pattern CL2 may be generally disposed in the non-light emitting area NLA. That is, each of the first connection pattern CL1 and the second connection pattern CL2 may include a portion located in the non-light emitting area NLA. In some illustrative embodiments, a portion of the first connection pattern CL1 and a portion of the second connection pattern CL2 may be located in the light emitting area LA.

As described above with reference to FIG. 4, the wiring layer 430 includes a lower conductive layer 430a, an intermediate conductive layer 430b, and an upper conductive layer 430c. Therefore, in some illustrative embodiments, each of the first conductive pattern 431, the second conductive pattern 433, the third conductive pattern 435, the fourth conductive pattern 437, the fifth conductive pattern 439, the first pad P1, the second pad P2, the first connection pattern CL1, and the second connection pattern CL2 may also include three conductive layers.

Specifically, the first conductive pattern 431 may include a first lower conductive pattern 431a, a first intermediate conductive pattern 431b, and a first upper conductive pattern 431c, which overlap each other. The second conductive pattern 433 may include a second lower conductive pattern 433a, a second intermediate conductive pattern 433b, and a second upper conductive pattern 433c, which overlap each other. The third conductive pattern 435 may include a third lower conductive pattern 435a, a third intermediate conductive pattern 435b, and a third upper conductive pattern 435c, which overlap each other. The fourth conductive pattern 437 may include a fourth lower conductive pattern 437a, a fourth intermediate conductive pattern 437b, and a fourth upper conductive pattern 437c, which overlap each other. The fifth conductive pattern 439 may include a fifth lower conductive pattern 439a, a fifth intermediate conductive pattern 439b, and a fifth upper conductive pattern 439c, which overlap each other. The first pad P1 may include a first lower pad pattern P1a, a first intermediate pad pattern P1b, and a first upper pad pattern P1c, which overlap each other. Like the first pad P1, the second pad P2 may have a three-layer structure. The first connection pattern CL1 may include a first lower connection pattern CL1a, a first intermediate connection pattern CL1b, and a first upper connection pattern CL1c, which overlap each other. Like the first connection pattern Cl1, the is second connection pattern CL2 may have a three-layer structure.

That is, the lower conductive layer 430a may include the first lower conductive pattern 431a, the second lower conductive pattern 433a, the third lower conductive pattern 435a, the fourth lower conductive pattern 437a, the fifth lower conductive pattern 439a, the first lower pad pattern P1a, and the first lower connection pattern CL1a.

Further, the intermediate conductive layer 430b may includes the first intermediate conductive pattern 431b, the second intermediate conductive pattern 433b, the third intermediate conductive pattern 435b, the fourth intermediate conductive pattern 437b, the fifth intermediate conductive pattern 439b, the first intermediate pad pattern P1b, and the first intermediate connection pattern CL1b.

Further, the upper conductive layer 430c may include the first upper conductive pattern 431c, the second upper conductive pattern 433c, the third upper conductive pattern 435c, the fourth upper conductive pattern 437c, the fifth upper conductive pattern 439c, the first upper pad pattern P1c, and the first upper connection pattern CL1c.

In some illustrative embodiments, the minimum interval between the lower conductive patterns included in the lower conductive layer 430a may be greater than the minimum interval between the upper conductive patterns included in the upper conductive layer 430c.

The insulating layer 450 may be disposed on the wiring layer 430. In some illustrative embodiments, the insulating layer 450 may be disposed in both the light emitting area LA and the non-light emitting area NLA.

The insulating layer 450 may planarize the upper side of the wiring layer 430 and protect the wiring layer 430.

In some illustrative embodiments, the insulating layer 450 may include a first insulating layer 450*a* on the wiring layer 430 and a second insulating layer 450*b* on the first insulating layer 450*a*.

The first insulating layer 450*a* may cover the wiring layer 430 to protect the wiring layer 430. In some illustrative embodiments, the first insulating layer 450*a* may be made of an inorganic insulating material. Illustratively, the first insulating layer 450*a* may be made of silicon nitride, silicon oxide, silicon oxynitride, or the like.

The second insulating layer 450*b* may provide a flat surface to the upper side of the wiring layer 430. In some illustrative embodiments, the second insulating layer 450*b* may be made of an organic insulating material. For example, the second insulating layer 450*b* may be made of a photosensitive organic insulating material such as an acrylic resin.

In the light emitting area LA, a contact hole CH exposing the intermediate conductive layer 430*b* of the wiring layer 430 may be defined in the upper conductive layer 430*c* of the wiring layer 430 and the insulating layer 450.

In some illustrative embodiments, the contact hole CH may be formed to expose each of both sides of the second intermediate conductive pattern 433*b*, both sides of the third intermediate conductive pattern 435*b*, both sides of the fourth intermediate conductive pattern 437*b*, one side of the first intermediate conductive pattern 431*b*, and one side of the fifth intermediate conductive pattern 439*b*.

In the non-light emitting area NLA, a pad contact hole CHP exposing the upper conductive layer 430*c* or the first upper pad pattern P1*c* of the wiring layer 430 may be defined in the insulating layer 450.

The reflective layer 470 may be disposed on the insulating layer 450. In some illustrative embodiments, the reflective layer 470 may be disposed in the light emitting area LA, and may not be disposed in the non-light emitting area NLA. As shown in FIG. 7, an opening OPN may be formed in a portion of the reflective layer 470 corresponding to the light emitting element 500.

The reflective layer 470 may be disposed directly on the insulating layer 450, and the reflective layer 470 may be in contact with the insulating layer 450. In some illustrative embodiments, as described above, the reflective layer 470 may be formed by printing reflective ink on the insulating layer 450 by silk screening, but the present invention is not limited thereto.

The first connection member SR1 and the second connection member SR2 may be disposed in the contact hole CH, and the first connection member SR1 and the second connection member SR2 may be in contact with the intermediate conductive layer 430*b* of the wiring layer 430.

In the light emitting area LA, the light emitting element 500 may be electrically connected to the wiring layer 430 through the first connection member SR1 and the second connection member SR2. In some illustrative embodiments, the first electrode 561 of the light emitting element 500 may be in contact with the first connection member SR1, and the second electrode 562 of the light emitting element 500 may be in contact with the second connection member SR2.

When any one of the four light emitting elements 500 is referred to as a first light emitting element, the first electrode 561 of the first light emitting element may be electrically connected to the first conductive pattern 431 through the first connection member SR1, and the second electrode 562 of the first light emitting element may be connected to one side of the second conductive pattern 433 through the second connection member SR2. When another one of the four light emitting elements 500 is referred to as a second light emitting element, the first electrode 561 of the second light emitting element may be connected to the other side of the second conductive pattern 433 through the first connection member SR1, and the second electrode 562 of the second light emitting element may be connected to one side of the third conductive pattern 435 through the second connection member SR2. When another one of the four light emitting elements 500 is referred to as a third light emitting element, the first electrode 561 of the third light emitting element may be connected to the other side of the third conductive pattern 435 through the first connection member SR1, and the second electrode 562 of the third light emitting element may be connected to one side of the fourth conductive pattern 437 through the second connection member SR2. When the other one of the four light emitting elements 500 is referred to as a fourth light emitting element, the first electrode 561 of the fourth light emitting element may be connected to the other side of the fourth conductive pattern 437 through the first connection member SR1, and the second electrode 562 of the fourth light emitting element may be connected to the fifth conductive pattern 439 through the second connection member SR2.

In some illustrative embodiments, the coupling force between the first connection member SR1 and the intermediate conductive layer 430*b* and between the second connection member SR2 and the intermediate conductive layer 430*b* may be greater than the coupling force between the first connection member SR1 and the upper conductive layer 430*c* and between the second connection member SR2 and the upper conductive layer 430*c*. Illustratively, when the first connection member SR1 and the second connection member SR2 are solder bumps made of solder, the intermediate conductive layer 430*b* is made of copper or a copper alloy, and the upper conductive layer 430*c* is made of titanium or a titanium alloy, the bonding force between the solder and copper (or copper alloy) may be greater than the bonding force between the solder and titanium (or titanium alloy). In the present illustrative embodiment, a portion of the upper conductive layer 430*c* is removed to expose the intermediate conductive layer 430*b*, and the first connection member SR1 and the second connection member SR2 are coupled to the exposed intermediate conductive layer 430*b*, so that the connection reliability between the light emitting element 500 and the wiring layer 430 may be improved.

A capping layer CPL may be disposed on each light emitting element 500. The capping layer CPL may cover the light emitting element 500 to protect the light emitting element 500. The capping layers CPL covering the respective light emitting elements 500 may be spaced apart from each other, but the present invention is not limited thereto.

In some illustrative embodiments, at least a portion of the capping layer CPL may be disposed on the reflective layer 470. In other words, a portion of the reflective layer 470 may be disposed between the capping layer CPL and the insulating layer 450.

In some illustrative embodiments, when a space is formed between the light emitting element 500 and the insulating layer 450, the capping layer CPL may fill the space between the light emitting element 500 and the insulating layer 450.

In some illustrative embodiments, the capping layer CPL may be made of an insulating material, and the capping layer CPL may be made of an organic insulating material or an inorganic insulating material. Illustratively, the capping layer CPL may be made of a silicone resin, but the material thereof is not limited thereto.

The wavelength converter 700 may be disposed on the capping layer CPL. In some illustrative embodiments, the wavelength converter 700 may be in contact with the capping layer CPL. The wavelength converter 700 may cover each of the light emitting elements 500, and the adjacent wavelength converters 700 may be spaced apart from each other. The wavelength converter 700 may be formed in a pattern only on a portion corresponding to the light emitting element 500, thereby reducing material costs.

In some illustrative embodiments, a portion of the wavelength converter 700 may be in contact with the reflective layer 470.

The passivation layer 800 covering the wavelength converter 700 may be disposed on the wavelength converter 700. In some illustrative embodiments, the passivation layer 800 may be disposed in the light emitting area LA, but the passivation layer 800 may not be disposed in the non-light emitting area NLA.

In the non-light emitting area NLA, the pad connection member AP may be disposed in the pad contact hole CHP, and the pad connection member AP may be in contact with the upper conductive layer 430c or the first upper pad pattern P1c of the first pad P1 in the pad contact hole CHP.

The first pad P1 may be electrically connected to the backlight flexible substrate FPC2 through the pad connection member AP. In some illustrative embodiments, the pad connection member AP may be an anisotropic conductive film.

Unlike the light emitting area LA, in the non-light emitting area NLA, the intermediate conductive layer 430b is not exposed to the outside. Accordingly, in the non-light emitting area NLA capable of being exposed to external moisture/oxygen relative to the light-emitting area LA, the intermediate conductive layer 430b may be protected by the upper conductive layer 430c, so that the oxidation or corrosion of the intermediate conductive layer 430b may be prevented or reduced.

In general, a pad connection pattern made of ITO or the like is additionally formed on the pad to prevent or suppress the corrosion or oxidation of the pad. According to the present illustrative embodiment, the corrosion/oxidation of the pad can be prevented or reduced without forming an additional pad connection pattern other than the wiring layer 430, thereby simplifying the structure and manufacturing process of the backlight substrate LS.

Figure 10:
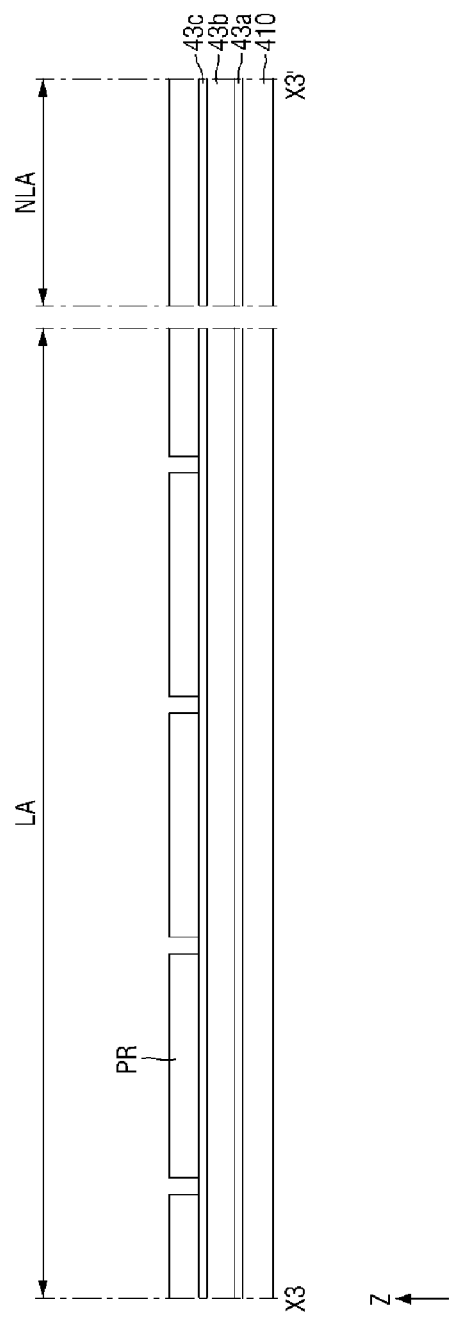
Figure 11:
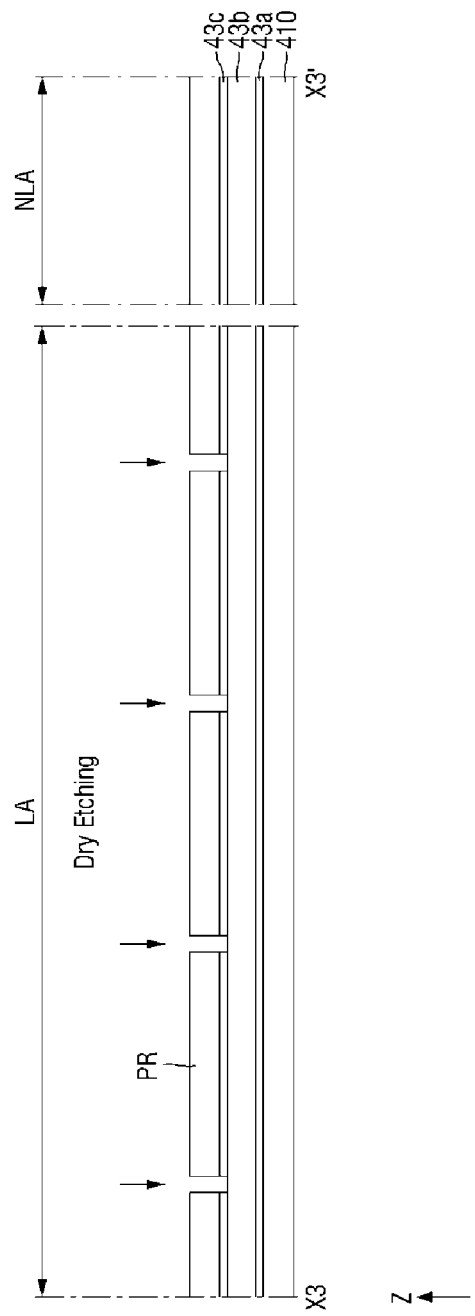
Figure 12:
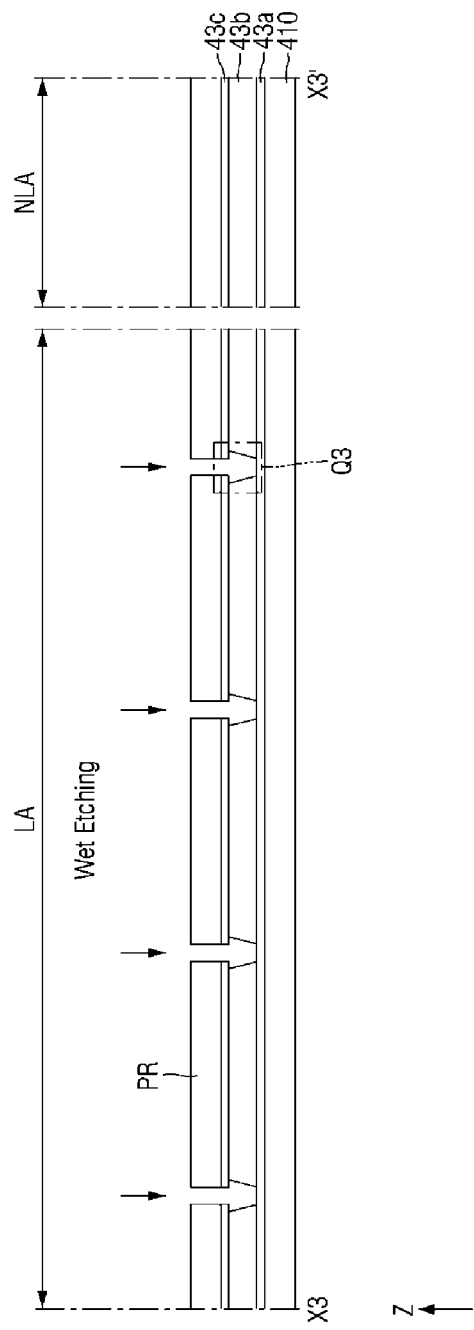
Figure 13:
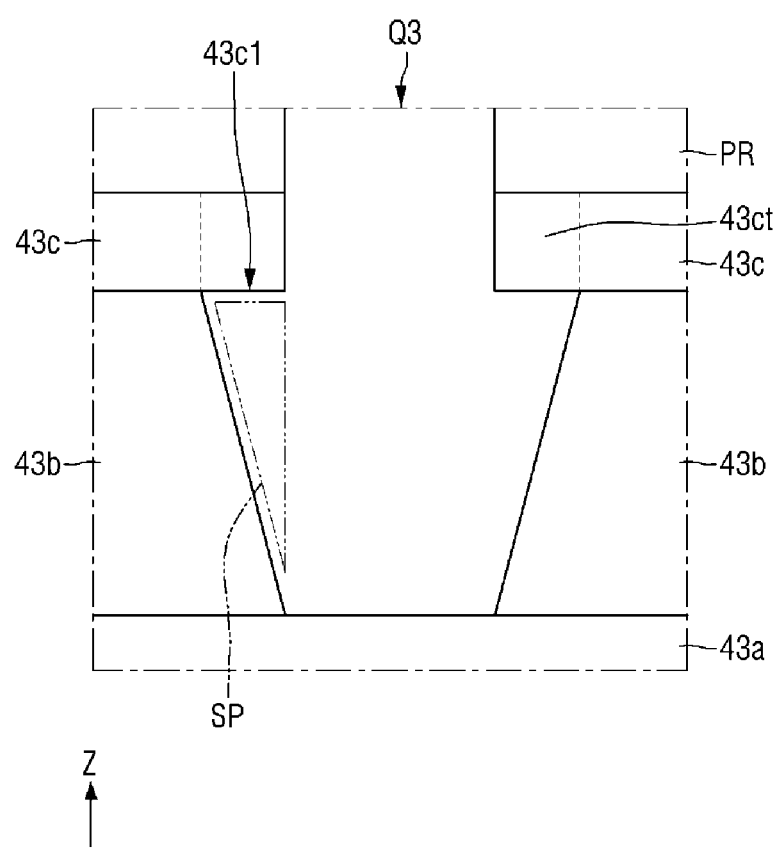
Figure 14:
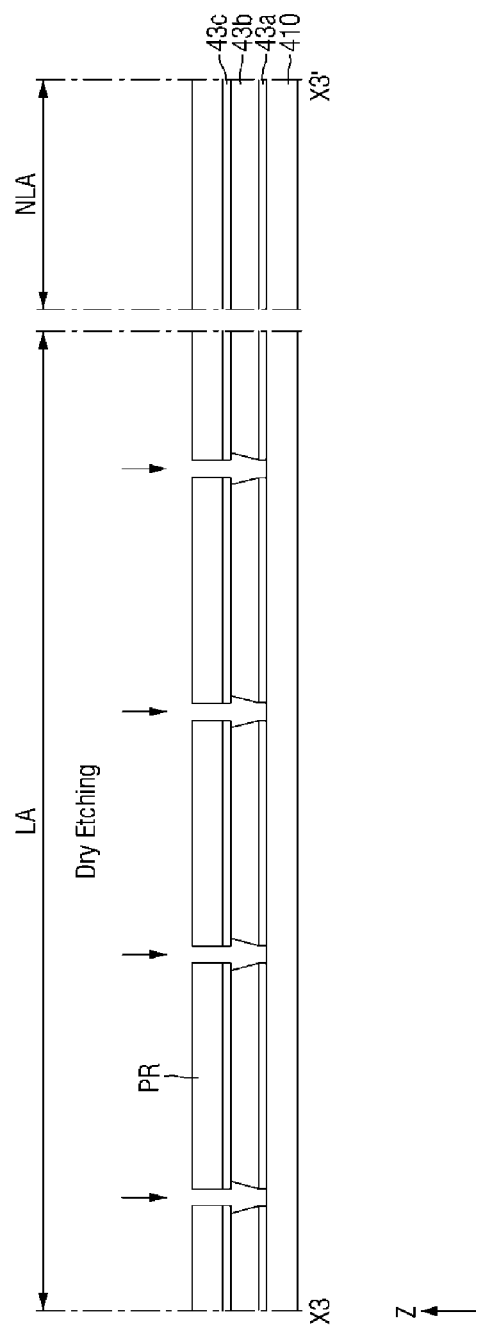
Figure 15:
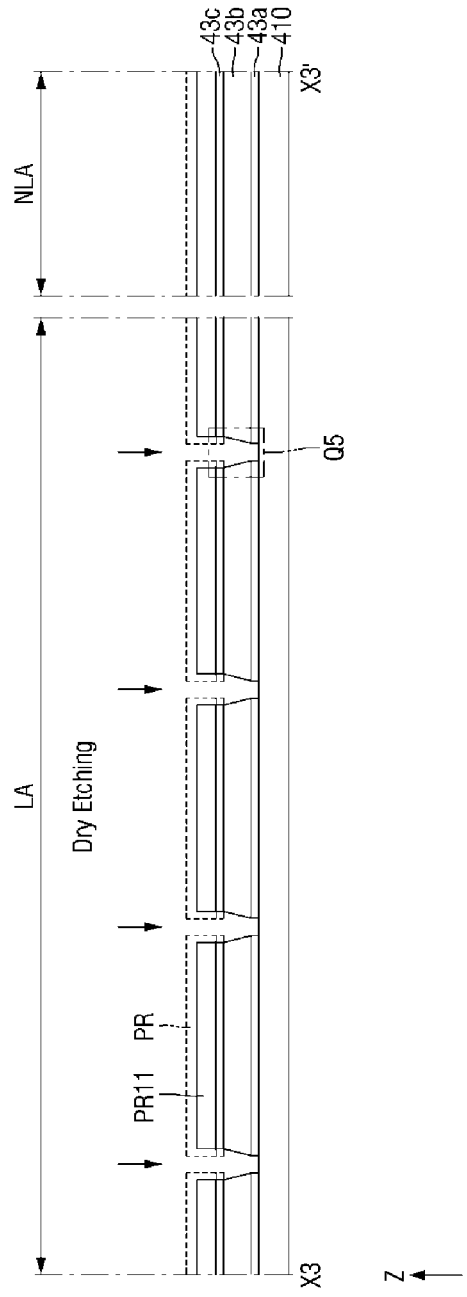
Figure 16:
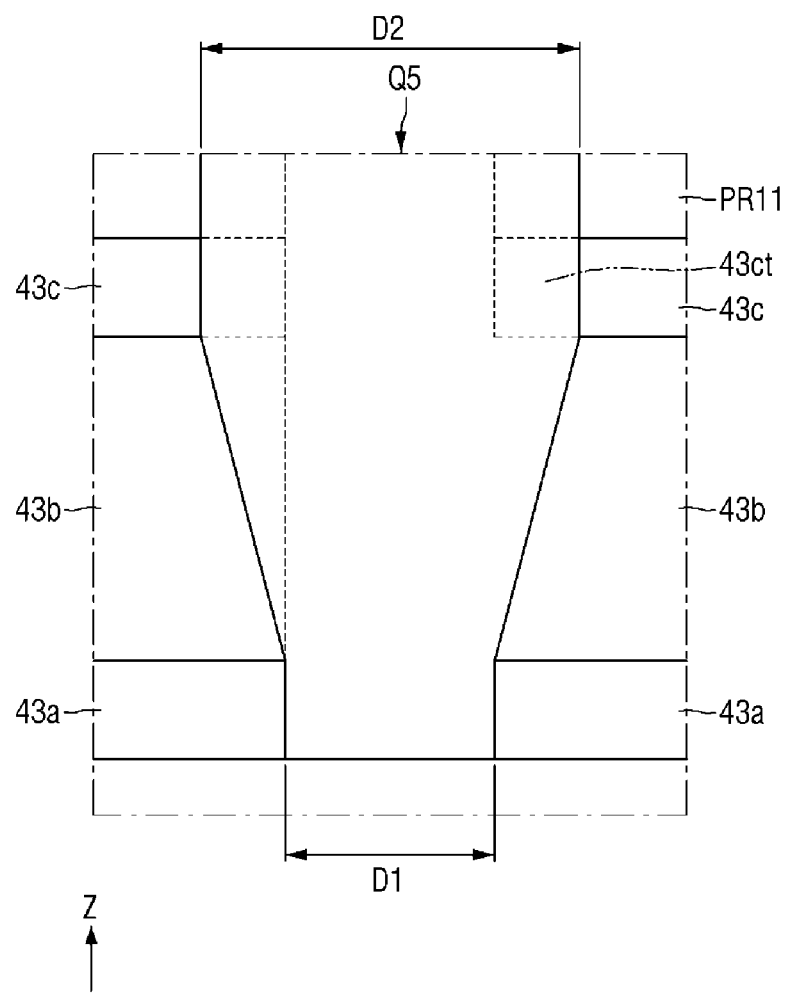

FIGS. 10, 11, 12, 13, 14, 15, 16, 17, 18, 19, and 20 are cross-sectional views for explaining an illustrative process of manufacturing the backlight substrate shown in FIG. 5, in which FIGS. 10, 11, 12, 14, 15, and 17, 18, 19, and 20 are stepwise cross-sectional views, FIG. 13 is an enlarged cross-sectional view of the portion Q3 of FIG. 12, and FIG. 16 is an enlarged cross-sectional view of the portion Q5 of FIG. 15.

Referring to FIGS. 10, 11, 12, 13, 14, 15, 16, 17, 18, 19, and 20, first, as shown in FIG. 10, a first conductive material layer 43a, a second conductive material layer 43b, and a third conductive material layer 43c are sequentially deposited on a base substrate 410. Examples of the material for forming each of the first conductive material layer 43a, the second conductive material layer 43b, and the third conductive material layer 43c may be the same as examples of the material of each of the lower conductive (430a in FIG. 4), the intermediate conductive layer (430b of FIG. 4) and the upper conductive layer (430c of FIG. 4), which have been described above with reference to FIG. 4.

Then, a photosensitive organic layer is formed on the third conductive material layer 43c, exposed to light, and developed to form an organic layer pattern PR. The exposure/development process of the photosensitive organic layer for forming the organic layer pattern PR may be performed using a full tone mask including a light blocking unit and a light transmitting unit.

The organic layer pattern PR may have a substantially constant thickness. The organic layer pattern PR may be formed in a portion corresponding to the wiring layer (430 in FIGS. 5 and 8) shown in FIGS. 5 and 8, and may not be formed in a portion corresponding to the contact hole (CH in FIG. 8) shown in FIG. 8.

Next, as shown in FIG. 11, the third conductive material layer 43c is patterned using the organic layer pattern PR as a mask. The third conductive material layer 43c may be patterned by a dry etching process, and the second conductive material layer 43b may not be etched in the process of patterning the third conductive material layer 43c.

Next, as shown in FIG. 12, the second conductive material layer 43b is patterned using the organic layer pattern PR and the patterned third conductive material layer 43c as a mask. The second conductive material layer 43b may be patterned through a wet etching process using an etching solution, and the first conductive material layer 43a and the third conductive material layer 43c having different etching selectivity based on the etching solution may not be etched.

Since the second conductive material layer 43b is patterned by a wet etching process, as shown in FIG. 13, a space SP may be formed between the lower surface 43c1 of the third conductive material layer 43c and the second conductive material layer 43b along the third direction Z. That is, a protrusion pattern 43ct may be formed in the third conductive material layer 43c. The protrusion pattern 43ct may be defined as a portion where the lower surface 43c1 of the third conductive material layer 43c does not contact the second conductive material layer 43b.

Next, as shown in FIG. 14, the first conductive material layer 43a is patterned using the organic layer pattern PR and the patterned second conductive material layer 43b as a mask. The first conductive material layer 43a may be patterned by a dry etching process.

Next, as shown in FIG. 15, the upper surface of the third conductive material layer 43c is exposed by ashing the organic layer pattern PR. An organic layer residual pattern PR11 may remain on the third conductive material layer 43c. The organic layer residual pattern PR11 may be a portion of the organic layer pattern PR remaining during the ashing process without being removed.

Since the organic layer residual pattern PR11 is a pattern in which a portion of the organic layer pattern PR remains, the width of the organic layer residual pattern PR11 may be narrower than the width of the organic layer pattern PR. Therefore, the protrusion pattern 43ct of the third conductive material layer 43c may be partially or entirely exposed without being covered by the organic layer residual pattern PR11.

Next, the protrusion pattern 43ct of the third conductive material layer 43c is removed using the organic layer residual pattern PR11 as a mask. The protrusion pattern 43ct may be removed by a dry etching process as shown in FIGS. 15 and 16.

Then, the organic layer residual pattern PR11 is removed.

Figure 17:
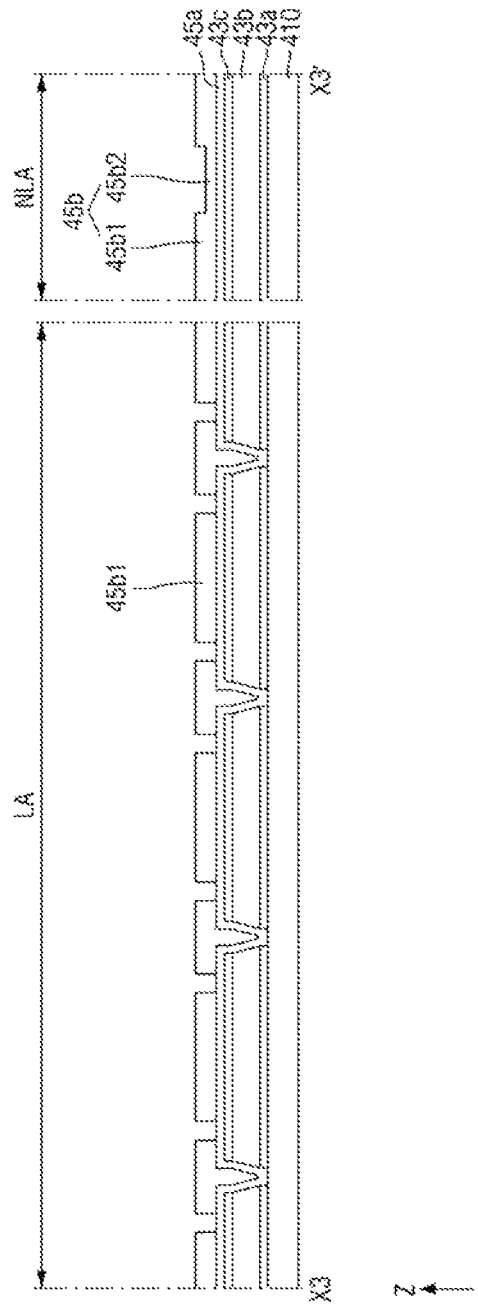

Next, as shown in FIG. 17, a first insulating material layer 45a is formed on the third conductive material layer 43c.

The first insulating material layer 45a may be formed over the entire surface of the base substrate 410, and may be made of an inorganic insulating material.

Then, a photosensitive organic layer is applied onto the first insulating material layer 45a, exposed to light, and developed to form a second insulating material layer 45b. The exposure/development process of the photosensitive organic layer for forming the second insulating material layer 45b may be performed using a mask including a light blocking unit and a light transmitting unit, for example, a full tone mask.

The second insulating material layer 45b may be disposed in the remaining region except for a portion corresponding to the contact hole (CH in FIG. 8) described above with reference to FIG. 8. The second insulating material layer 45b may include a first portion 45b1 and a second portion 45b2 thinner than the first portion 45b1. That is, the second insulating material layer 45b having a step may be formed using one half tone mask. The second portion 45b2 may be formed at a portion corresponding to the pad contact hole (CHP in FIG. 8) described above with reference to FIG. 8.

Figure 18:
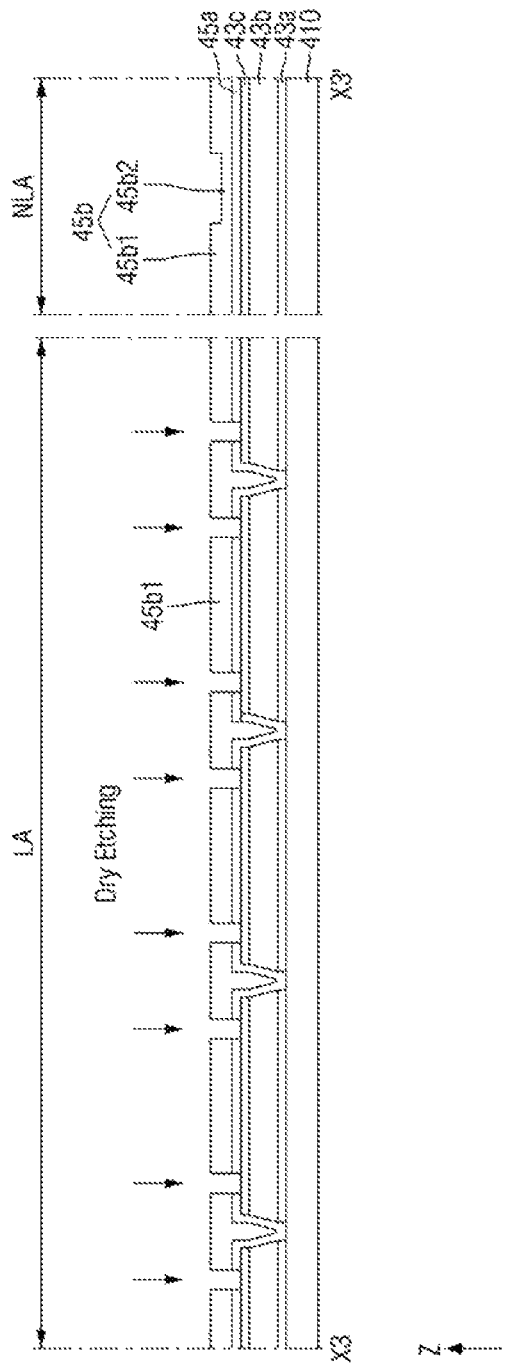

Next, as shown in FIG. 18, the first insulating material layer 45a is patterned using the second insulating material layer 45b as a mask. In some illustrative embodiments, the first insulating material layer 45a may be patterned by a dry etching process.

Then, an ashing process is performed. As the ashing process proceeds, the second portion 45b2 of the second insulating material layer 45b may be removed, and the first portion 45b1 thereof may be formed into the second insulating layer 450b as shown in FIG. 19.

Figure 19:
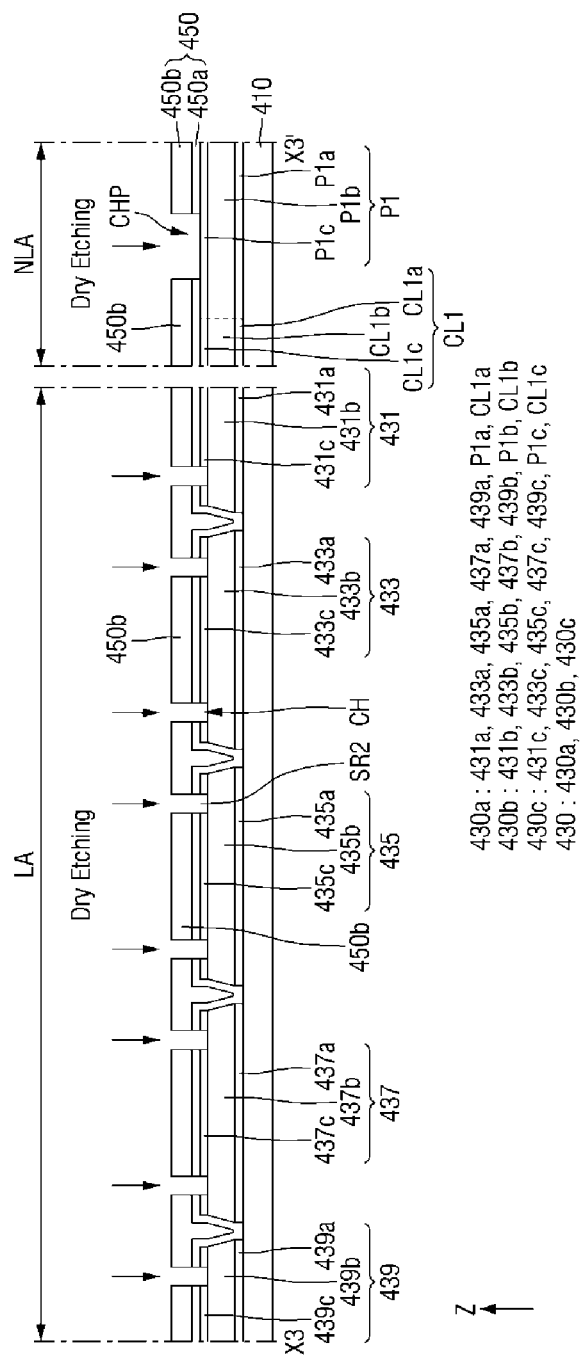

Next, as shown in FIG. 19, an etching process is performed using the second insulating layer 450b as a mask. The etching process using the second insulating layer 450b as a mask may be a dry etching process.

In the light emitting area LA, the third conductive material layer (43c in FIG. 18) may be patterned by the etching process, and in the non-light emitting area NLA, the first insulating material layer (45a in FIG. 18) may be patterned by the etching process. Accordingly, an insulating layer 450 including the first insulating layer 450a and the second insulating layer 450b may be formed. Further, a wiring layer 430 including a first conductive pattern 431, a second conductive pattern 433, a third conductive pattern 435, a fourth conductive pattern 437, a fifth conductive pattern 439, a first pad P1, a second pad (P2 in FIG. 5), a first connection pattern CL1, and a second connection pattern (CL2 in FIG. 8) may be formed. Since detailed configurations of the lower conductive layer 430a, the intermediate conductive layer 430b, and the upper conductive layer 430c included in the wiring layer 430 have been described above, they will not be described.

Further, in the light emitting area LA, a contact hole CH exposing the intermediate conductive layer 430b may be formed through the etching process, and in the non-light emitting area NLA, a pad contact hole CHP exposing the upper conductive layer 430c or the first upper pad pattern P1c may be formed.

Figure 20:
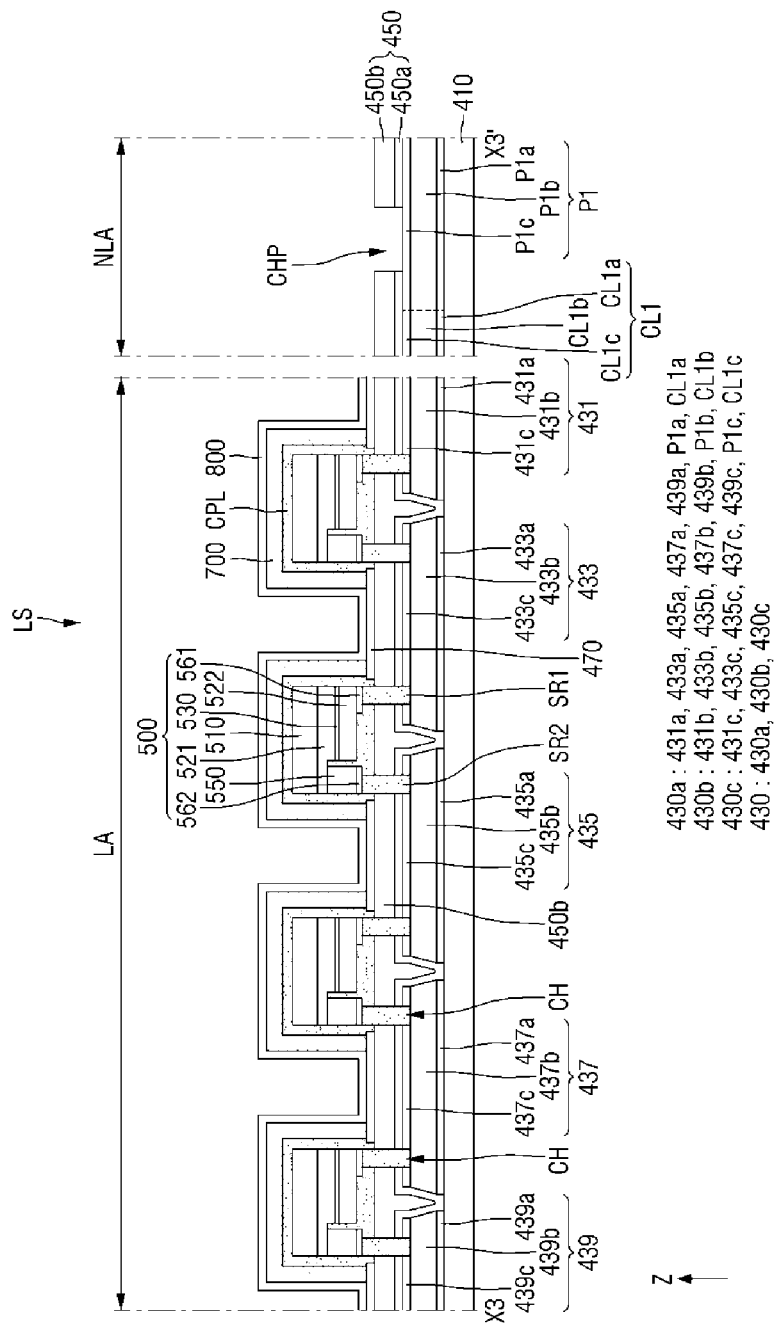

Next, as shown in FIG. 20, a reflective layer 470 is formed by printing reflective ink on the insulating layer 450 through silk screening.

Then, each light emitting element 500 is electrically connected to the wiring layer 430 by a flip chip bonding method or the like. As described above, the light emitting element 500 may be bonded to the wiring layer 430 through the first connection member SR1, the second connection member SR2, and the like.

Then, a capping layer CPL covering each light emitting element 500 is formed, and a wavelength converter 700 is formed on the capping layer CPL. In some illustrative embodiments, the wavelength converter 700 may be formed by applying a photosensitive organic material including wavelength shifters such as a quantum dots onto the capping layer CPL, exposing the photosensitive organic material to light and developing the exposed photosensitive organic material.

Then, a passivation layer 800 covering each wavelength converter 700 is formed. The passivation layer 800 may be formed only in the light emitting area LA, and may not be formed in the non-light emitting area NLA. Alternatively, in another illustrative embodiment, the passivation layer 800 may be disposed in the non-light emitting area NLA, but may be disposed not to cover the pad contact hole CHP.

The backlight substrate LS may be manufactured through the aforementioned processes.

Then, when pads exposed through the pad contact hole CHP via a connection member, for example, first pads P1 are connected to a backlight flexible substrate, the structure shown in FIG. 8 may be manufactured.

However, the method of manufacturing the backlight substrate is not limited to the aforementioned method.

Figure 40:
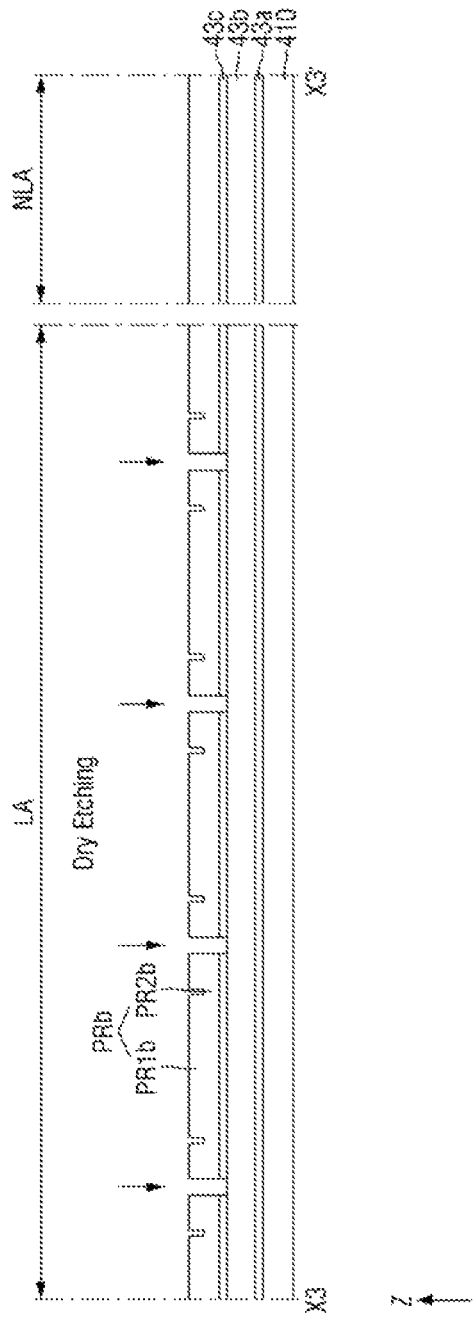
Figure 41:
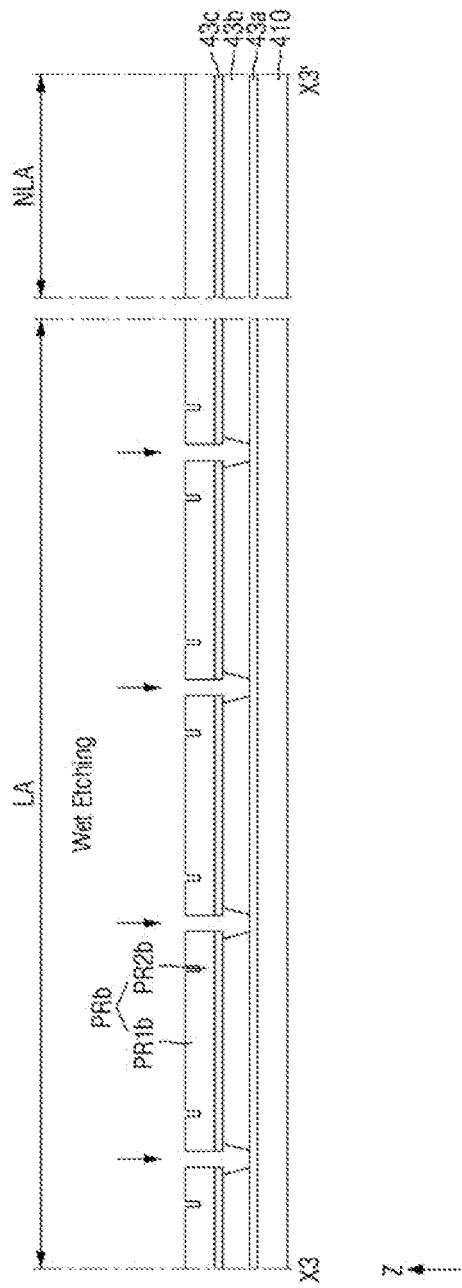
Figure 42:
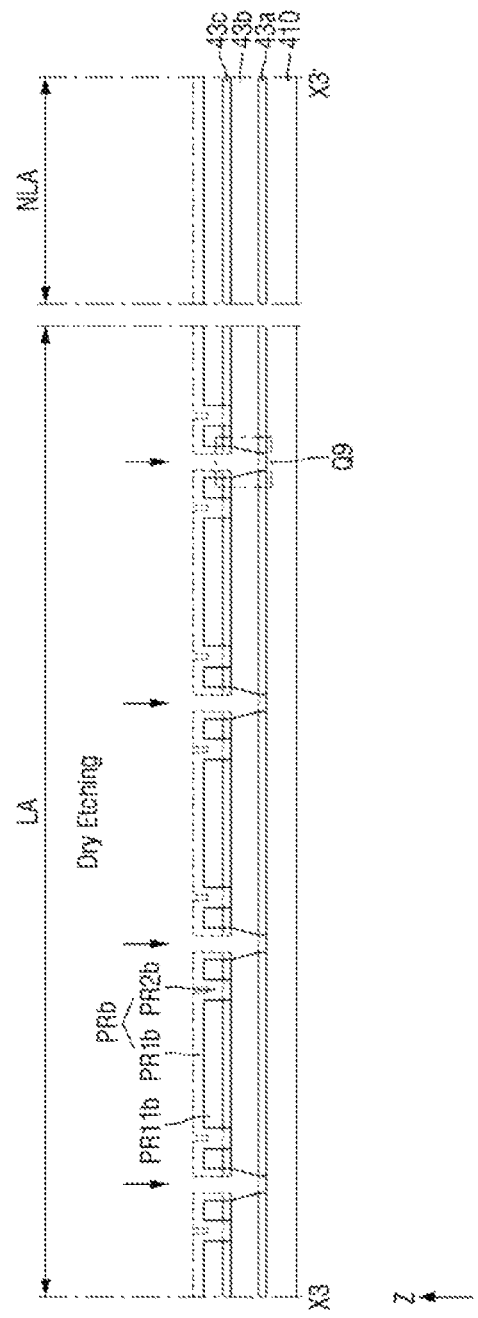
Figure 43:
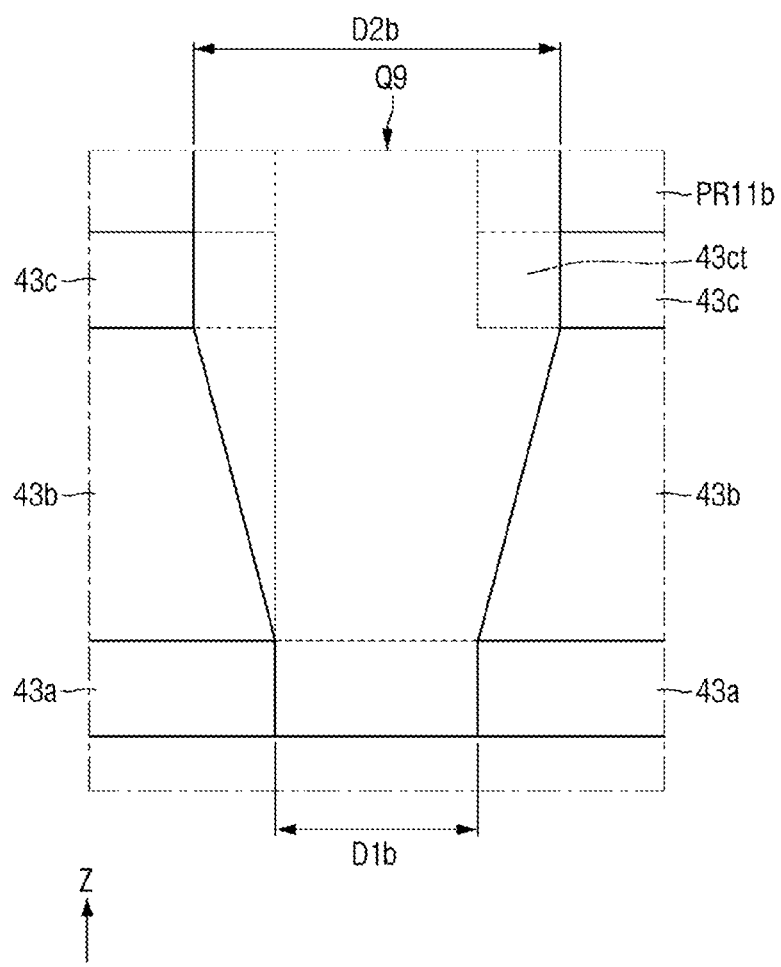

FIGS. 39, 40, 41, 42, 43, 44, 45, and 46 are cross-sectional views for explaining another illustrative process of manufacturing the backlight substrate shown in FIG. 5, in which FIGS. 39, 40, 41, and 42 and 44, 45, and 46 are stepwise cross-sectional views, and FIG. 43 is an enlarged cross-sectional view of the portion Q9 of FIG. 42.

Figure 39:
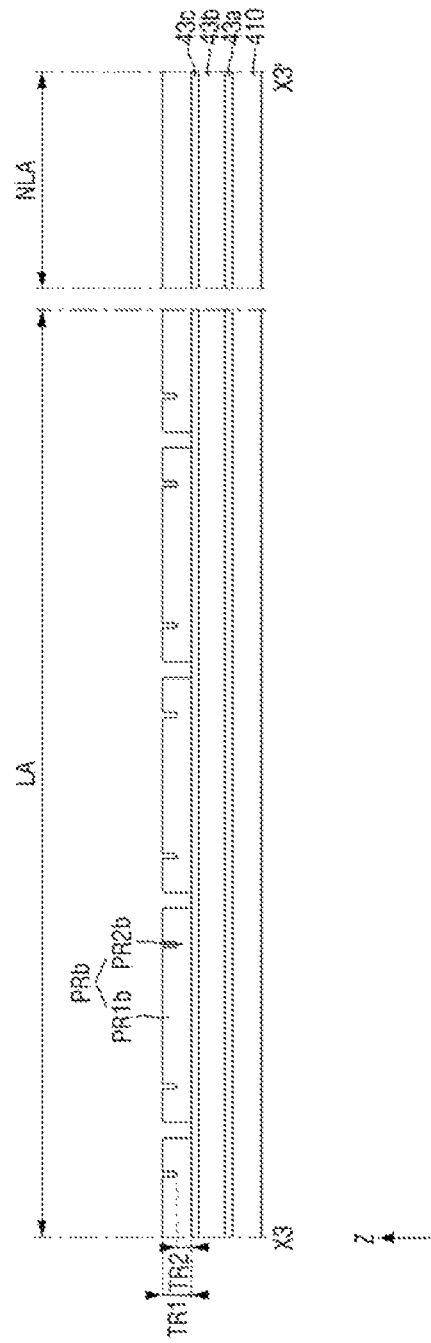

Referring to FIGS. 39, 40, 41, 42, 43, 44, 45, and 46, first, as shown in FIG. 39, a first conductive material layer 43a, a second conductive material layer 43b, and a third conductive material layer 43c are sequentially deposited on a base substrate 410.

Then, a photosensitive organic layer is formed on the third conductive material layer 43c, exposed to light, and developed to form an organic layer pattern PRb. The exposure/development process of the photosensitive organic layer for forming the organic layer pattern PRb may be performed using a multi-tone mask including a light blocking unit, a semi-light transmitting unit and a light transmitting unit, for example, a half tone mask.

The organic layer pattern PRb may include a first organic layer pattern PR1b having a first thickness TR1 and a second organic layer pattern PR2b having a second thickness TR2 thinner than the first thickness TR1. That is, the organic layer pattern PRb having a step may be formed using one half tone mask. The organic layer pattern PR may have a substantially constant thickness. The organic layer pattern PR may be formed in a portion corresponding to the wiring layer (430 in FIGS. 5 and 8) shown in FIGS. 5 and 8, and the second organic layer pattern PR2b of the organic layer pattern PRb is formed in a portion corresponding to the contact hole (CH in FIG. 8) shown in FIG. 8.

Next, as shown in FIG. 40, the third conductive material layer 43c is patterned using the organic layer pattern PRb as a mask. The third conductive material layer 43c may be patterned by a dry etching process.

Next, as shown in FIG. 41, the second conductive material layer 43b is patterned using the organic layer pattern PRb and the patterned third conductive material layer 43c as a mask. The second conductive material layer 43b may be patterned through a wet etching process.

Since the second conductive material layer 43*b* is patterned by a wet etching process, a protrusion pattern (43*ct* in FIG. 13) may be formed in the third conductive material layer 43*c*.

Next, as shown in FIG. 42, the second organic layer pattern PR2*b* is removed by ashing the organic layer pattern PRb to expose the upper surface of the third conductive material layer 43*c*. After the second organic layer PR2*b* is removed, an organic layer residual pattern PR11*b* may remain on the third conductive material layer 43*c*. The organic layer residual pattern PR11*b* may be a portion of the first organic layer pattern PR1*b* remaining during the ashing process without being removed.

Since the organic layer residual pattern PR11*b* is a pattern in which a portion of the first organic layer pattern PR1*b* remains, the width of the organic layer residual pattern PR11*b* may be narrower than the width of the first organic layer pattern PRb. Therefore, the protrusion pattern 43*ct* of the third conductive material layer 43*c* may be partially or entirely exposed without being covered by the organic layer residual pattern PR11*b*.

Next, the protrusion pattern 43*ct* of the third conductive material layer 43*c*, a portion of the third conductive material layer 43*c*, the portion being exposed without being covered by the organic layer residual pattern PR11*b*, and a portion of the first conductive material layer 43*a*, the portion be exposed without being covered by the second conductive material layer 43*b*, are removed by batch etching using the organic layer residual pattern PR11*b* as a mask. Further, a portion of the third conductive material layer 43*c*, the portion not being covered by the organic layer residual pattern PR11*b*, may also be removed during the dry etching process. The first conductive material layer 43*a* may also be patterned.

Even when the protrusion pattern 43*ct* and the first conductive material layer 43*a* are removed in the same process, the first conductive material layer 43*a* is masked by the second conductive material layer 43*b*. Accordingly, after the etching process is completed, the distance D1*b* between the adjacent first conductive material layers 43*a* may be smaller than the distance D2*b* between the adjacent third conductive material layers 43*c*.

Then, the organic layer residual pattern PR11*b* is removed.

Figure 44:
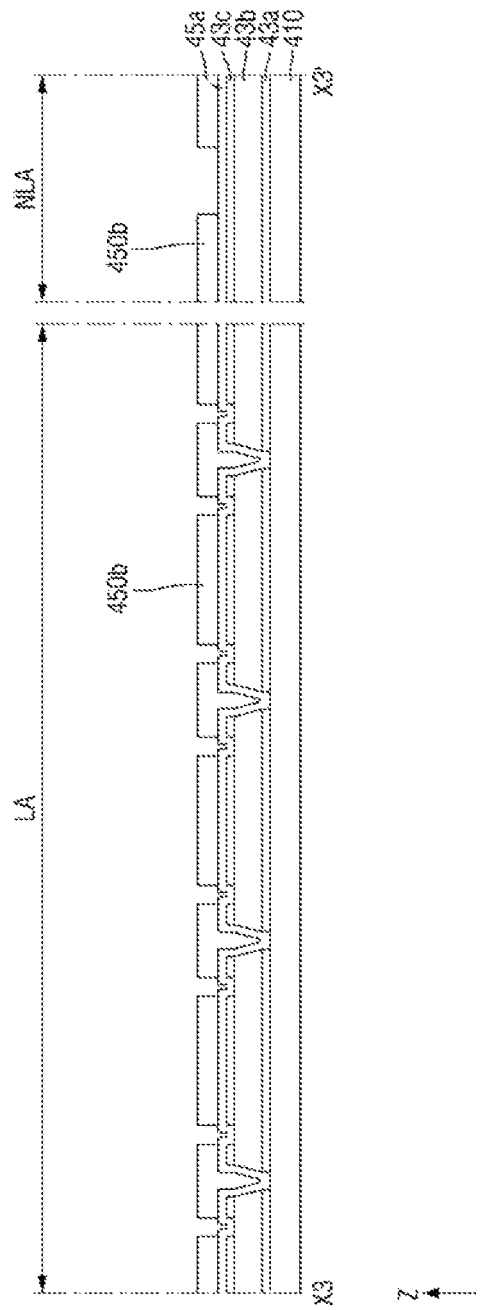

Next, as shown in FIG. 44, a first insulating material layer 45*a* is formed on the third conductive material layer 43*c*. The first insulating material layer 45*a* may be formed over the entire surface of the base substrate 410, and the first insulating material layer 45*a* may be made of an inorganic insulating material.

Then, a photosensitive organic layer is applied onto the first insulating material layer 45*a*, exposed to light, and developed to form a second insulating material layer 45*b*. The exposure/development process of the photosensitive organic layer for forming the second insulating material layer 45*b* may be performed using a full tone mask.

Figure 45:
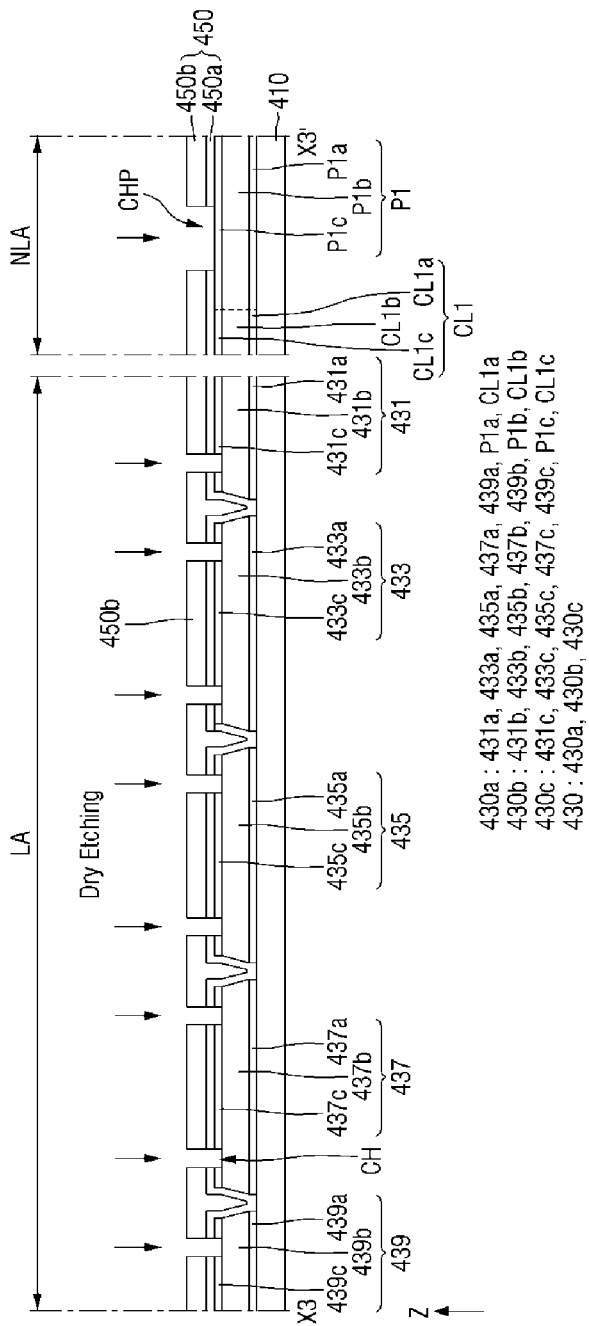

Next, when the first insulating material layer 45*a* is patterned using the second insulating layer 450*b* as a mask, as shown in FIG. 45, an insulating layer 450 including the first insulating layer 450*a* and the second insulating layer 450*b* may be formed. In some illustrative embodiments, the first insulating material layer 45*a* may be patterned by a dry etching process.

In the aforementioned process of FIG. 43, a wiring layer 430 including a first conductive pattern 431, a second conductive pattern 433, a third conductive pattern 435, a fourth conductive pattern 437, a fifth conductive pattern 439, a first pad P1, a second pad (P2 in FIG. 5), a first connection pattern CL1, and a second connection pattern (CL2 in FIG. 8) may be formed. Since the configurations of the lower conductive layer 430*a*, the intermediate conductive layer 430*b*, and the upper conductive layer 430*c* included in the wiring layer 430 have been described as described above, detailed descriptions thereof will be omitted.

Further, in the light emitting area LA, a contact hole CH exposing the intermediate conductive layer 430*b* may be formed through the etching process of FIG. 45, and in the non-light emitting area NLA, a pad contact hole CHP exposing the upper conductive layer 430*c* or the first upper pad pattern P1*c* may be formed.

Figure 46:
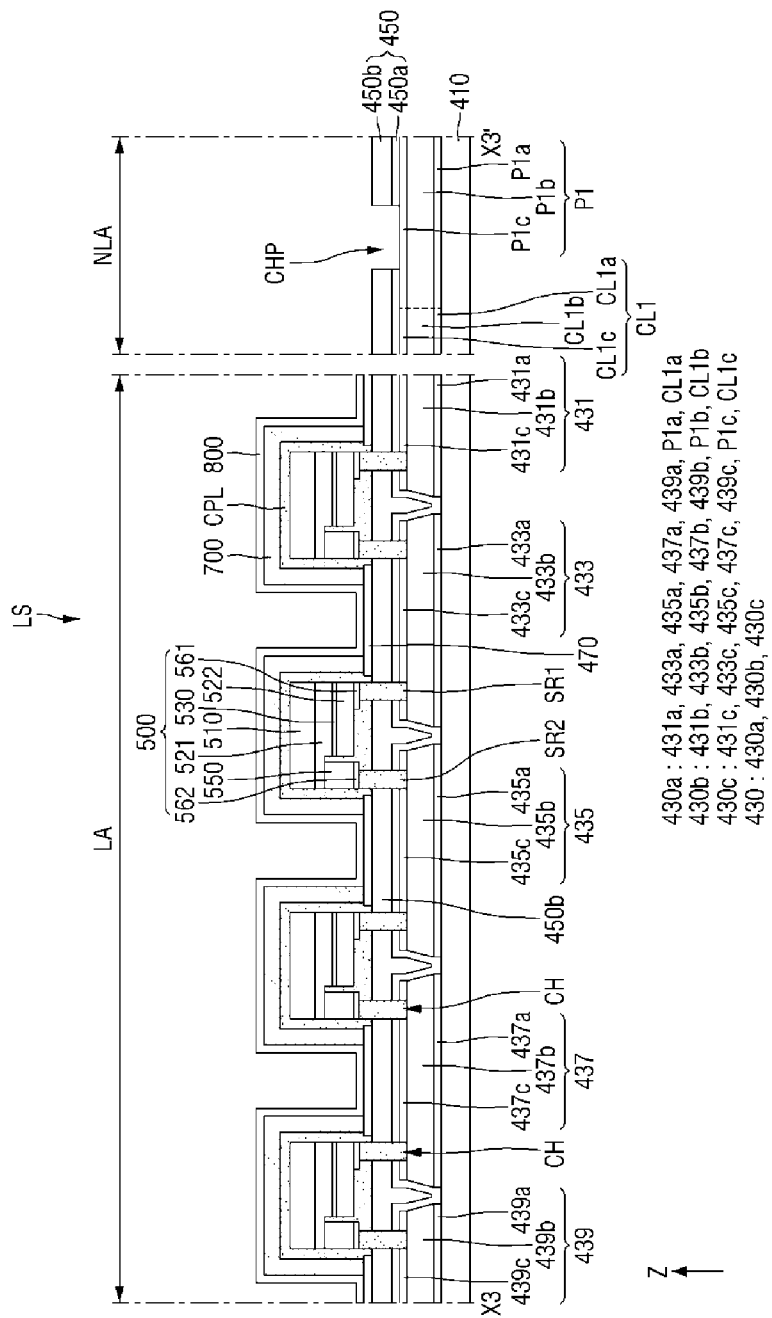

Next, as shown in FIG. 46, a reflective layer 470 is formed by printing reflective ink on the insulating layer 450 through silk screening. Then, each light emitting element 500 is electrically connected to the wiring layer 430 by a flip chip bonding method or the like. As described above, the light emitting element 500 may be bonded to the wiring layer 430 through the first connection member SR1, the second connection member SR2, and the like.

Then, a capping layer CPL covering each light emitting element 500 is formed, and a wavelength converter 700 is formed on the capping layer CPL. Then, a passivation layer 800 covering each wavelength converter 700 is formed.

The backlight substrate LS may be manufactured through the aforementioned processes. Then, when pads exposed through the pad contact hole CHP via a connection member, for example, first pads P1 are connected to a backlight flexible substrate, the structure shown in FIG. 8 may be manufactured.

According to the aforementioned illustrative embodiments, only two masks may be used to form not only conductive patterns in the light emitting area but also connection patterns and pads in the non-light emitting area. Accordingly, since a pad process, for example, a process of additionally forming pad connection patterns, separated from the wiring layer, on the sides of the pads may be omitted, there are advantages that the number of masks used in the manufacturing process of a backlight substrate and that manufacturing costs may be reduced depending on the reduction of the number of the masks.

Figure 21:
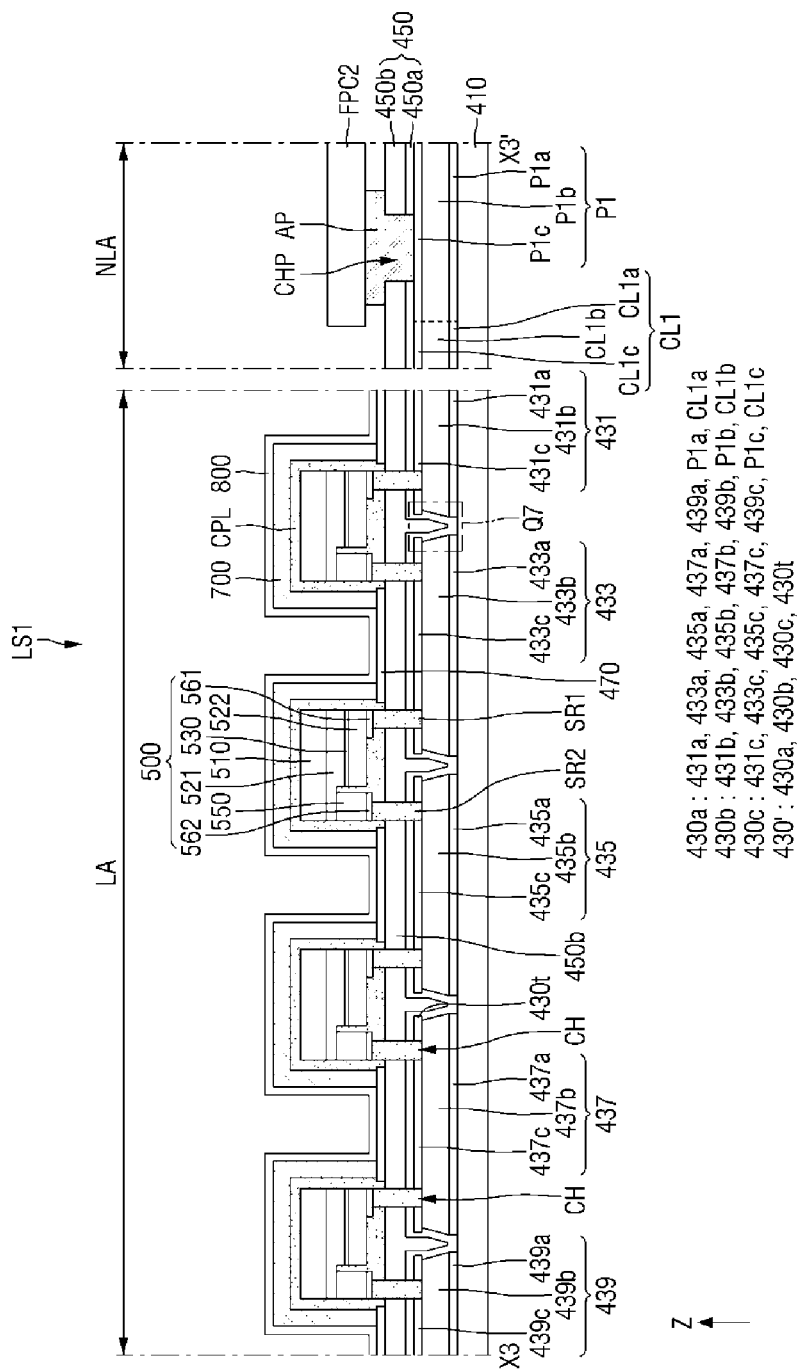
FIG. 21 is a cross-sectional view showing a modified example of the backlight substrate shown in FIG. 5.
Figure 22:
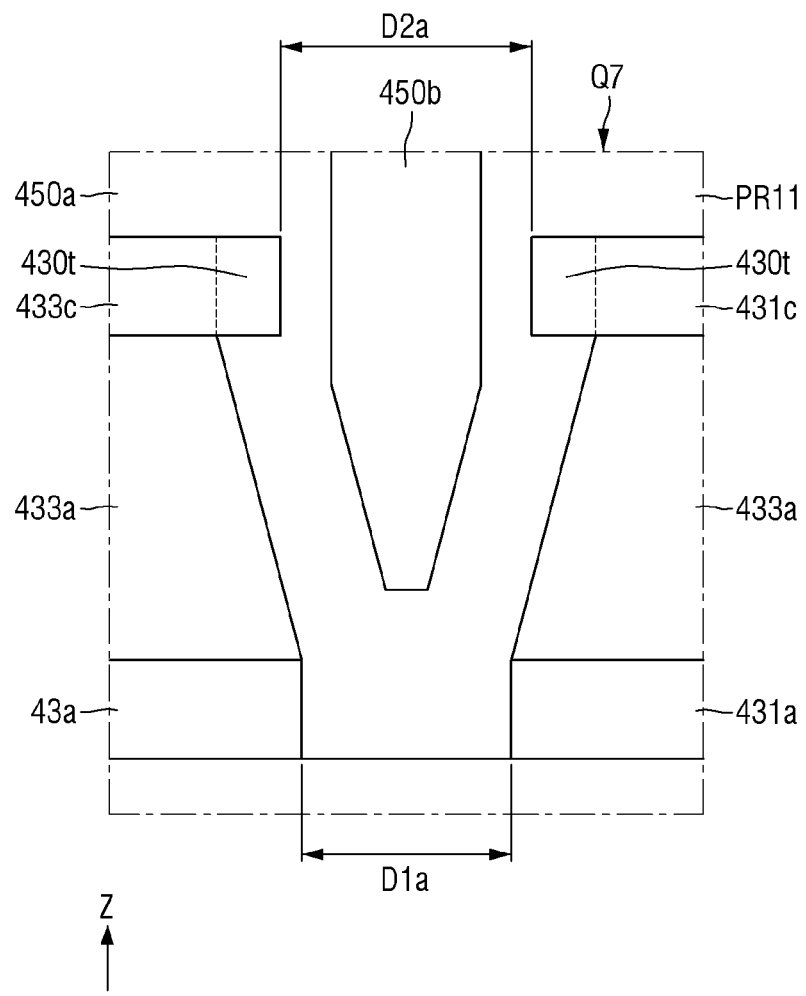
FIG. 22 is an enlarged cross-sectional view of the portion Q7 of FIG. 21.
Figure 23:
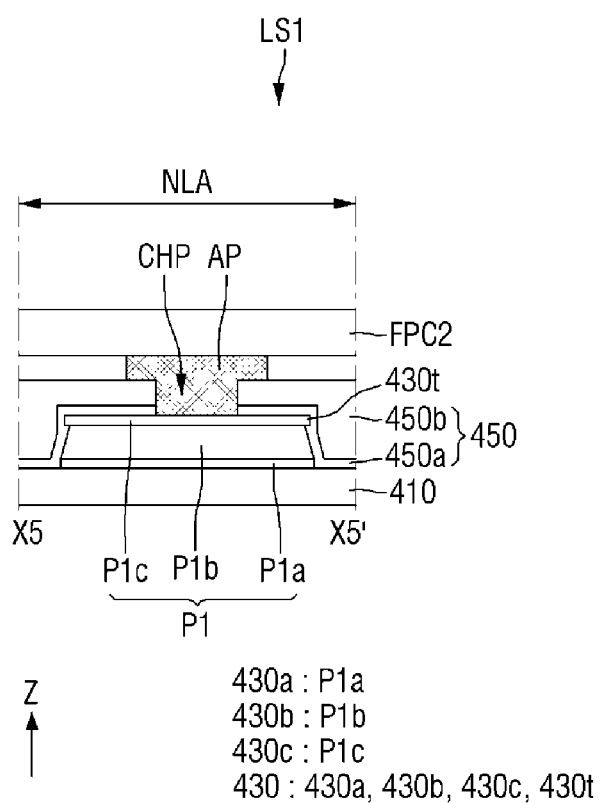
FIG. 23 is a cross-sectional view showing a modified example of the backlight substrate shown in FIG. 6.

FIG. 21 is a cross-sectional view showing a modified example of the backlight substrate shown in FIG. 5, FIG. 22 is an enlarged cross-sectional view of the portion Q7 of FIG. 21, and FIG. 23 is a cross-sectional view showing a modified example of the backlight substrate shown in FIG. 6.

Referring to FIGS. 21, 22, and 23, a backlight substrate LS1 according to the present illustrative embodiment is different from the backlight substrate LS shown in FIGS. 8 and 9 according to the aforementioned illustrative embodiment in that the backlight substrate LS1 includes a wiring layer 430', and other configurations are substantially the same or similar. Therefore, redundant descriptions will be omitted.

The wiring layer 430' may include a lower conductive layer 430*a*, an intermediate conductive layer 430*b*, an upper conductive layer 430*c*, and a protrusion tip 430*t*.

The protrusion tip 430*t* may be disposed at an edge of each conductive pattern of the upper conductive layer 430*c*. Illustratively, as shown in FIG. 22, the protrusion tip 430*t* may be disposed at an edge of the first upper conductive pattern 431*c* and an edge of the second upper conductive pattern 433*c*, and as shown in FIG. 23, the protrusion tip 430*t* may also be disposed at an edge of a first upper pad pattern P1*c*. In some illustrative embodiments, the lower surface 430*t*1 of the protrusion tip 430*t* may not be in contact with the intermediate conductive layer 430b, and may be in contact with a first insulating layer 450a. Alternatively, although not shown in the drawings, in another illustrative embodiment, the lower surface 430t1 of the protrusion tip 430t may not be in contact with the first insulating layer 450a, and in this case, an empty space may be formed between the lower surface 430t1 of the protrusion tip 430t and the first insulating layer 450a.

The protrusion tip 430t may be formed by allowing a portion of the protrusion pattern (43ct in FIG. 18) to remain without being removed. More specifically, when the organic layer residual pattern (R11 in FIG. 15) is formed in the aforementioned ashing process described above with reference to FIGS. 15 and 16 in a state of covering a portion of the protrusion pattern (43ct in FIG. 16) without exposing the entirety of the protrusion pattern (43ct in FIG. 16) and then a dry etching process for removing the protrusion pattern (43ct in FIG. 16) proceeds, a portion of the protrusion pattern (43ct in FIG. 18) may remain without being removed, which may be the protrusion tip 430t in the final structure.

In some illustrative embodiments, the distance between the protrusion tips 430t facing each other may be smaller than the distance between the lower conductive patterns facing each other. Illustratively, the distance D2a between two protrusion tips 430t disposed at the edge of the first upper conductive pattern 431c and the edge of the second upper conductive pattern 433c, respectively, may be narrower than the distance D1a between the first lower conductive pattern 431a and the second lower conductive pattern 433a facing each other.

Figure 24:
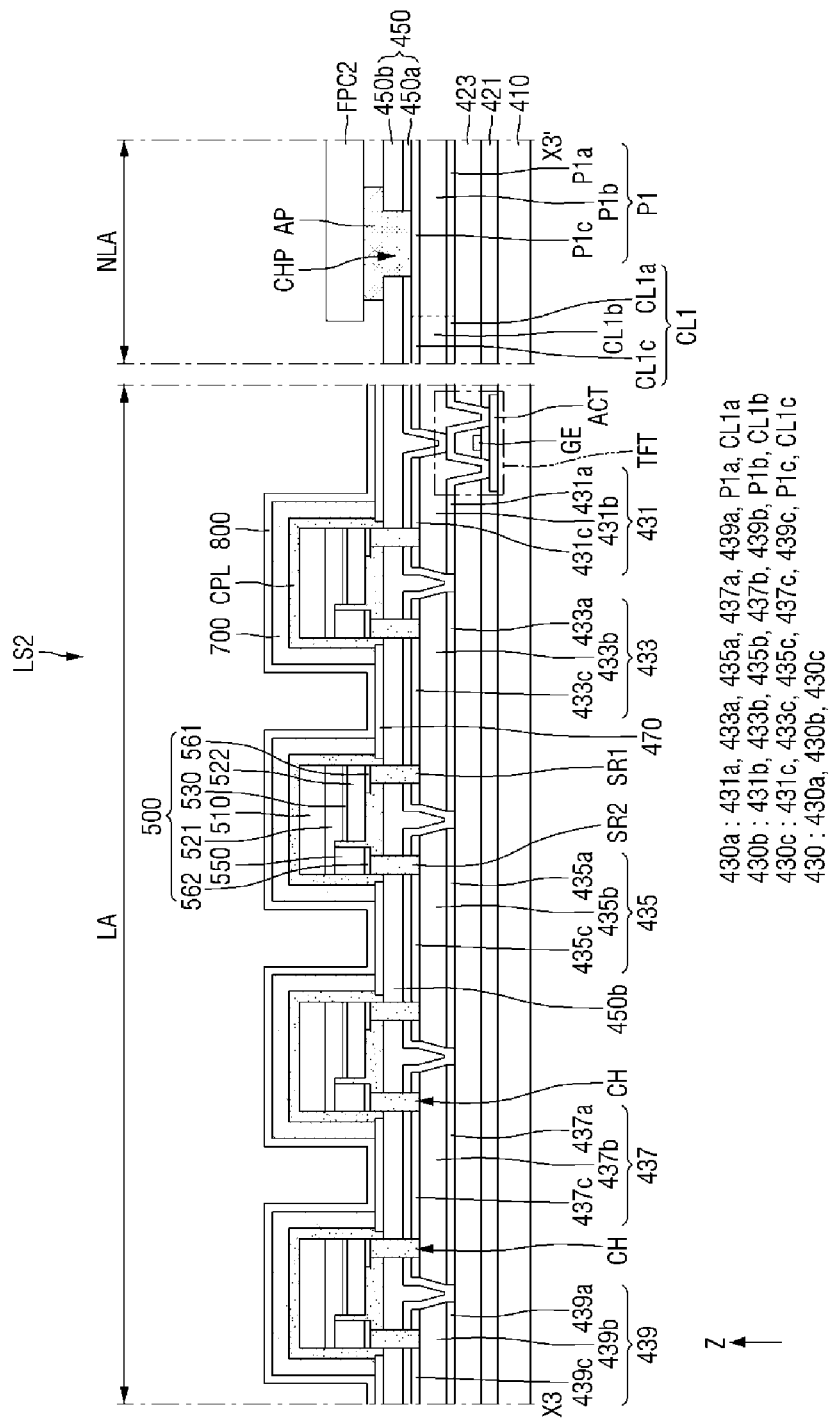
FIG. 24 is a cross-sectional view showing another modified example of the backlight substrate shown in FIG. 5.

FIG. 24 is a cross-sectional view showing another modified example of the backlight substrate shown in FIG. 5.

Referring to FIG. 24, a backlight substrate LS2 according to the present illustrative embodiment is most different from the backlight substrate LS shown in FIGS. 8 and 9 according to the aforementioned illustrative embodiment in that the backlight substrate LS2 further includes a switching element TFT, and other configurations are substantially the same or similar. Therefore, redundant descriptions will be omitted, differences will be mainly described.

A switching element TFT, a first lower insulating layer 421, and a second lower insulating layer 423 may be further disposed between the base substrate 410 and the wiring layer 430.

In some illustrative embodiments, the switching element TFT may be a thin film transistor. The switching element TFT may include an active layer ACT, a gate electrode GE, a source electrode, and a drain electrode. The active layer ACT may be formed of a semiconductor material. For example, the active layer ACT may be a semiconductor pattern made of polysilicon, amorphous silicon, oxide semiconductor, or the like.

The first lower insulating layer 421 may be provided on the active layer ACT, and the gate electrode GE may be provided on the first lower insulating layer 421. Further, the second lower insulating layer 423 may be provided on the gate electrode GE, and the wiring layer 430 may be provided on the second lower insulating layer 423.

A portion of a first conductive pattern 431 may penetrate the first lower insulating layer 421 and the second lower insulating layer 423 to be in contact with the active layer ACT and be electrically connected to the active layer ACT. That is, a portion of the first conductive pattern 431 may function as a drain electrode of the switching element TFT.

Further, a portion of the first connection pattern CL1 may extend up to the light emitting area LA and penetrate the first lower insulating layer 421 and the second lower insulating layer 423 to be in contact with the active layer ACT and be electrically connected to the active layer ACT. That is, a portion of the first connection pattern CL1 may function as a source electrode of the switching element TFT.

Although not shown in the drawings, a gate line connected to the switching element TFT may be disposed on the base substrate 410. In some illustrative embodiments, the gate line may be disposed on the same layer as the gate electrode GE.

The switching element TFT may perform a switching operation according to a gate on/off signal provided to the gate electrode GE, and thus a driving voltage may be provided to the light emitting element 500 according to the operation of the switching element TFT.

Meanwhile, although it is shown in FIG. 24 that the switching element TFT is a thin film transistor, this is only one example. Besides, the switching element TFT may be implemented as various types of thin film transistors such as bottom gate-type thin film transistors.

Figure 25:
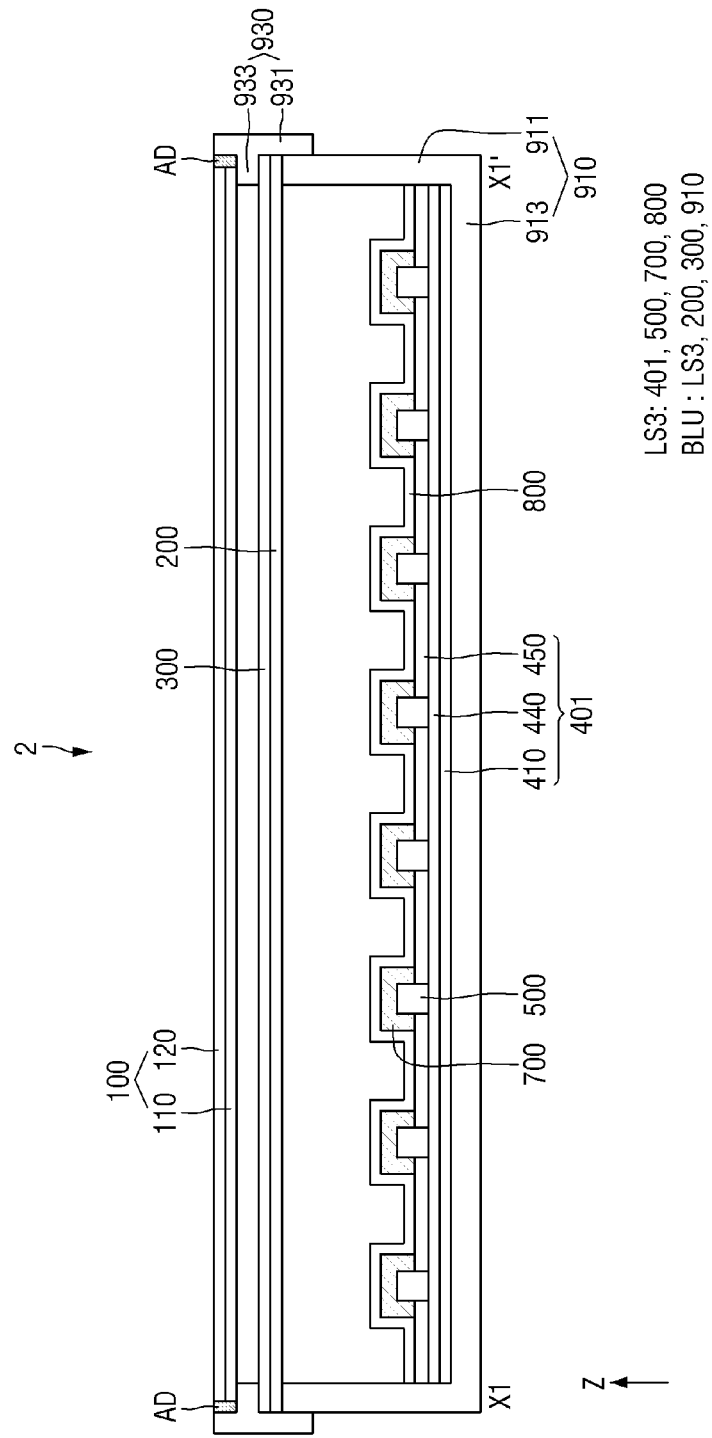
FIG. 25 is a cross-sectional view of a display device according to another illustrative embodiment taken along the sectional line X1-X1' of FIG. 1.
Figure 26:
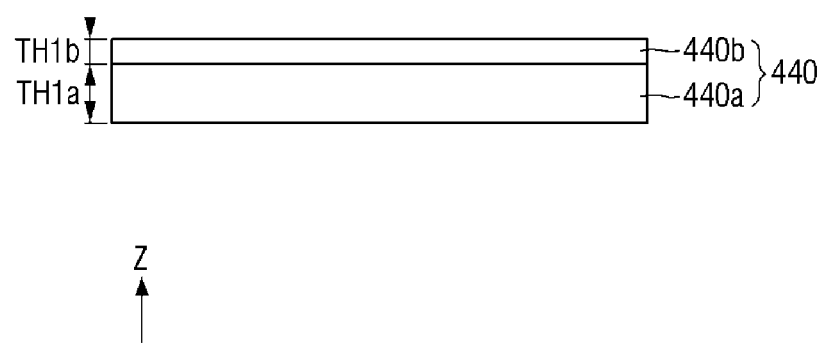
FIG. 26 is an enlarged cross-sectional view of the wiring layer of FIG. 25.

FIG. 25 is a cross-sectional view of a display device according to another illustrative embodiment taken along the sectional line X1-X1' of FIG. 1, and FIG. 26 is an enlarged cross-sectional view of the wiring layer of FIG. 25.

Referring to FIGS. 25 and 26, a display device 2 according to the present illustrative embodiment is different from the display device 1 shown in FIG. 2 in that the display device 2 includes a backlight substrate LS3 different from the backlight substrate LS of the illustrative embodiment of FIG. 2 and in that the display device 2 includes a light source substrate 401 different from the light source substrate 400 of the illustrative embodiment of FIG. 2, and other configurations are substantially the same or similar. Therefore, a redundant description will be described.

The light source substrate 401 may include a base substrate 410 and a wiring layer 440, and may further include an insulating layer 450. The light source substrate 401 may not include the reflective layer 470 shown in FIG. 2 because the wiring layer 440 may function as a reflective layer.

Explaining the laminated structure of the wiring layer 440, the wiring layer 440 may have a structure in which a plurality of conductive layers are stacked. In some illustrative embodiments, the wiring layer 440 may have a structure in which two conductive layers are stacked. Illustratively, as shown in FIG. 26, the wiring layer 440 may include a lower conductive layer 440a and an upper conductive layer 440b.

The lower conductive layer 440a may be disposed on the base substrate 410. In some illustrative embodiments, the lower conductive layer 440a may be made of a conductive material having excellent light reflectivity. In some illustrative embodiments, the reflectance of the lower conductive layer 440a with respect to light of a visible light range may be 70% to 99%. Illustratively, the lower conductive layer 440a may be made of a metal having excellent reflectance such as aluminum (Al), an aluminum alloy, silver (Ag), a silver alloy, or gold (Au). For example, the lower conductive layer 440a may include aluminum or an aluminum alloy. Since the lower conductive layer 440a is made of a material having excellent light reflectivity, an additional reflective layer may be omitted.

In some illustrative embodiments, the thickness TH1a of the lower conductive layer 440a may be 600 nm to 800 nm.

The upper conductive layer 440b may be disposed on the lower conductive layer 440a. The upper conductive layer 440b may be in contact with the lower conductive layer 440a to reduce the resistance of the wiring layer 440. In some illustrative embodiments, the upper conductive layer 440b may be made of titanium (Ti) or a titanium alloy. In some illustrative embodiments, the thickness TH1b of the upper conductive layer 440b may be thinner than the thickness of the lower conductive layer 440a, and may be, for example, 10 nm to 30 nm.

An insulating layer 450 may be disposed on the wiring layer 440. The insulating layer 450 may provide a flat surface between the wiring layer 440 and the light emitting element 500, and may define a connection portion between the wiring layer 440 and the light emitting element 500. Besides, a more detailed description of the insulating layer 450 is the same as that described above, and will thus be omitted.

Figure 27:
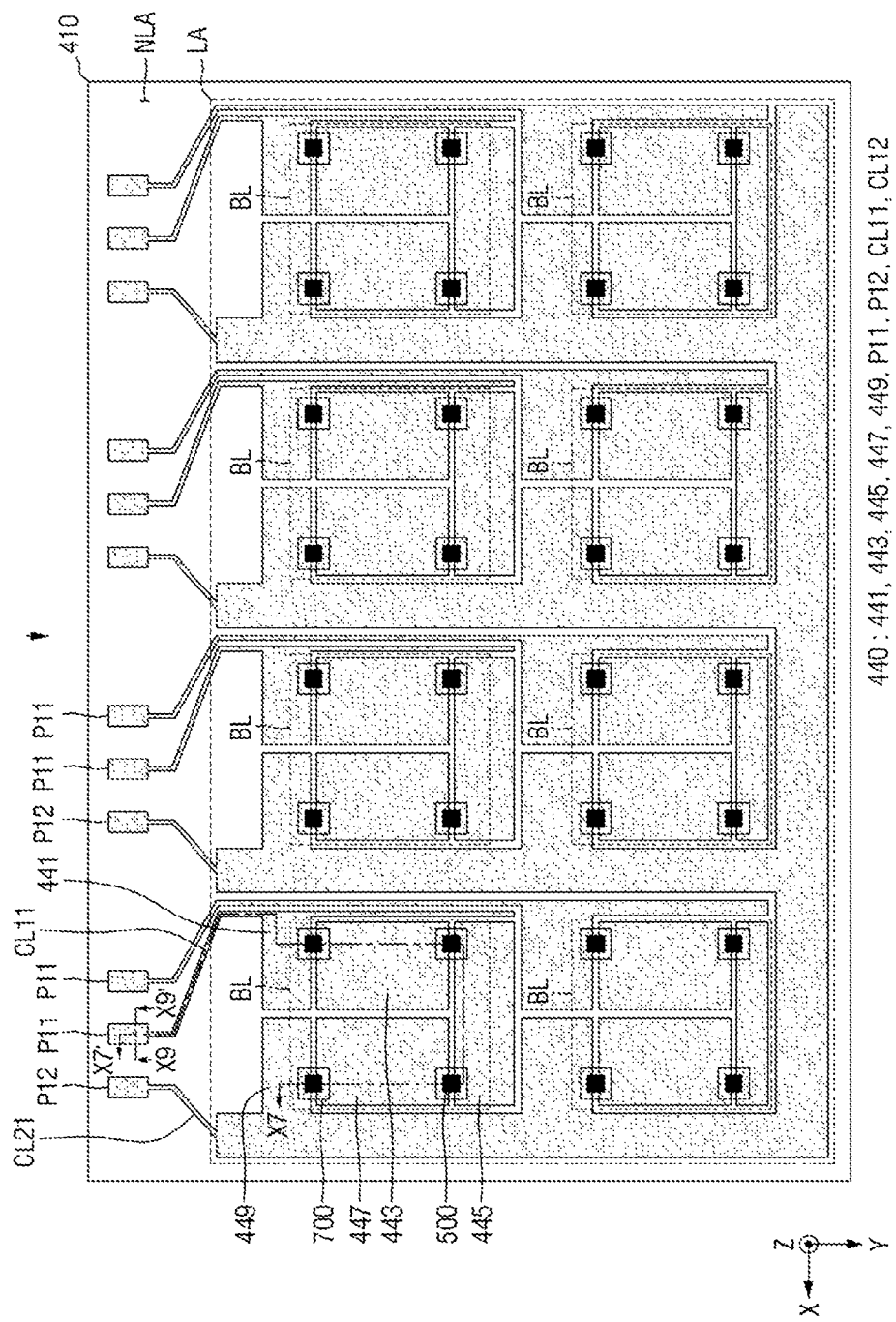
FIG. 27 is a plan view of the backlight substrate shown in FIG. 25.
Figure 28:
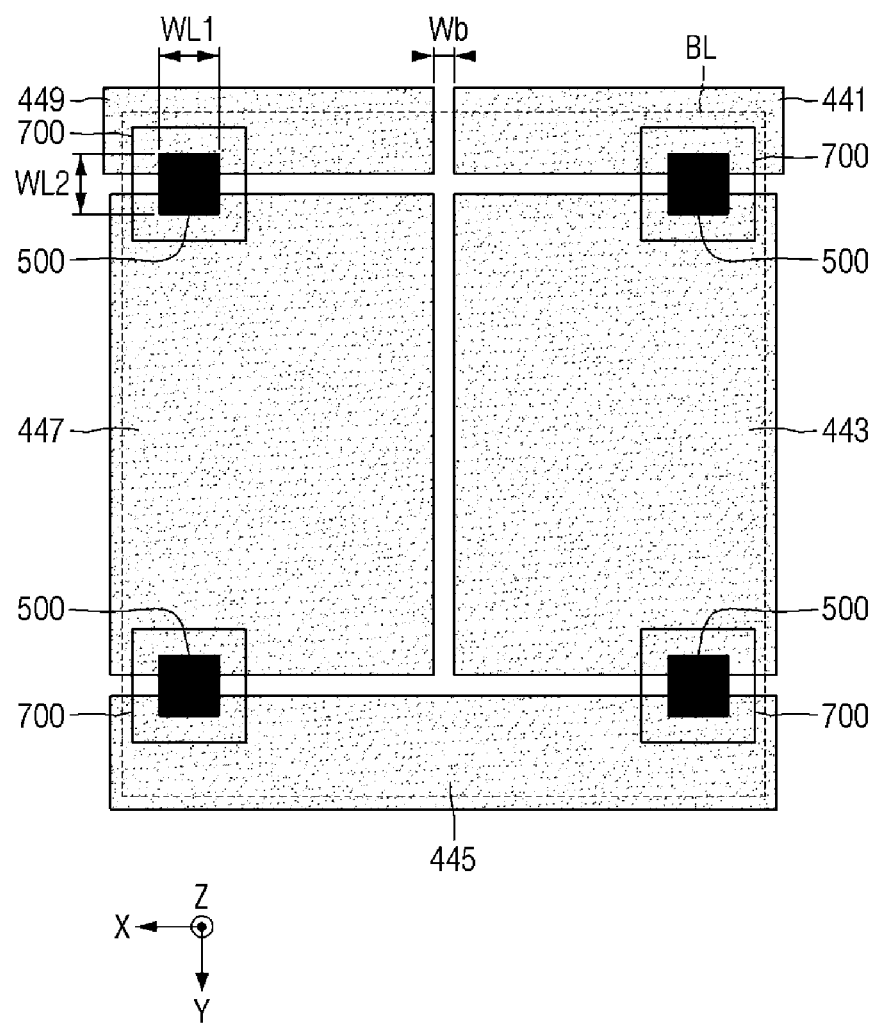
FIG. 28 is an enlarged plan view of any one of the light emitting groups shown in FIG. 27.

FIG. 27 is a plan view of the backlight substrate shown in FIG. 25, and FIG. 28 is an enlarged plan view of any one of the light emitting groups shown in FIG. 27.

Referring to FIGS. 27 and 28, in a plan view, the wiring layer 440 may include a first conductive pattern 441, a second conductive pattern 443, a third conductive pattern 445, a fourth conductive pattern 447, a fifth conductive pattern 449, and a first pad. P11, a second pad P12, a first connection pattern CL11, and a second connection pattern CL12.

The first conductive pattern 441 and the fifth conductive pattern 449 may be connected to each light emitting block BL, and the second conductive pattern 443, the third conductive pattern 445, and the fourth conductive pattern 447 may connect the light emitting elements 500 included in each light emitting block BL in series to each other.

The area occupied by the first conductive pattern 441, the second conductive pattern 443, the third conductive pattern 445, the fourth conductive pattern 447, and the fifth conductive pattern 449 on the plane may be relatively wider than that in the illustrative embodiment shown in FIGS. 5 and 6.

In some illustrative embodiments, the first conductive pattern 441, the second conductive pattern 443, the third conductive pattern 445, the fourth conductive pattern 447, and the fifth conductive pattern 449 may be spaced apart from each other, and may be disposed adjacent to each other on the plane. The distance between the conductive patterns may be smaller than the width of the light emitting element 500. Illustratively, the distance Wb between the second conductive pattern 443 and the fourth conductive pattern 447 adjacent to each other along the first direction X may be narrower than the width WL1 of the light emitting element 500 measured along the first direction X.

A driving voltage for driving the light emitting element 500 may be provided to the first pad P11. The first pad P11 may be disposed in the non-light emitting area NLA and electrically connected to the first conductive pattern 441 through the first connection pattern CL11.

A common voltage for driving the light emitting element 500 may be provided to the second pad P12. The second pad P12 may be electrically connected to the fifth conductive pattern 449 through the second connection pattern CL12.

Figure 29:
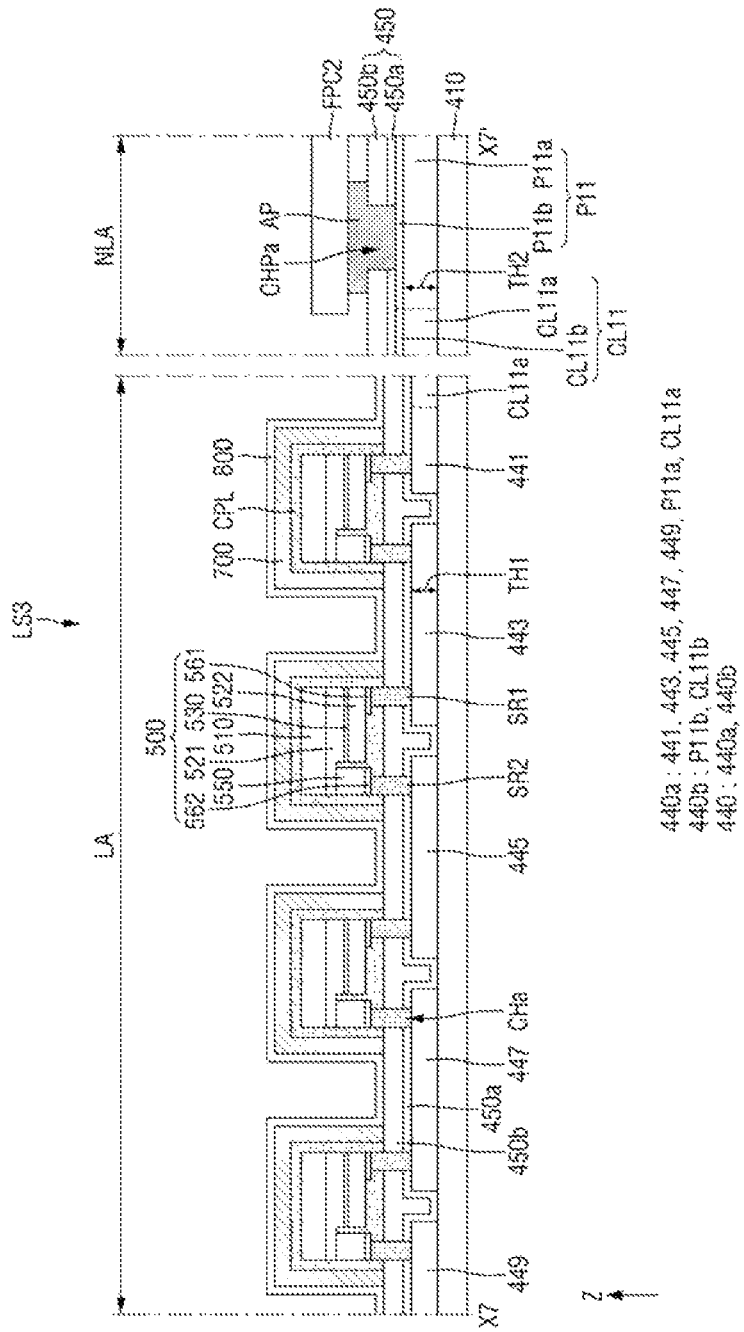
FIG. 29 is a cross-sectional view of the backlight substrate taken along a sectional line X7-X7' of FIG. 27.
Figure 30:
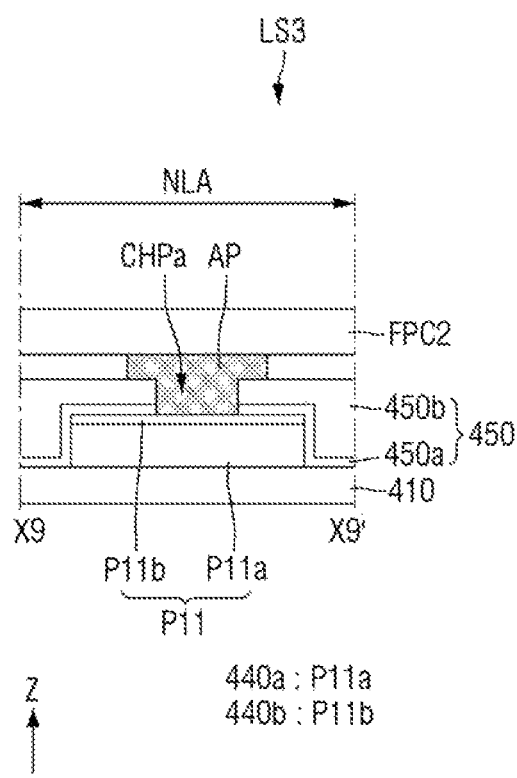
FIG. 30 is a cross-sectional view of the backlight substrate taken along a sectional line X9-X9' of FIG. 27.

FIG. 29 is a cross-sectional view of the backlight substrate taken along a sectional line X7-X7' of FIG. 27, and FIG. 30 is a cross-sectional view of the backlight substrate taken along a sectional line X9-X9' of FIG. 27.

Referring to FIGS. 29 and 30 in addition to FIGS. 27 and 28, the first conductive pattern 441, the second conductive pattern 443, the third conductive pattern 445, the fourth conductive pattern 447, and the fifth conductive pattern 449 may be formed as a single layer, and the first pad P11 may have a two-layer structure including a first lower pad pattern P11a and a first upper pad pattern P11b. In some illustrative embodiments, the first connection pattern CL11 may have a single layer structure including only the first lower connection pattern CL11a in the light emitting area LA, and may have a two-layer structure including the first lower connection pattern CL11a and the first upper connection pattern CL11b in the non-light emitting area NLA. Alternatively, in another illustrative embodiment, the first connection pattern CL11 may have a single layer structure including only the first lower connection pattern CL11a in both the light emitting area LA and the non-light emitting area NLA.

Explaining the relationship between the lower conductive layer 440a and upper conductive layer 440b and the first conductive pattern 441, second conductive pattern 443, third conductive pattern 445, fourth conductive pattern 447, fifth conductive pattern 449, first pad P11 and first connection pattern CL11, the lower conductive layer 440a may include the first conductive pattern 441, the second conductive pattern 443, the third conductive pattern 445, the fourth conductive pattern 447, the fifth conductive pattern 449, the pad pattern P11a, and the first lower connection pattern CL11a. The upper conductive layer 440b may include a first upper pad pattern P11b, and may further include a first upper connection pattern CL11b.

In some illustrative embodiments, in order for the lower conductive layer 440a to function as a reflective layer, the upper conductive layer 440b may not be disposed in the light emitting area LA. In other words, the upper conductive layer 440b may be disposed only in the non-light emitting area NLA.

In some illustrative embodiments, the thickness of the lower conductive layer 440a in the light emitting area LA may be different from the thickness of the lower conductive layer 440a in the non-light emitting area NLA. Illustratively, the thickness TH1 of the lower conductive layer 440a in the light emitting area LA may be thinner than the thickness TH2 of the lower conductive layer 440a or the first lower pad pattern P11a in the non-light emitting area NLA.

An insulating layer 450 may be disposed on the wiring layer 440, and the insulating layer 450 may include a first insulating layer 450a and a second insulating layer 450b.

In the light emitting area LA, a contact hole CHa exposing the lower conductive layer 440a may be defined in the insulating layer 450, and in the non-light emitting area NLA, a pad contact hole CHPa exposing the first upper pad pattern P11b of the first pad P11 may be defined in the insulating layer 450.

In the light emitting area LA, the light emitting element 500 may be disposed the insulating layer 450, and may be electrically connected to the wiring layer 440 through the first connection member SR1 and the second connection member SR2.

Since the connection relationship among the first conductive pattern 441, the second conductive pattern 443, the third conductive pattern 445, the fourth conductive pattern 447, and the fifth conductive pattern 449 and the light emitting element 500 is substantially the same or similar to that described above, a detailed description thereof will be omitted.

A capping layer CPL covering the light emitting element 500 may be disposed on the light emitting element 500.

A wavelength converter 700 may be disposed on the capping layer CPL. The wavelength converter 700 may be in contact with the capping layer CPL. In some illustrative embodiments, the wavelength converter 700 may also be in contact with the insulating layer 450.

A passivation layer 800 may be disposed on the wavelength converter 700. The passivation layer 800 may be in contact with the wavelength converter 700.

In the non-light emitting area NLA, a pad connection member AP such as an anisotropic conductive film may be disposed in the pad contact hole CHPa, and the first pad P11 may be electrically connected to the backlight flexible substrate FPC2 through the pad connection member AP.

In some illustrative embodiments, the coupling force between the upper conductive layer 440b and the pad connection member AP may be greater than the coupling force between the lower conductive layer 440a and the pad connection member AP. Accordingly, the pad connection member AP is in direct contact with the first upper pad pattern P11b of the first pad P11, and thus the connection reliability between the first pad P11 and the backlight flexible substrate FPC2 may be improved.

Further, according to the aforementioned illustrative embodiment, the first conductive pattern 441, the second conductive pattern 443, the third conductive pattern 445, the fourth conductive pattern 447, and the fifth conductive pattern 449, which are disposed in the light emitting area LA, are made of a metal having optical reflectivity, and thus there is an advantage that a separate reflective layer may be omitted. Further, since the upper conductive layer remains on the pad portion, there are advantages that the connection reliability between the backlight flexible substrate FPC2 and the pad can be improved, and the pad resistance can be reduced.

FIGS. 31, 32, 33, 34, 35, 36, and 37 are stepwise cross-sectional views for explaining a process of manufacturing the backlight substrate shown in FIG. 29.

Figure 31:
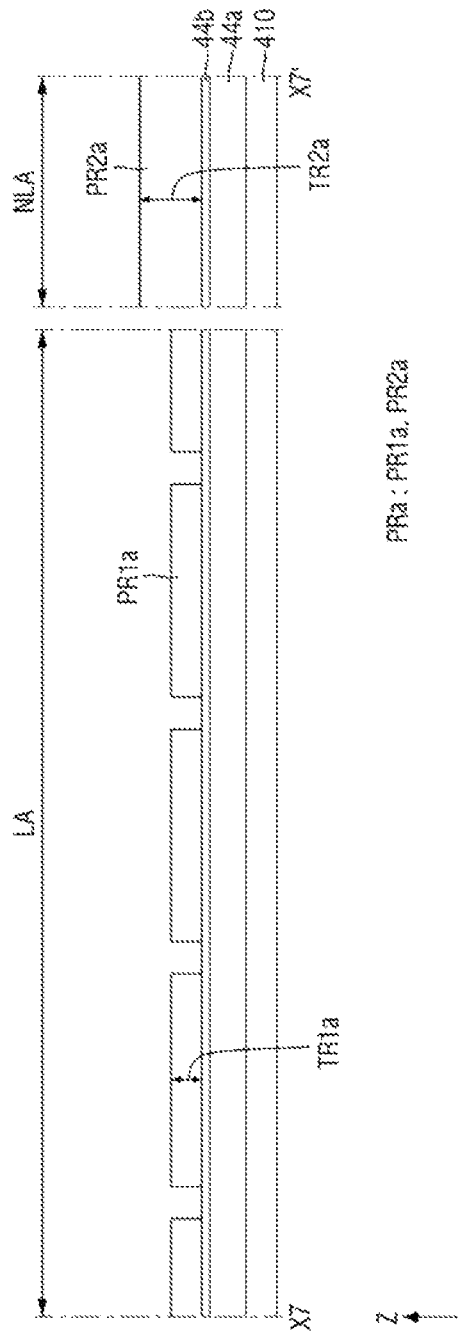
FIGS. 31, 32, 33, 34, 35, 36, and 37 are stepwise cross-sectional views for explaining a process of manufacturing the backlight substrate shown in FIG. 29.

Referring to FIGS. 31, 32, 33, 34, 35, 36, and 37, first, as shown in FIG. 31, a first conductive material layer 44a and a second conductive material layer 44b are sequentially deposited on a base substrate 410. Examples of the material for forming each of the first conductive material layer 44a and the second conductive material layer 44b may be the same as examples of the material of each of the lower conductive layer (440a in FIG. 26) and the upper conductive layer (440b of FIG. 26), which have been described above with reference to FIG. 26.

Then, a photosensitive organic layer is formed, exposed to light, and developed to form an organic layer pattern PRa. The exposure/development process of the photosensitive organic layer for forming the organic layer pattern PRa may be performed using a half tone mask.

The organic layer pattern PRa may include a first organic layer pattern PR1a having a first thickness TR1a and a second organic layer pattern PR2a having a second thickness TR2a thinner than the first thickness TR1a. That is, the organic layer pattern PRa having a step may be formed using one half tone mask. The organic layer pattern PRa may be formed in a portion corresponding to the wiring layer (440 in FIGS. 27, 28, 29, and 30), and the second organic layer pattern PR2a of the organic layer pattern PRa is formed in a portion where the upper conductive layer (440b in FIGS. 29 and 30) is disposed.

Figure 32:
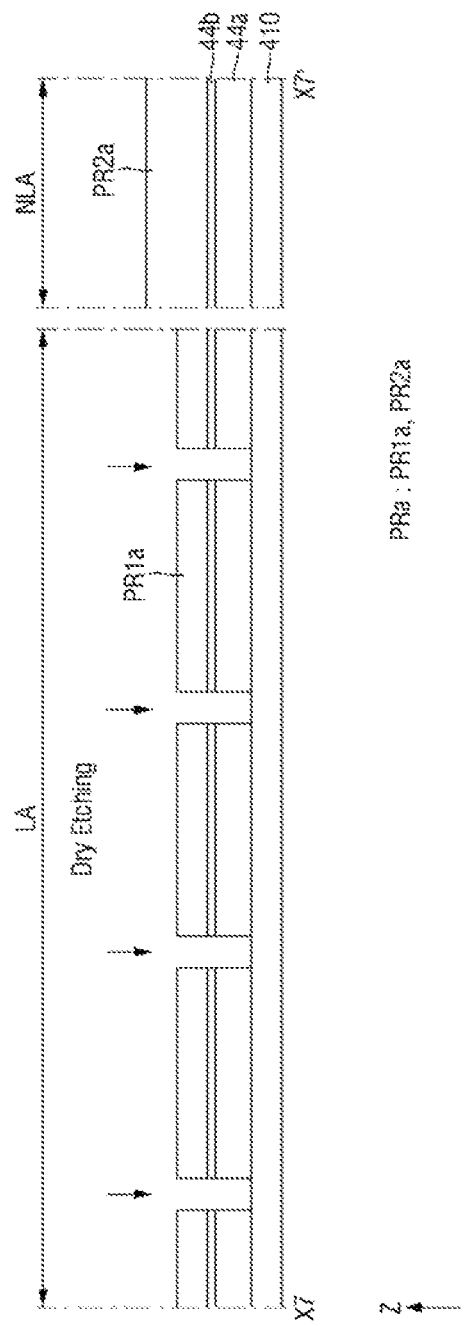

Next, as shown in FIG. 32, the first conductive material layer 44a and the second conductive material layer 44b are patterned using the organic layer pattern PRa as a mask. The first conductive material layer 44a and the second conductive material layer 44b may be patterned by a dry etching process during the same process. Portions of the first conductive material layer 44a and the second conductive material layer 44b, the portions being covered by the organic layer pattern PRa, may not be patterned.

Figure 33:
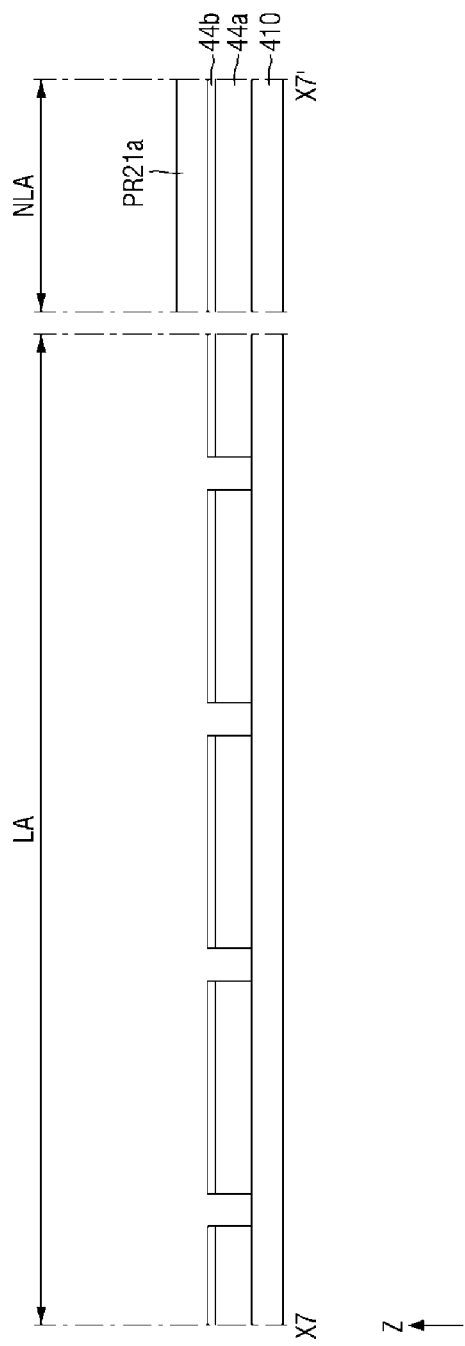

Next, the first organic layer pattern PR1a of the organic layer pattern PRa is removed by an ashing process. After the first organic layer pattern PR1a is removed, as shown in FIG. 33, an organic layer residual pattern PR21a may remain on the second conductive material layer 44b in the non-light emitting area NLA. The organic layer residual pattern PR21a may be a portion of the second organic layer pattern PR21a remaining during the ashing process without being removed.

Figure 34:
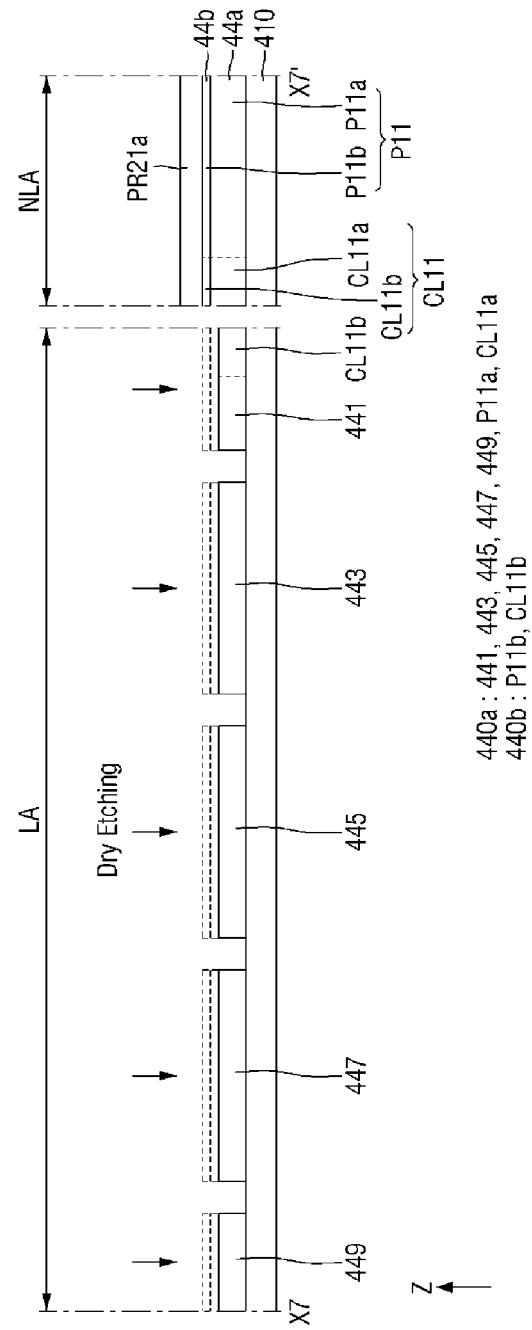

Next, as shown in FIG. 34, the exposed second conductive material layer 44b is removed using the organic layer residual pattern PR21a as a mask. The process of removing the second conductive material layer 44b may be performed by a dry etching process. In some illustrative embodiments, a portion of the first conductive material layer 44a, the portion not being masked by the organic layer residual pattern PR21a, may also be removed in the process of removing the second conductive material layer 44b. Accordingly, the thickness of the portion of the first conductive material layer 44a disposed in the light emitting area LA may be thinner than the thickness of the portion of the first conductive material layer 44a disposed in the non-light emitting area NLA.

Through the aforementioned process, a lower conductive layer 440a including a first conductive pattern 441, a second conductive pattern 443, a third conductive pattern 445, a fourth conductive pattern 447, a fifth conductive pattern 449, a first lower pad pattern P11a, and a lower connection pattern CL11a may be formed, and an upper conductive layer 440b including a first upper pad pattern P11b and a first upper connection pattern CL11b may be formed.

Then, the organic layer residual pattern PR21a is removed.

Figure 35:
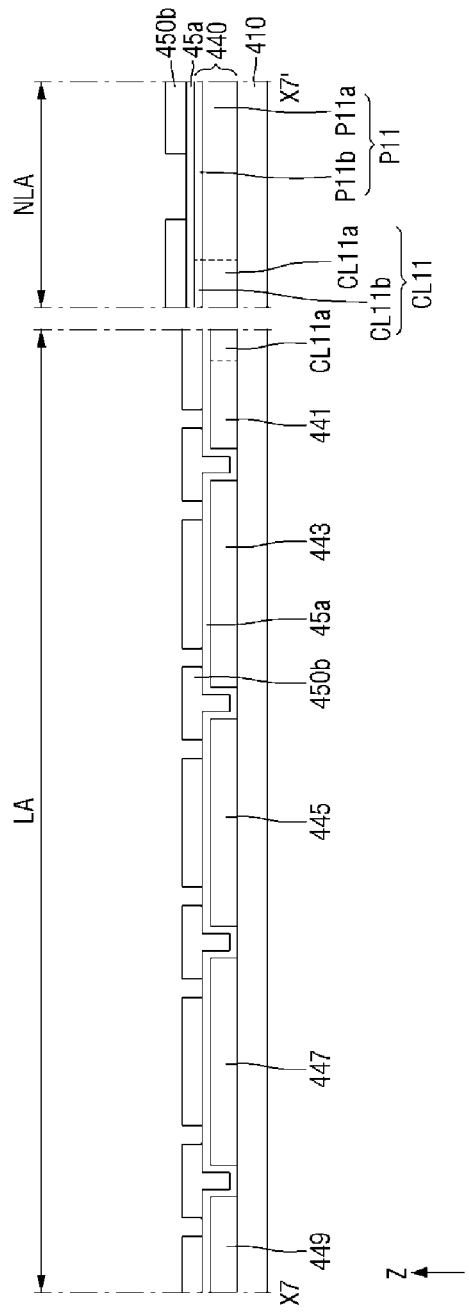

Next, as shown in FIG. 35, a first insulating material layer 45a is formed on a third conductive material layer 43c. The first insulating material layer 45a may be formed over the entire surface of the base substrate 410 and may be made of an inorganic insulating material.

Then, a photosensitive organic layer is applied onto the first insulating material layer 45a, exposed to light, and developed to form a second insulating layer 450b. The exposure/development process of the photosensitive organic layer for forming the second insulating layer 450b may be performed using a full tone mask.

The second insulating layer 450b may be formed in the remaining regions except for the portion corresponding to the contact hole (CHa in FIG. 29) and the pad contact hole (CHPa in FIG. 29) described above with reference to FIG. 29.

Figure 36:
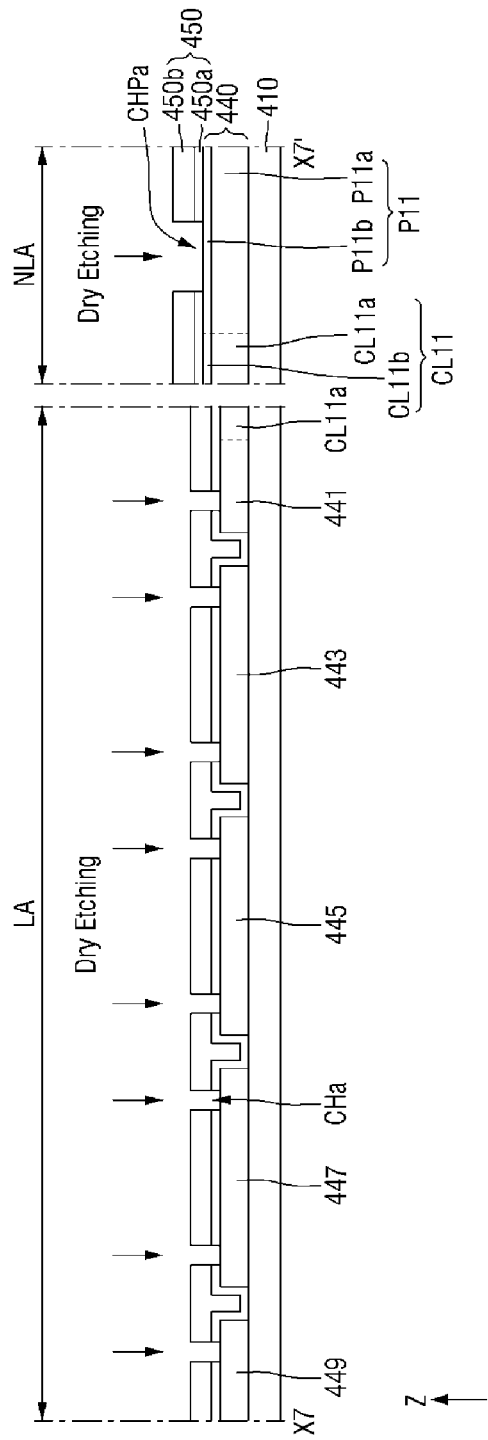

Next, as shown in FIG. 36, the first insulating material layer 45a is patterned using the second insulating layer 450b as a mask. In some illustrative embodiments, the first insulating material layer 45a may be patterned through a dry etching process, and thus a first insulating layer 450a may be formed. As the first insulating layer 450a is patterned, a contact hole CHa and a pad contact hole CHPa may be formed in the insulating layer 450.

Figure 37:
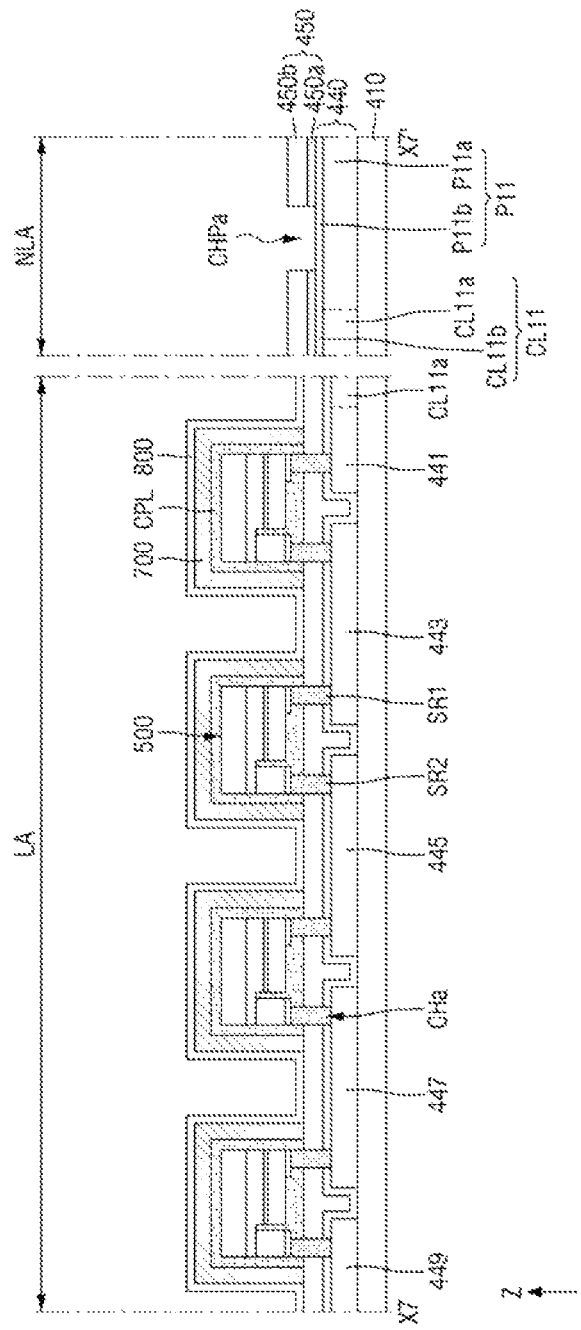

Next, as shown in FIG. 37, each light emitting element 500 is electrically connected to the wiring layer 430 by a flip chip bonding method or the like. As described above, the light emitting element 500 may be bonded to the wiring layer 430 through the first connection member SR1, the second connection member SR2, and the like.

Then, a capping layer CPL covering each light emitting element 500 is formed, and a wavelength converter 700 is formed on the capping layer CPL. Then, a passivation layer 800 covering each wavelength converter 700 is formed.

Then, when pads exposed through the pad contact hole CHP via a connection member, for example, first pads P1 are connected to a backlight flexible substrate, the structure shown in FIG. 8 may be manufactured.

According to the aforementioned illustrative embodiments, only two masks may be used to form not only conductive patterns in the light emitting area but also connection patterns and pads in the non-light emitting area. Accordingly, since a pad process, for example, a process of additionally forming pad connection patterns, separated from the wiring layer, on the sides of the pads may be omitted, there are advantages that the number of masks used in the manufacturing process of a backlight substrate and that manufacturing costs may be reduced depending on the reduction of the number of the masks.

Moreover, since the lower conductive layer of the wiring layer may function as a reflective layer, a separate reflective layer may be formed, so that there are an advantage of simplifying the manufacturing process and an advantage of simplifying the structure of the backlight substrate.

Figure 38:
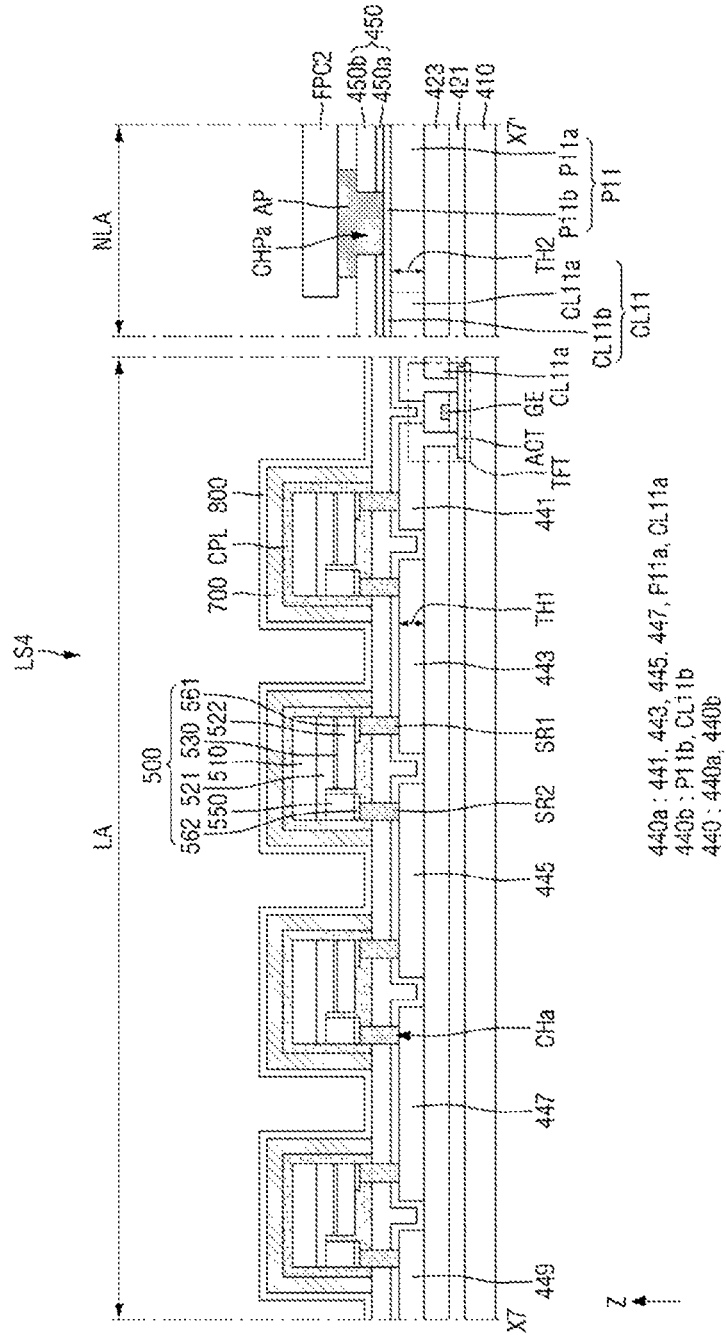
FIG. 38 is a cross-sectional view showing a modified example of the backlight substrate shown in FIG. 29.

FIG. 38 is a cross-sectional view showing a modified example of the backlight substrate shown in FIG. 29.

Referring to FIG. 38, a backlight substrate LS4 according to the present illustrative embodiment is greatly different from the aforementioned backlight substrate LS3 shown in FIG. 29 in that the backlight substrate LS4 further includes a switching element TFT, and other configurations are substantially the same or similar. Therefore, a redundant description will be omitted, and differences will be mainly described.

A switching element TFT, a first lower insulating layer 421, and a second lower insulating layer 423 may be further disposed between the base substrate 410 and the wiring layer 430.

In some illustrative embodiments, the switching element TFT may be a thin film transistor. The switching element TFT may include an active layer ACT, a gate electrode GE, a source electrode, and a drain electrode.

The active layer ACT may be disposed on the base substrate 410, and the first lower insulating layer 421 may be disposed on the active layer ACT. The gate electrode GE may be disposed on the first lower insulating layer 421, the second lower insulating layer 423 may be disposed on the gate electrode GE, and the wiring layer 440 may be disposed on the second lower insulating layer 423.

A portion of the first conductive pattern 441 may penetrate the first lower insulating layer 421 and the second lower insulating layer 423 to be in contact with the active layer ACT and be electrically connected to the active layer ACT. That is, a portion of the first conductive pattern 441 may function as a drain electrode of the switching element TFT.

Further, in the light emitting area, a portion of the first connection pattern CL11 may penetrate the first lower insulating layer 421 and the second lower insulating layer 423 to be in contact with the active layer ACT and be electrically connected to the active layer ACT. That is, a portion of the first connection pattern CL11 may function as a source electrode of the switching element TFT.

Besides, since the detailed description of the switching element TFT is substantially the same as or similar to that described above with reference to FIG. 24, a detailed description thereof will be omitted.

As described above, according to the illustrative embodiments of the present invention, there can be provided a backlight unit capable of simplifying a structure and reducing the number of masks in a manufacturing process, and a display device including the same.

The effects of the present invention are not limited by the foregoing, and other various effects are anticipated herein.

Although certain illustrative embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device, comprising:
   a base substrate in which a light emitting area and a non-light emitting area are defined;
   a wiring layer disposed on the base substrate, the wiring layer comprising:
      a lower conductive layer disposed on the base substrate;
      an intermediate conductive layer disposed on the lower conductive layer; and
      an upper conductive layer disposed on the intermediate conductive layer;
   a light emitting element disposed on the wiring layer in the light emitting area;
   a connection member electrically connecting the light emitting element and the wiring layer;
   a flexible board electrically connected to the wiring layer in the non-light emitting area; and
   a pad connection member electrically connecting the wiring layer and the flexible board in the non-light emitting area, the pad connection member contacting the upper conductive layer of the wiring layer;
   wherein:
   the connection member contacts the intermediate conductive layer of the wiring layer in the light emitting area; and
   the connection member contacts the light emitting element in the light emitting area.

2. The display device of claim 1, further comprising:
   an insulating layer disposed between the wiring layer and the light emitting element;
   a contact hole exposing the intermediate conductive layer, the contact hole defined through the insulating layer and the upper conductive layer in the light emitting area; and
   a pad contact hole exposing the upper conductive layer, the pad contact hole defined through the insulating layer in the non-light emitting area,
   wherein:
   the connection member contacts the intermediate conductive layer through the contact hole; and
   the pad connection member contacts the upper conductive layer through the pad contact hole.

3. The display device of claim 2, further comprising a reflective layer disposed directly on the insulating layer, the reflective layer comprising an opening;
   wherein the light emitting element is disposed in the opening in a plan view.

4. The display device of claim 2, further comprising a capping layer disposed on the light emitting element, the capping layer covering the light emitting element; and
   a wavelength converter disposed on the capping layer.

5. The display device of claim 4, wherein the capping layer is further disposed in a space between the light emitting element and the insulating layer.

6. The display device of claim 4, wherein:
the light emitting element is configured to emit blue light; and
the wavelength converter comprises a wavelength shifter configured to convert the blue light into a red light or a green light.

7. The display device of claim 1, wherein:
the lower conductive layer and the upper conductive layer comprise at least one of titanium and a titanium alloy; and
the intermediate layer comprises at least one of copper and a copper alloy.

8. The display device of claim 1, wherein:
the lower conductive layer comprises a first lower conductive pattern and a second lower conductive pattern disposed in the light emitting area, spaced apart from each other;
the intermediate conductive layer comprises a first intermediate conductive pattern and a second intermediate conductive pattern disposed in the light emitting area, spaced apart from each other;
the upper conductive layer comprises a first upper conductive pattern and a second upper conductive pattern disposed in the light emitting area, spaced apart from each other;
the first lower conductive pattern, the first intermediate conductive pattern, and the first upper conductive pattern overlap each other;
the second lower conductive pattern, the second intermediate conductive pattern, and the second upper conductive pattern overlap each other;
the light emitting element comprises:
a first electrode electrically connected to the first intermediate conductive pattern; and
a second electrode electrically connected to the second intermediate conductive pattern; and
a distance between the first lower conductive pattern and the second lower conductive pattern is greater than a distance between the first upper conductive pattern and the second upper conductive pattern.

9. The display device of claim 8, wherein the upper conductive layer further comprises a protrusion tip connected to the first upper conductive pattern, the protrusion tip disposed at an edge of the first upper conductive pattern facing the second upper conductive pattern and not contacting the first intermediate conductive pattern.

10. A display device, comprising:
a base substrate in which a light emitting area and a non-light emitting area are defined;
a wiring layer disposed on the base substrate, the wiring layer comprising:
a lower conductive layer disposed on the base substrate;
an intermediate conductive layer disposed on the lower conductive layer; and
an upper conductive layer disposed on the intermediate conductive layer;
a light emitting element disposed on the wiring layer in the light emitting area;
a connection member electrically connecting the light emitting element and the wiring layer, the connection member contacting the intermediate conductive layer of the wiring layer and the light emitting element;
a flexible board electrically connected to the wiring layer in the non-light emitting area;
a pad connection member electrically connecting the wiring layer and the backlight flexible board in the non-light emitting area, the pad connection member contacting the upper conductive layer of the wiring layer; and
a switching element disposed between the base substrate and the wiring layer,
wherein the wiring layer further comprises:
a first conductive pattern disposed in the light emitting area, electrically connected to a first electrode of the light emitting element and the switching element;
a second conductive pattern disposed in the light emitting area, electrically connected to a second electrode of the light emitting element, spaced apart from the first conductive pattern; and
a pad disposed in the non-light emitting area, the pad contacting the pad connection member.

11. The display of claim 10, wherein the wiring layer further comprises a connection pattern connected to the pad and the switching element.

12. The display of claim 10, wherein:
the connection member comprises a first connection member and a second connection member spaced apart from the first connection member;
the first connection member contacts the first electrode of the light emitting element and the first conductive pattern in the light emitting area; and
the second connection member contacts the second electrode of the light emitting element and the second conductive pattern in the light emitting area.

13. The display of claim 10, wherein:
the connection member comprises a first connection member and a second connection member spaced apart from the first connection member;
the first connection member contacts the first electrode of the light emitting element and the first conductive pattern in the light emitting area; and
the second connection member contacts the second electrode of the light emitting element and the second conductive pattern in the light emitting area.

14. A display device, comprising:
a base substrate in which a light emitting area and a non-light emitting area are defined;
a wiring layer disposed on the base substrate, the wiring layer comprising:
a lower conductive layer disposed on the base substrate; and
an upper conductive layer disposed on the lower conductive layer, the upper conductive layer contacting the lower conductive layer;
a light emitting element disposed on the wiring layer in the light emitting area;
a connection member electrically connecting the light emitting element and the wiring layer;
a flexible board electrically connected to the wiring layer in the non-light emitting area;
a pad connection member electrically connecting the wiring layer and the backlight flexible board in the non-light emitting area, the pad connection member contacting the upper conductive layer of the wiring layer; and
a switching element disposed between the base substrate and the wiring layer,
wherein the wiring layer further comprises:
a first conductive pattern disposed in the light emitting area, electrically connected to a first electrode of the light emitting element and the switching element;

a second conductive pattern disposed in the light emitting area, electrically connected to a second electrode of the light emitting element, spaced apart from the first conductive pattern; and a pad disposed in the non-light emitting area, the pad contacting the pad connection member.

15. The display device of claim 14, wherein:

the connection member contacts the lower conductive layer of the wiring layer in the light emitting area; and the connection member contacts the light emitting element in the light emitting area.

16. The display device of claim 14, wherein the light emitting element does not overlap the upper conductive layer of the wiring layer.

17. The display device of claim 14, wherein a thickness of a portion of the lower conductive layer disposed in the light emitting area is less than a thickness of a portion of the lower conductive layer disposed in the non-light emitting area.

18. The display device of claim 17, wherein:

the lower conductive layer comprises at least one of aluminum (Al), an aluminum alloy, silver (Ag), a silver alloy, and gold (Au); and the upper conductive layer comprises at least one of titanium and a titanium alloy.

19. The display device of claim 14, further comprising:

an insulating layer disposed between the wiring layer and the light emitting element;

a contact hole exposing the lower conductive layer, the contact hole defined through the insulating layer in the light emitting area; and a pad contact hole exposing the upper conductive layer, the pad contact hole defined through the insulating layer in the non-light emitting area, wherein:

the connection member contacts the lower conductive layer through the contact hole; and the pad connection member contacts the upper conductive layer through the pad contact hole.

20. The display device of claim 14, wherein:

a light emitting block comprising the plurality of light emitting elements is defined on the wiring layer;

the lower conductive layer comprises a plurality of lower conductive patterns spaced apart from each other; and the plurality of light emitting elements comprised in the light emitting block are connected to each other in series through the lower conductive pattern.

* * * * *